United States Patent
Shimmoto et al.

(10) Patent No.: US 11,195,295 B2
(45) Date of Patent: Dec. 7, 2021

(54) CONTROL SYSTEM, METHOD OF PERFORMING ANALYSIS AND STORAGE MEDIUM

(71) Applicant: Ricoh Company, Ltd., Tokyo (JP)

(72) Inventors: Takafumi Shimmoto, Kanagawa (JP); Kazuhiro Ohba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/680,695

(22) Filed: Nov. 12, 2019

(65) Prior Publication Data

US 2020/0167948 A1  May 28, 2020

(30) Foreign Application Priority Data

Nov. 22, 2018  (JP) .............. JP2018-219567
Nov. 22, 2018  (JP) .............. JP2018-219578

(51) Int. Cl.
| | | |
|---|---|---|
| G06T 7/70 | (2017.01) | |
| G06T 3/00 | (2006.01) | |
| G06T 7/11 | (2017.01) | |
| G06K 9/00 | (2006.01) | |
| H04N 5/232 | (2006.01) | |

(52) U.S. Cl.
CPC ............ *G06T 7/70* (2017.01); *G06K 9/00362* (2013.01); *G06T 3/0062* (2013.01); *G06T 7/11* (2017.01); *H04N 5/23238* (2013.01); *G06T 2207/20104* (2013.01); *G06T 2207/30196* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 2017/0223268 A1 | 8/2017 | Shimmoto | |
| 2017/0256072 A1* | 9/2017 | Shimmoto | ......... G06K 9/00778 |
| 2017/0257576 A1* | 9/2017 | Mitsui | ............... H04N 5/23293 |

FOREIGN PATENT DOCUMENTS

| | | |
|---|---|---|
| JP | 2011-061511 | 3/2011 |
| JP | 2015-186202 | 10/2015 |
| JP | 2017-118324 | 6/2017 |
| JP | 2017-123025 | 7/2017 |
| JP | 2017-162014 | 9/2017 |
| JP | 2017-163195 | 9/2017 |
| JP | 2017-163202 | 9/2017 |

* cited by examiner

*Primary Examiner* — Christopher G Findley
(74) *Attorney, Agent, or Firm* — Xsensus LLP

(57) ABSTRACT

A control system of performing an analysis in a specific space comprising circuitry configured to receive image data corresponding to captured image captured and transmitted from an image capturing device, store, in a memory, the received image data and coordinates of a movable object that indicate a position of the movable object included in the image data in association with each other, the movable object being one or more movable objects, in response to displaying an image generated from the stored image data on a display, receive an input for setting a specific closed region in the image displayed on the display, and measure the movable object within the specific closed region in the image based on coordinates of the specific closed region set by the received input, and the stored coordinates of the movable object.

16 Claims, 34 Drawing Sheets

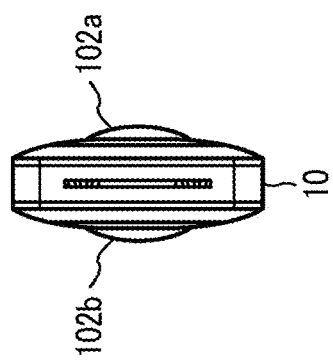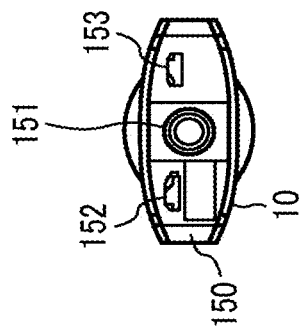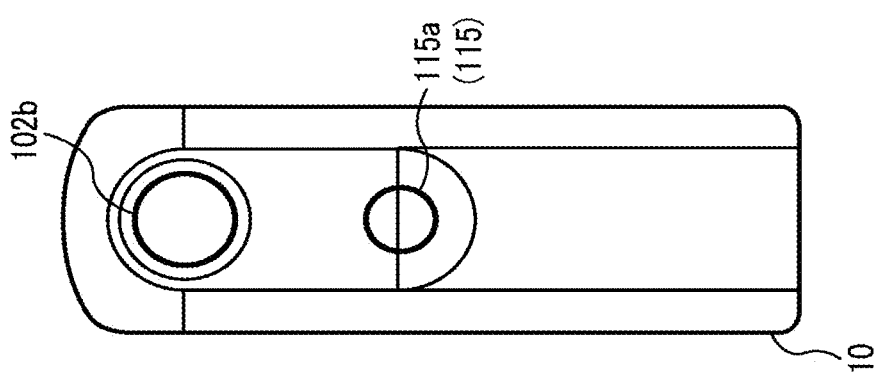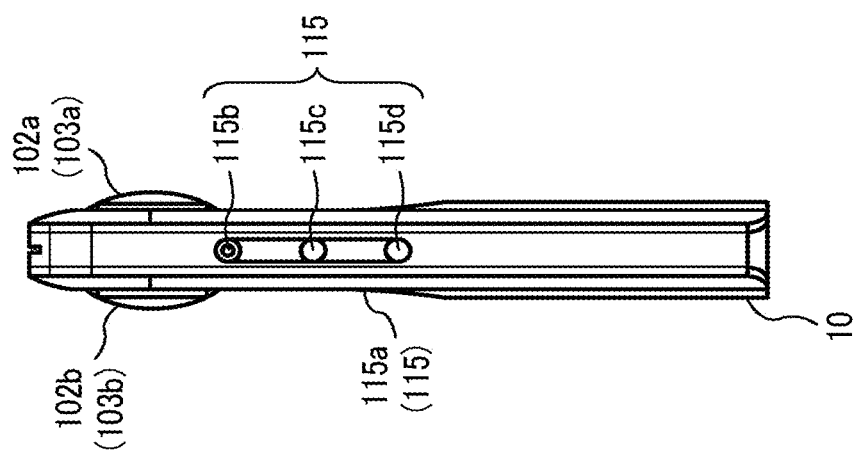

HEMISPHERICAL IMAGE
(FRONT SIDE)

HEMISPHERICAL IMAGE
(REAR SIDE)

CAPTURED IMAGE (EQUIRECTANGULAR PROJECTION IMAGE EC)

FIG. 4A
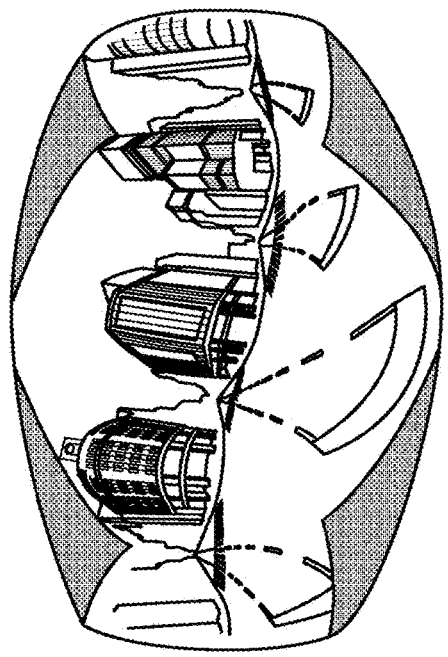 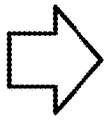 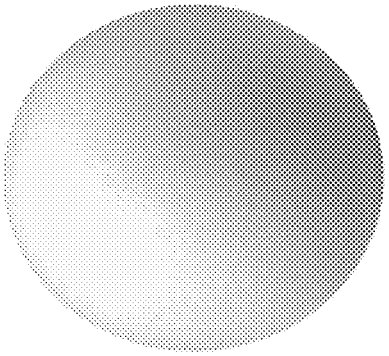
EQUIRECTANGULAR PROJECTION IMAGE EC
FIG. 4B
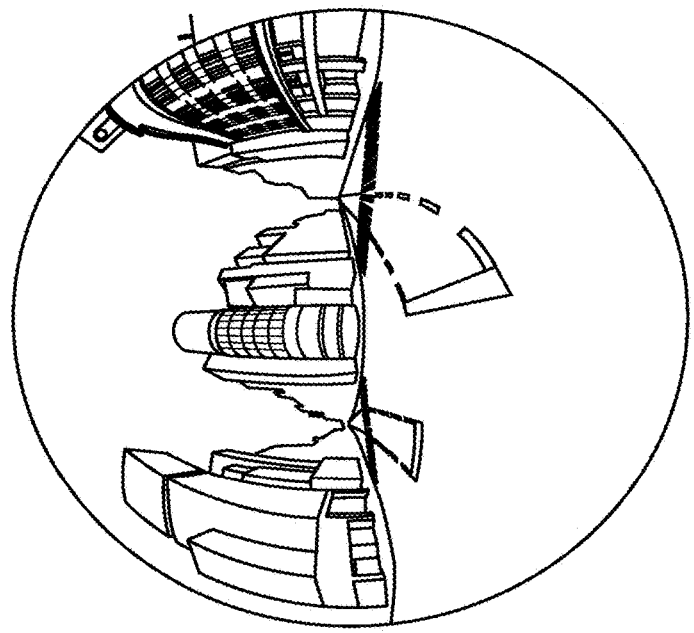
FULL-VIEW SPHERICAL IMAGE CE

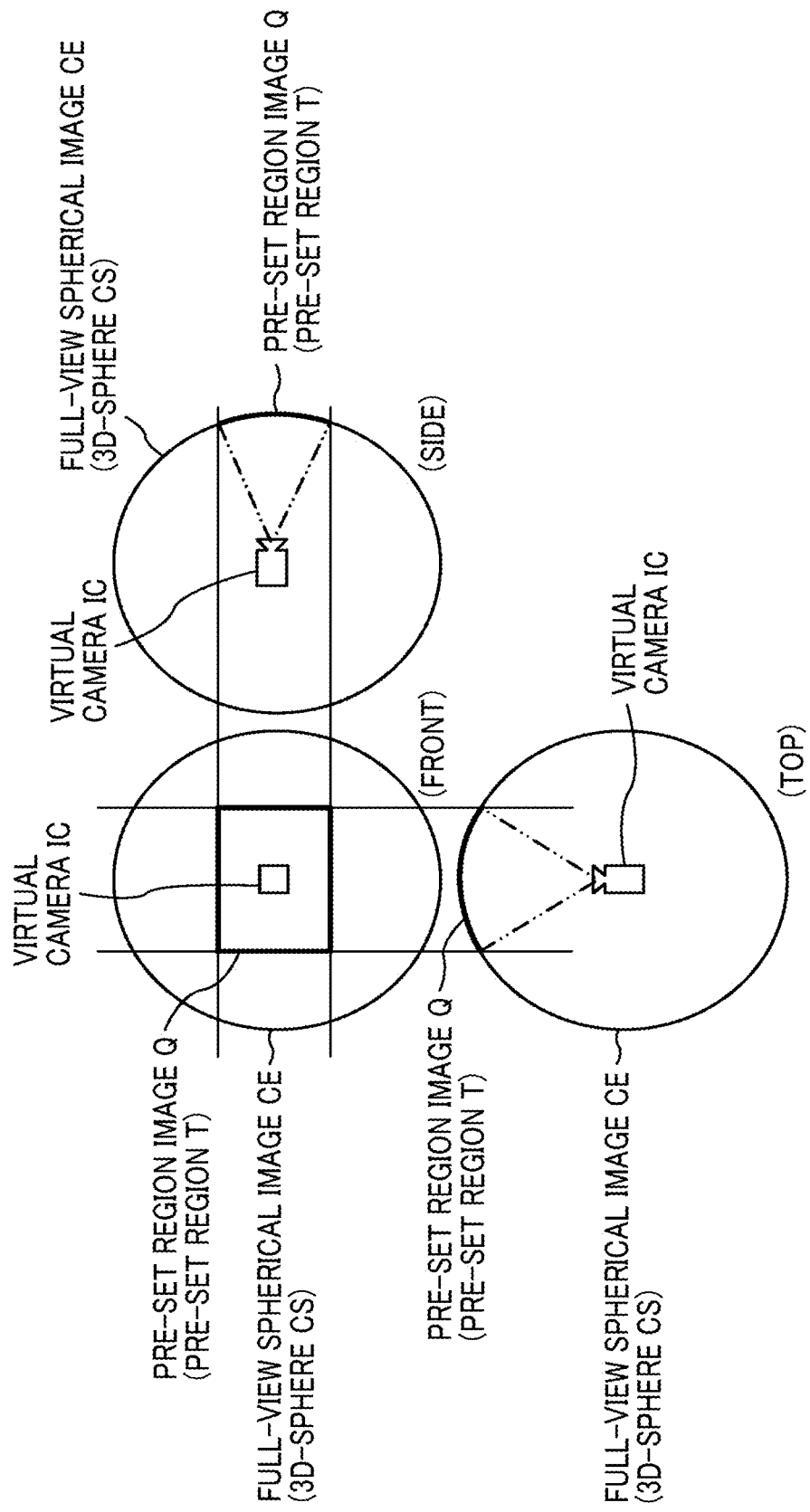

FIG. 15

| No | IMAGE ID | FILE NAME OF IMAGE DATA | IMAGE CAPTURED DATE AND TIME |
|---|---|---|---|
| 1 | R0001 | XXX.jpg | 20180615 11:30:00 |
| 2 | R0002 | YYY.jpg | 20180615 11:31:00 |
| 3 | R0003 | ZZZ.jpg | 20180615 11:32:00 |
| ... | ... | ... | ... |

FIG. 16

| No | IMAGE ID | PERSON ID | COORDINATES OF PERSON | |
|---|---|---|---|---|
| | | | X COORDINATE | Y COORDINATE |
| 1 | R0001 | T0001 | 12 | 14 |
| 2 | R0001 | T0001 | 32 | 14 |
| 3 | R0001 | T0001 | 32 | 34 |
| 4 | R0001 | T0001 | 12 | 34 |
| 5 | R0001 | T0002 | ... | ... |
| ... | ... | ... | ... | ... |

FIG. 17

| No | IMAGE ID | AREA ID | COMMON AREA ID | AREA COORDINATES | |
|---|---|---|---|---|---|
| | | | | X COORDINATE | Y COORDINATE |
| 1 | R0001 | A0001 | – | 302 | 505 |
| 2 | R0001 | A0001 | – | 632 | 502 |
| 3 | R0001 | A0001 | – | 704 | 300 |
| 4 | R0001 | A0001 | – | 612 | 126 |
| 5 | R0001 | A0001 | – | 304 | 124 |
| 6 | R0001 | A0001 | – | 241 | 300 |
| 7 | R0001 | A0002 | A0003 | 1320 | 480 |
| 8 | R0001 | A0003 | A0002 | 173 | 476 |
| 9 | R0001 | A0003 | A0002 | 251 | 285 |
| 10 | R0001 | A0003 | A0002 | 164 | 152 |
| 11 | R0001 | A0002 | A0003 | 1320 | 154 |
| 12 | R0001 | A0002 | A0003 | 1243 | 284 |
| 13 | R0001 | A0002 | A0003 | 1500 | 478 |
| 14 | R0001 | A0002 | A0003 | 1500 | 153 |
| 15 | R0001 | A0003 | A0002 | 0 | 478 |
| 16 | R0001 | A0003 | A0002 | 0 | 153 |
| 17 | R0001 | A0004 | – | 1343 | 196 |
| 18 | R0001 | A0004 | – | 125 | 64 |
| 19 | R0001 | A0004 | – | 267 | 192 |
| 20 | R0001 | A0004 | – | 895 | 92 |
| 21 | R0001 | A0004 | – | 1500 | 130 |
| 22 | R0001 | A0004 | – | 0 | 130 |
| 23 | R0001 | A0004 | – | 1500 | 0 |
| 24 | R0001 | A0004 | – | 0 | 0 |
| ... | ... | ... | ... | ... | ... |

FIG. 18

| No | AREA ID | COMMON AREA ID | NUMBER OF PERSONS | TARGET DATE AND TIME |
|---|---|---|---|---|
| 1 | A0001 | - | 3 | 20180615 11:30:00 |
| 2 | A0002 | A0003 | 4 | 20180615 11:30:00 |
| 3 | A0003 | A0002 | 1 | 20180615 11:30:00 |
| 4 | A0004 | - | 3 | 20180615 11:30:00 |
| 5 | A0005 | ... | ... | ... |
| ... | ... | ... | ... | ... |

CONTROL SYSTEM, METHOD OF PERFORMING ANALYSIS AND STORAGE MEDIUM

CROSS-REFERENCE TO RELATED APPLICATIONS

This application claims priority pursuant to 35 U.S.C. § 119 (a) to Japanese Patent Application Nos. 2018-219567, filed on Nov. 22, 2018, and 2018-219578 filed on Nov. 22, 2018 in the Japan Patent Office, the disclosures of which are incorporated by reference herein in their entirety.

BACKGROUND

Technical Field

This disclosure relates to a control system, an information processing system, and a method of performing an analysis, and a storage medium.

Background Art

Image data captured at various locations are used to analyze behavior of persons, such as staying and moving of persons, and analysis results are used for various purposes, such as store management, product design, road maintenance, crime prevention, or the like. For example, monitoring systems combining a monitoring camera and image processing technology are known.

Further, the monitoring systems including the monitoring camera and image processing technology can be used to count the number of persons at a pre-set measurement position, referred to as counting line, to determine whether one or more persons passes through the counting line. Since the number of persons entering and exiting given locations, such as stores and event halls, can be counted from image data captured at the given locations using the monitoring systems, the congestion situation at the given locations can be recognized

SUMMARY

As one aspect of the present invention, a control system of performing an analysis in a specific space is devised. The control system includes circuitry configured to receive image data corresponding to captured image captured and transmitted from an image capturing device, store, in a memory, the received image data and coordinates of a movable object that indicate a position of the movable object included in the image data in association with each other, the movable object being one or more movable objects, in response to displaying an image generated from the stored image data on a display, receive an input for setting a specific closed region in the image displayed on the display, and measure the movable object within the specific closed region in the image based on coordinates of the specific closed region set by the received input, and the stored coordinates of the movable object.

As another aspect of the present invention, a method of performing an analysis in a specific space is devised. The method includes receiving image data corresponding to captured image captured and transmitted from an image capturing device, storing, in a memory, the received image data and coordinates that indicate a position of the movable object included in the image data in association with each other, the movable object being one or more movable objects, in response to displaying an image generated from the stored image data on a display, receiving an input for setting a specific closed region in the image displayed on the display, and measuring the movable object within the specific closed region set in the image based on coordinates of the specific closed region set by the received input, and the stored coordinates of the movable object.

As another aspect of the present invention, a non-transitory computer readable storage medium storing one or more instructions that, when executed by one or more processors, cause the one or more processors to perform a method of performing an analysis in a specific space is devised. The method includes receiving image data corresponding to captured image captured and transmitted from an image capturing device, storing, in a memory, the received image data and coordinates that indicate a position of the movable object included in the image data in association with each other, the movable object being one or more movable objects, in response to displaying an image generated from the stored image data on a display, receiving an input for setting a specific closed region in the image displayed on the display, and measuring the movable object within the specific closed region set in the image based on coordinates of the specific closed region set by the received input, and the stored coordinates of the movable object.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 1A is a left side view of an image capturing device;

FIG. 1B is a front view or rear view of an image capturing device;

FIG. 1C is a plan view of an image capturing device;

FIG. 1D is a bottom view of an image capturing device;

FIG. 4A is an illustration of how an equirectangular projection image covers a surface of a sphere;

FIG. 4B is a view illustrating a full view spherical image;

FIG. 5 is a view illustrating a position of a virtual camera and a pre-set region when a full view spherical image is represented as a three-dimensional sphere;

FIG. 15 is a conceptual diagram illustrating an example of an image management table according to the first embodiment;

FIG. 16 is a conceptual diagram illustrating an example of a person-related information management table according to the first embodiment.

FIG. 17 is a conceptual diagram illustrating an example of an area information management table according to the first embodiment.

FIG. 18 is a conceptual diagram illustrating an example of measured-person-related information management table according to the first embodiment;

DETAILED DESCRIPTION

Figure 2:
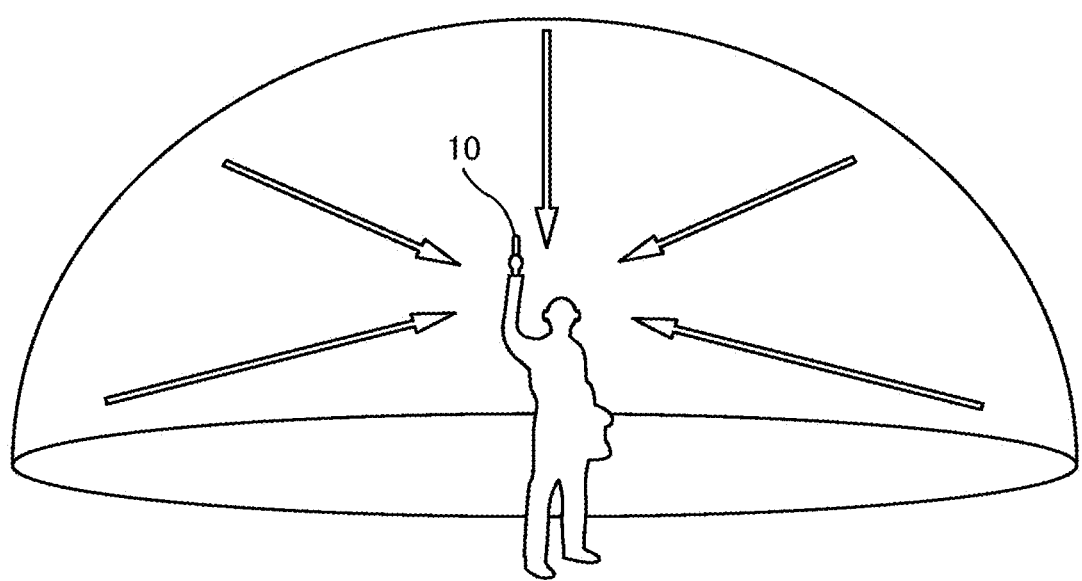
FIG. 2 is an illustration how a user uses an image capturing device.

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of the present invention with reference the accompanying drawings. In the description of drawings, the same elements are denoted by the same reference numerals, and overlapped description may be omitted.

EMBODIMENTS

Hereinafter, a description is given of one or more embodiments of the present invention. At first, a description is given of a method of generating a full-view spherical image with reference to FIGS. 1 to 7.

Hereinafter, a description is given of an external view of an image capturing device 10 with reference to FIGS. 1A to 1D. In this description, the image capturing device 10 is, for example, a digital camera used for capturing and acquiring source images to generate panoramic images, such as full-view spherical images (e.g., 360-degree panoramic images). FIG. 1A is a left side view of the image capturing device 10. FIG. 1B is a front view or rear view of the image capturing device 10. FIG. 1C is a plan view of the image capturing device 10. FIG. 1D is a bottom view of the image capturing device 10.

As illustrated in FIGS. 1A to 1D, a fisheye lens 102a is provided on a front side (anterior side) of an upper portion of the image capturing device 10, and a fisheye lens 102b is provided on a back side (rear side) of the upper portion of the image capturing device 10. Further, as illustrated in FIG. 1A, an imaging element 103a, corresponding to the fisheye lens 102a, is provided inside the image capturing device 10 as an image sensor, and an imaging element 103b, corresponding to the fisheye lens 102b, is provided inside the image capturing device 10 as an image sensor, to be described later. The image capturing device 10 can acquire an image captured by the fisheye lens 102a and the imaging element 103a as a curved hemispherical image (front side) having an angel of view of 180-degree or more, and an image captured by the fisheye lens 102b and the imaging element 103b as a curved hemispherical image (rear side) having an angel of view of 180-degree or more.

Further, as illustrated in FIG. 1, the image capturing device 10 includes, for example, an operation unit 115, such as a shutter button 115a, provided on the back side or rear side of the image capturing device 10. Further, as illustrated in FIG. 1, a power button 115b, a wireless fidelity (Wi-Fi: registered trademark) button 115c, and a capture mode switching button 115d are provided on a side face of the image capturing device 10. Each of the power button 115b and the Wi-Fi button 115c is switched between ON-state and OFF-state each time the respective button is pressed. Further, the capture mode switching button 115d is switched between a capture mode of still image and a capture mode of movie image each time the capture mode switching button 115d is pressed. The shutter button 115a, the power button 115b, the Wi-Fi button 115c and the capture mode switching button 115d are some part of the operation unit 115. The operation unit 115 is not limited to these buttons.

Further, a tripod screw hole 151 for attaching the image capturing device 10 to a camera tripod is provided at the center of a bottom face 150 of the image capturing device 10. Further, a micro universal serial bus (USB: registered trademark) terminal 152 is provided on the left end of the bottom face 150. Further, a high definition multimedia interface (HDMI: registered trademark) terminal 153 is provided at the right end of the bottom face 150.

Hereinafter, a description is given of a situation when the image capturing device 10 is used with reference to FIG. 2. FIG. 2 is an illustration how a user uses the image capturing device 10. As illustrated in FIG. 2, for example, the image capturing device 10 is used for capturing one or more objects surrounding the user who is holding the image capturing device 10 in his or her hand. In this situation, the imaging elements 103a and 103b illustrated in FIG. 1 can capture the objects surrounding the user to acquire two hemispherical images.

Figure 3A:
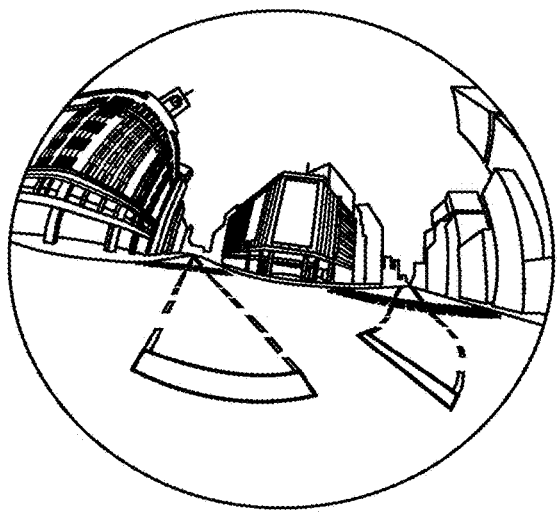
FIG. 3A is a view illustrating a hemispherical image at a front side captured by an image capturing device.
Figure 3B:
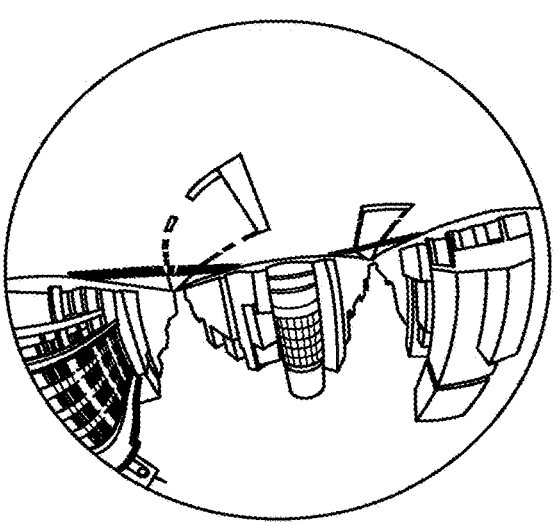
FIG. 3B is a view illustrating a hemispherical image at a back side captured by an image capturing device.
Figure 3C:
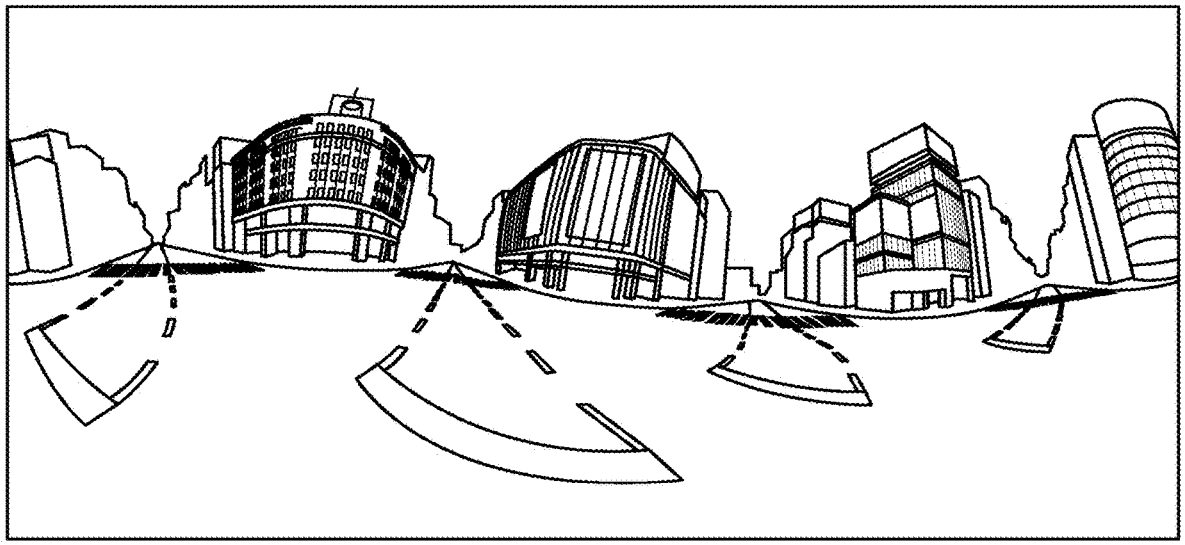
FIG. 3C is a view illustrating an image represented by an equirectangular projection method.

Hereinafter, a description is given of an overview of an operation of generating an equirectangular projection image EC and a full-view spherical image CE from images captured by the image capturing device 10 with reference to FIGS. 3A, 3B, 3C and 4. FIG. 3A is a view illustrating a hemispherical image at a front side captured by the image capturing device 10. FIG. 3B is a view illustrating a hemispherical image at a back side captured by the image capturing device 10. FIG. 3C is a view illustrating an image represented by equirectangular projection method or Mercator projection method. Hereinafter, the image represented indicated in FIG. 3C may be referred to as "Mercator image" or "equirectangular projection image." FIG. 4A is an illustration of how an equirectangular projection image covers a surface of a sphere. FIG. 4B is a view illustrating a full view spherical image or full view spherical panoramic image.

Figure 10:
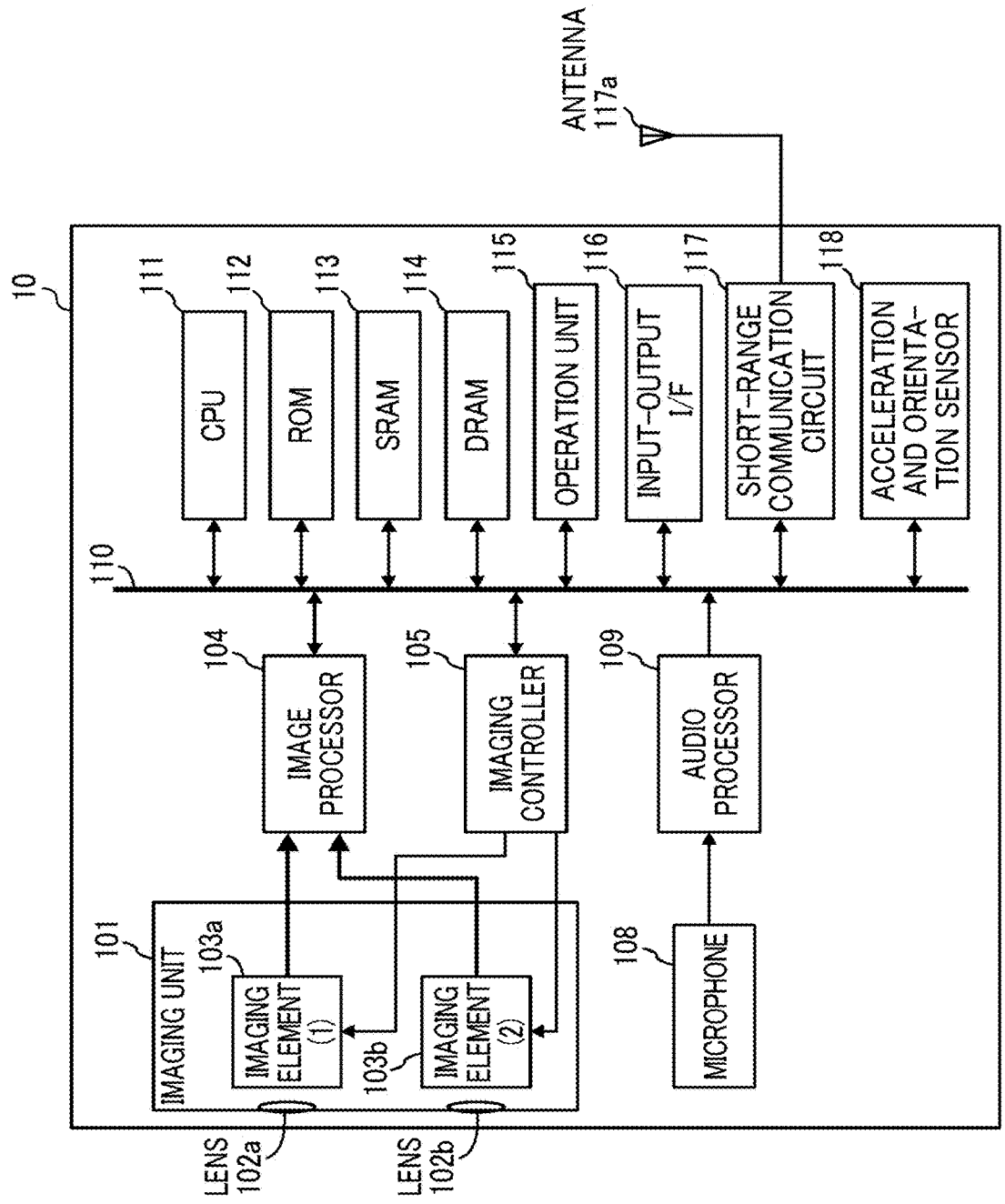
FIG. 10 is an example block diagram of a hardware configuration of an image capturing device according to the first embodiment.

As indicated in FIG. 3A, an image captured by imaging element 103a is a curved hemispherical image (front side) taken through the fisheye lens 102a to be described later (FIG. 10). Also, as indicated in FIG. 3B, an image captured by the imaging element 103b is a curved hemispherical image (back side) taken through the fisheye lens 102b to be described later (FIG. 10). The image capturing device 10 combines one hemispherical image (front face) and another hemispherical image (rear side) inverted by 180 degrees to generate the equirectangular projection image EC indicated in FIG. 3C.

Then, as indicated in FIG. 4A, the equirectangular projection image EC is attached to a sphere surface in such a manner that the sphere surface is covered with the equirectangular projection image EC using Open Graphics Library for Embedded Systems (OpenGLES) to generate the full-view spherical image CE indicated in FIG. 4B. Thus, the full-view spherical image CE is represented as an image in which the equirectangular projection image EC is directed toward the center of the sphere. The OpenGLES is a graphics library used for visualizing two-dimensional (2D) and three-dimensional (3D) data. The full-view spherical image CE can be still image or movie image.

As described above, since the full-view spherical image CE is an image attached to cover the spherical surface, so that one may feel strange viewing the full view spherical image. Therefore, the image capturing device 10 can be configured to display a partial pre-set region (hereinafter, "pre-set region image") of the full-view spherical image CE as a planar image with less curvature to resolve this strange feeling. Hereinafter, a description is given of displaying the pre-set region image with reference to FIG. 5 and FIGS. 6A and 6B.

Figure 6A:
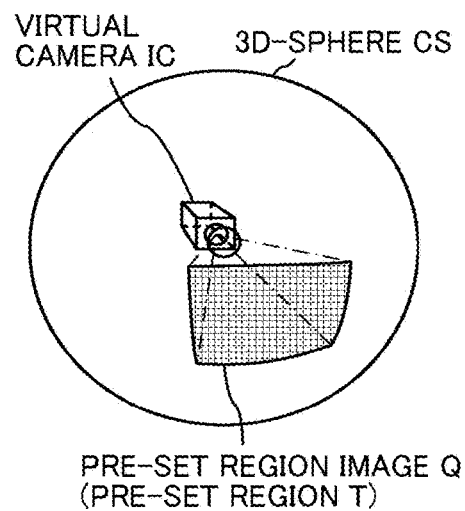
FIG. 6A is a perspective view of FIG. 5.
Figure 6B:
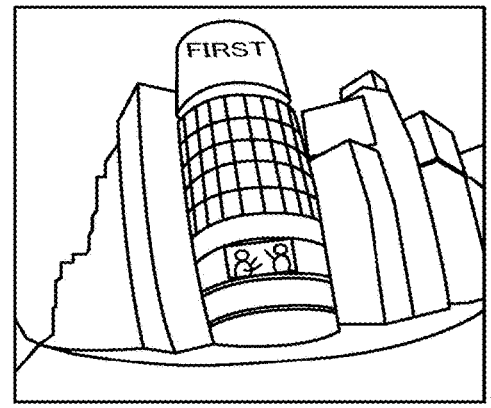
FIG. 6B is an example of a pre-set region image displayed on a display.

FIG. 5 is a view illustrating a position of a virtual camera IC and a pre-set region T when a full view spherical image is represented as a three-dimensional sphere. The virtual camera IC corresponds to a position of view point of a user who is viewing the full view spherical image CE represented as the three-dimensional sphere. FIG. 6A is a perspective view of FIG. 5. FIG. 6B is an example of a pre-set region image displayed on a display. In FIG. 6A, the full view spherical image CE indicated in FIG. 4B is represented as a three-dimensional sphere CS (3D-sphere CS). As indicated in FIG. 5, the virtual camera IC is set inside the full-view spherical image CE when it is assumed that the full-view spherical image CE is the 3D-sphere CS. The pre-set region T in the full view spherical image CE is an imaging range of the virtual camera IC. The pre-set region T is specified by pre-set region information indicating an imaging direction and an angle of view of the virtual camera IC in the three-dimensional virtual space including the full view spherical image CE.

Then, a pre-set region image Q indicated in FIG. 6A is displayed as an image of the imaging range of the virtual camera IC on a display as indicated in FIG. 6B. The image indicated in FIG. 6B is a pre-set region image represented by the pre-set region information defined by an initial setting (default). Hereinafter, the imaging direction (ea, aa) and the angle of view ($\alpha$) of the virtual camera IC are described.

Figure 7:
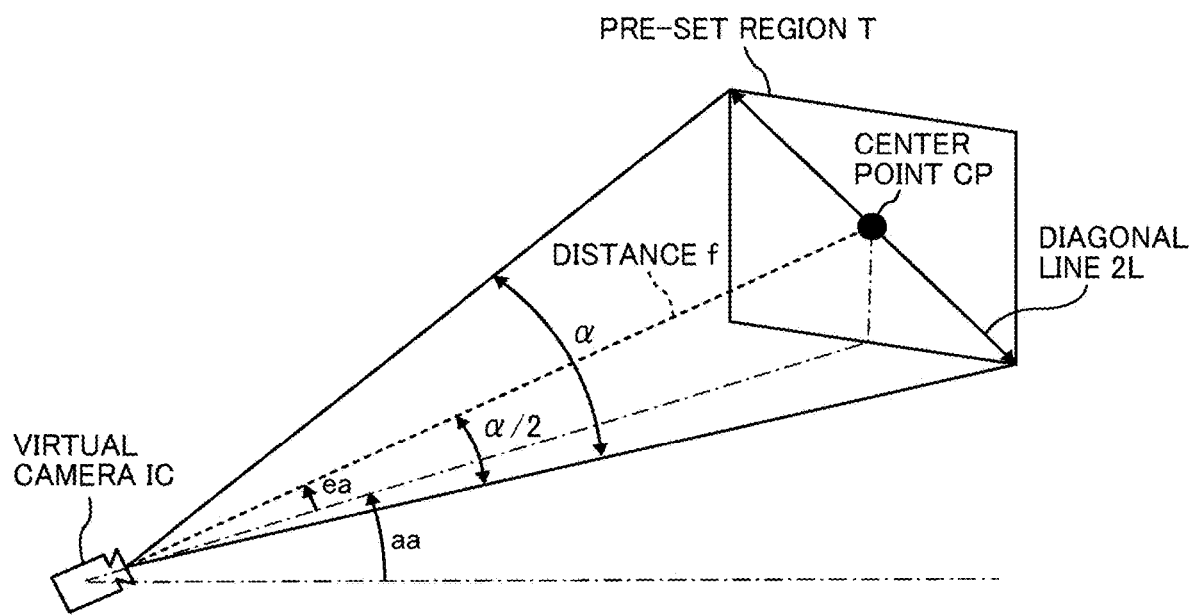
FIG. 7 illustrates a relationship between pre-set region information and an image of pre-set region.

Hereinafter, a description is given of a relationship between the pre-set region information and an image of the pre-set region T with reference to FIG. 7. FIG. 7 illustrates a relationship between the pre-set region information and the image of the pre-set region T. In FIG. 7, "ea" denotes an elevation angle, "aa" denotes an azimuth angle, and "$\alpha$" denotes an angle of view. That is, the posture of the virtual camera IC is changed so that the focal point of the virtual camera IC indicated by the imaging direction (ea, aa)

becomes a center point CP of the pre-set region T, which is the imaging range of the virtual camera IC. The pre-set region image Q is an image of the pre-set region T in the full-view spherical image CE. In FIG. 7, "f" denotes a distance from the virtual camera IC to the center point CP. "L" is a distance between any vertex of the pre-set region T and the center point CP (2L is a diagonal line). In FIG. 7, a trigonometric function equation expressed by the following equation (1) is satisfied.

$$L/f=\tan(\alpha/2)\quad(1)$$

First Embodiment

Hereinafter, a description is given of a system configuration of an information processing system 1 according to a first embodiment with reference to FIGS. 8 to 33. The following description describes an example of capturing a full-view spherical image by the image capturing device 10, but not limited thereto. For example, the image captured by the image capturing device 10 can be any image, such as normal planar image.

System Configuration

Figure 8:
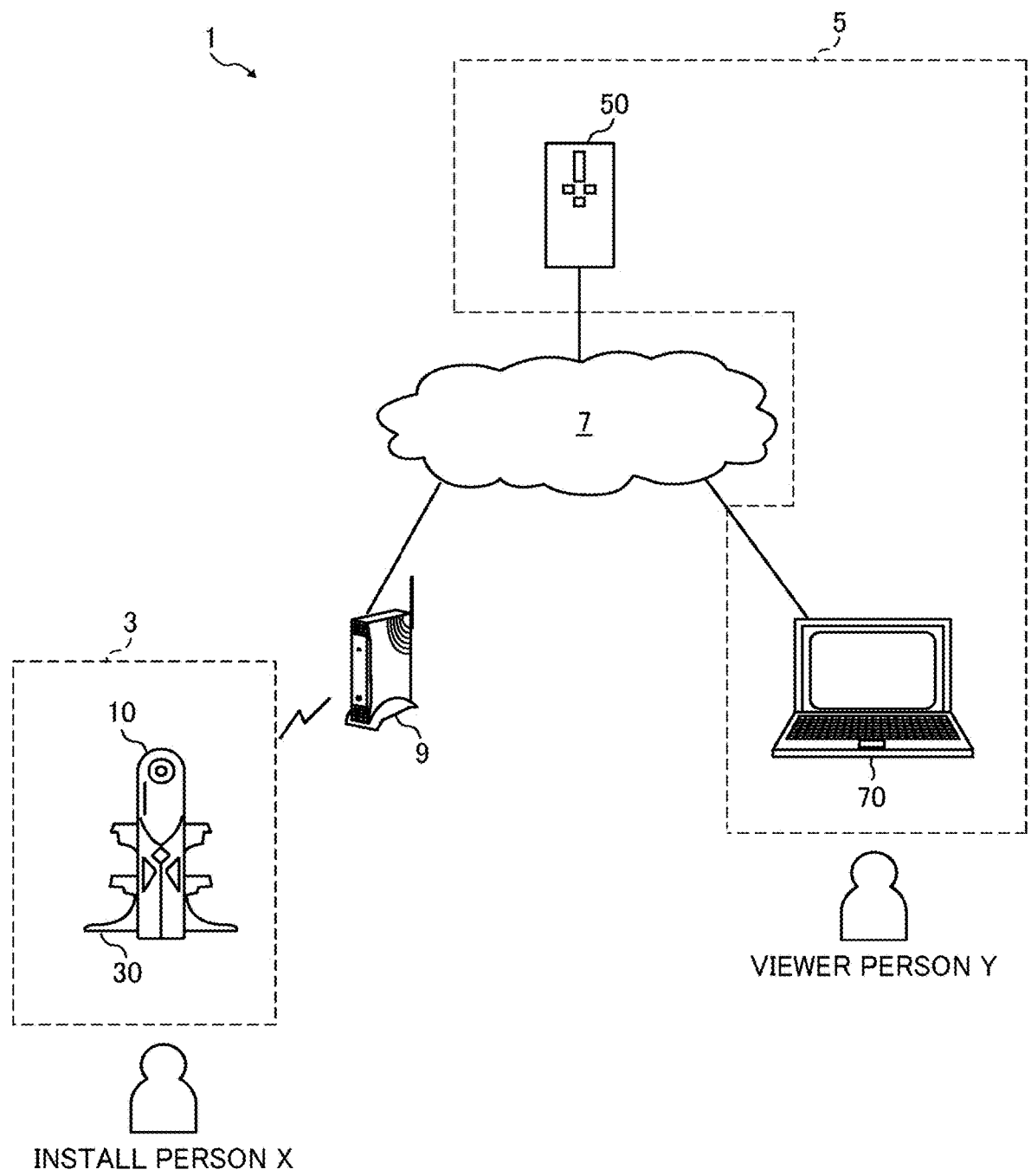
FIG. 8 is an example system configuration of an information processing system according to a first embodiment.

Hereinafter, a description is given of a system configuration of the information processing system 1 according to the first embodiment with reference to FIG. 8. FIG. 8 is an example system configuration of the information processing system 1 according to the first embodiment. The information processing system 1 (FIG. 8) is designed as a system for performing analysis in a specific space based on images of objects in the specific space captured by the image capturing device 10. Further, the information processing system 1 can perform analysis in any area without taking too much time for preparing settings of the analysis.

As indicated in FIG. 8, the information processing system 1 includes, for example, the image capturing device 10, a communication terminal 30, a wireless router 9, a control server 50, and a display terminal 70.

As described above, the image capturing device 10 is a digital camera capable of acquiring panoramic images, such as full-view spherical images (e.g., 360-degree panoramic images). The image capturing device 10 may be a typical digital camera. In a case that communication terminal 30 includes a camera, the communication terminal 30 cam be used as the digital camera. In this speciation, a description is given of a case that the image capturing device 10 is a digital camera capable of acquiring the full view spherical image, in order to make the description simple.

The communication terminal 30 is an example of cradle type of communication terminal, which can charge the image capturing device 10 and transits and receives data with the image capturing device 10. The communication terminal 30 communicates data with the image capturing device 10 via a contact point, and also communicates data with the control server 50 via the wireless router 9 and the communication network 7. The communication network 7 is, for example, the Internet.

The image capturing device 10 and the communication terminal 30 may configure an image capturing system 3 (or imaging system 3). The image capturing system 3 configured by the image capturing device 10 and the communication terminal 30 can be configured using one device or terminal equipped with functions of the image capturing device 10 and the communication terminal 30.

The control server 50 is, for example, one or more server computers that can communicate with the communication terminal 30 and the display terminal 70 via the communication network 7. The control server 50 is installed with Open Graphics Library for Embedded Systems (OpenGLES) used for creating panoramic image, such as full-view spherical image. Further, the control server 50 generates thumbnail data of an image corresponding to a part of the full view spherical image, which is to be described later as a pre-set region image or specific region image, to provide the thumbnail data and captured image data to the display terminal 70.

The display terminal 70 is, for example, a notebook personal computer (PC), and can communicate with the control server 50 via the communication network 7. The control server 50 can be configured using a single server computer or a plurality of server computers. The display terminal 70 can be a smart phone, a tablet PC, a desktop PC, or the like, as well as the notebook PC.

Further, the image capturing device 10, the communication terminal 30 and the wireless router 9 are set at given positions in any locations, such as sales stores of clothing, by an install person X. The display terminal 70 is set, for example, in a headquarter managing each one of the sales stores. The display terminal 70 is used to display images, captured at each one of the sales stores and transmitted via the control server 50 so that a viewer person Y can view images representing a status of specific space (situation) in the each location. The image representing the status of each location is hereinafter referred to as "location status image."

The control server 50 is provided at, for example, a service company that provides services, such as generating thumbnail data based on the captured image data transmitted from the communication terminal 30 disposed at each location, and provides the thumbnail data and captured image data to the display terminal 70. The location for disposing the image capturing device 10 is not limited to the above described sales store location, but can be any locations, such as event sites, roads, or the like, which can be set as the target of performing the flow line analysis, to be described later. The control server 50 and the display terminal 70 can be collectively configured as a control system 5.

Hereinafter, a description is given of an example case of analyzing an analysis target, such as measuring flow lines of persons existing in a location, but the analysis is not limited to the measurement of the flow line and numbers of persons. For example, the information processing system 1 can be used to analyze staying time, staying pattern, height (size), sex, estimated age, and behavior (movement) of persons. Further, the analysis target is not limited to persons, but can be any particular or specific movable object, such as vehicle and robot. Further, the particular or specific movable object may include a specific analysis target, such as products or goods displayed on shelf, which can be moved by a person. Hereinafter, the particular or specific movable object may mean one or more particular or specific movable objects in this specification. The control system 5 configured by the control server 50 and the display terminal 70 can be configured using one apparatus or terminal equipped with functions of the control server 50 and the display terminal 70. In this description, the measurement may mean various processing, such as counting the number of objects (e.g., persons) existing in a location, calculating staying time, detecting staying pattern, height (size), characters (e.g., estimated age), and behavior (movement) of objects (e.g., persons) in the location.

Processing in Information Processing System

Figure 9:
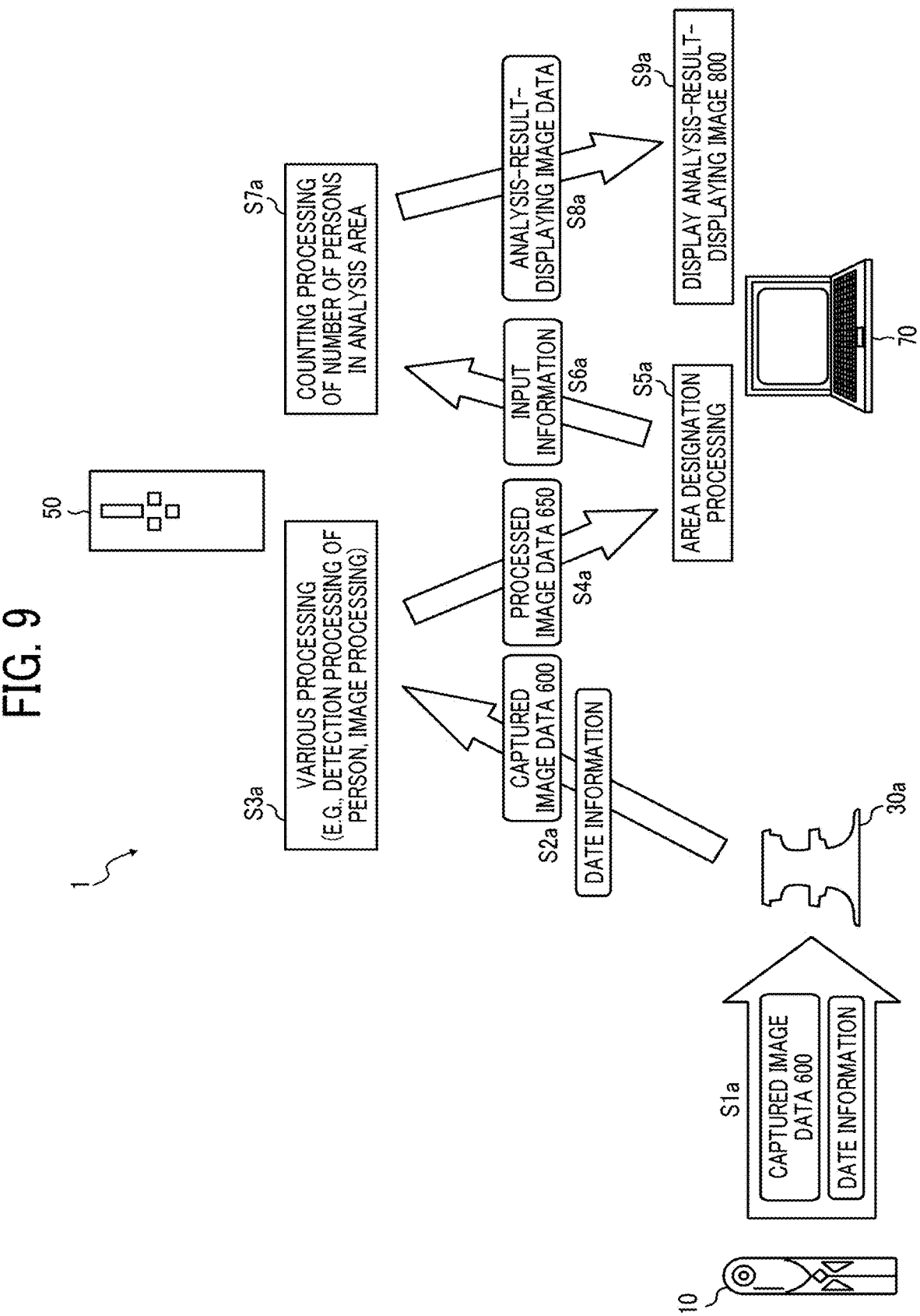
FIG. 9 is an example of an outline of processing in an information processing system according to the first embodiment.

Hereinafter, a description is given of an outline of processing in the information processing system 1 according to the first embodiment with reference to FIG. 9. FIG. 9 is an example of an outline of processing in the information processing system 1 according to the first embodiment.

At first, the communication terminal 30 receives, from the image capturing device 10, captured image data 600 including one or more images of objects existing in a specific space captured by the image capturing device 10, and date information indicating date and time when the one or more images are captured by the image capturing device 10 (step S1a). Hereinafter, the image may mean one or more images.

Then, the communication terminal 30 transmits the received captured image data 600 and the date information to the control server 50 (step S2a).

Then, the control server 50 detects one or more images of one or more objects (e.g., persons) included in the received captured image data 600 and detects coordinates of the one or more objects (e.g., persons) indicating one or more positions in the captured image data 600 for the detected one or more persons (step S3a). Further, the control server 50 applies given image processing, such as the blur processing to the image data of detected one or more objects (e.g., persons) to generate processed image data 650 (step S3a). Hereinafter, for the simplicity of description, the one or more images may be referred to as the image and the one or more persons may be referred to as the person, and the detected coordinates of one or more persons may be referred to as the person coordinates.

Then, the control server 5 transmits the processed image data 650 to the display terminal 70 (step S4a).

Then, the display terminal 70 performs an area designation processing to an image corresponding to the received processed image data 650 (step S5a). Specifically, the display terminal 70 can be configured to receive information corresponding to an input operation performed on the image being displayed on the display 708 to set an analysis area.

Then, the display terminal 70 transmits the received input information to the control server 50 (step S6a).

Then, the control server 50 performs measuring processing of the person, such as counting processing of the number of persons, in the analysis area based on the received input information (step S7a). Specifically, the control server 50 sets an analysis area to be used for performing a flow line analysis based on the received input information. Then, the control server 50 measures the person, such as counts the number of persons, in the set analysis area based on the coordinates of person detected in step S3a and area coordinates of the set analysis area.

Then, the control server 50 transmits image data of analysis result (hereinafter, analysis-result-displaying image data) generated using data of the number of persons measured in the set analysis area per time zone, to the display terminal 70 (step S8a).

Then, the display terminal 70 displays an analysis-result-displaying image 800 corresponding to the received analysis-result-displaying image data on the display 708 (step S9a). The analysis-result-displaying image 800 will be described in detail later with reference to FIG. 26.

With this configuration, in the information processing system 1, the analysis area where the viewer person Y wants to analyze can be set without taking too much time for preparing settings for performing the flow line analysis before or after capturing images using the image capturing device 10. Further, as to the information processing system 1, since the time required for setting preparation for performing the flow line analysis can be set shorter, the installation time of the image capturing device 10, the communication terminal 30 and the related equipment can be set shorter, thereby reducing the installation cost. Further, since the analysis area can be designated in line with the intention of the viewer person Y, reworking such as re-analysis can be avoided or prevented. As above described, the information processing system 1 can perform the flow line analysis in any area without taking too much time for preparing settings of the flow line analysis.

Further, if the captured image acquired by the image capturing device 10 is a full-view spherical image, and the analysis area is set in step S7a in the information processing system 1, the full-view spherical image (e.g., full-view spherical image CE in FIG. 4) is converted into a planar image (e.g., equirectangular projection image EC in FIG. 4), and coordinates on the planar image, corresponding to the input information received for the full-view spherical image, are calculated. This coordinates calculation is performed because if a user designates an area in the full-view spherical image, which crosses over a boundary of the planar image, the control server 50 cannot draw or set the designated area on the planar image. With this configuration, as to the information processing system 1, any area on the full-view spherical image designated by a user can be set as the analysis area for the flow line analysis using the full-view spherical image. Hardware Configuration:

Hereinafter, a description is given of hardware configurations of the image capturing device 10, the communication terminal 30, the control server 50, and the display terminal 70 according to the first embodiment with reference to FIGS. 10 and 13. The hardware configurations indicated in FIGS. 10 and 13 may have the same configuration in each embodiment, and the components may be added or deleted if necessary.

Hardware Configuration of Image Capturing Device

Hereinafter, a description is given of a hardware configuration the image capturing device 10 with reference to FIG. 10. FIG. 10 is an example block diagram of a hardware configuration of the image capturing device 10 according to the first embodiment. Although a description is given of a case that the image capturing device 10 is an omnidirectional image capturing device having two imaging elements, the image capturing device 10 can include three or more imaging elements. Further, the image capturing device 10 is not necessarily an image capturing device dedicated to omnidirectional image capturing. Alternatively, an external omnidirectional image capturing unit can be attached to a general digital camera or smartphone to implement an image capturing device having a substantially same function as that of the image capturing device 10.

As indicated in FIG. 10, the image capturing device 10 includes, for example, an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input-output interface (UF) 116, a short-range communication circuit 117, an antenna 117a, and an acceleration and orientation sensor 118.

The imaging unit 101 includes the two fish-eye lenses 102a and 102b, such as wide-angle lenses, each having an angle of view of equal to or greater than 180 degrees to form a hemispheric image. The imaging unit 101 further includes the two imaging elements 103a and 103b corresponding to the two fish-eye lenses 102a and 102b respectively.

Each of the imaging elements 103a and 103b includes an image sensor, such as a complementary metal oxide semiconductor (CMOS) sensor or a charge-coupled device (CCD) sensor, a timing generation circuit, and a group of registers. The image sensor converts an optical image formed by the fisheye lenses 102a and 102b (i.e., wide-angle lenses) into electric signals to output image data. The timing generation circuit generates horizontal and vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. Further, each of the imaging elements 103a and 103b of the imaging unit 101 is connected to the imaging controller 105 via a serial I/F bus such as inter-integrated circuit (I²C) bus.

The image processor 104 and the imaging controller 105 are connected to the CPU 111 via a bus 110. Further, the ROM 112, the SRAM 113, the DRAM 114, the operation unit 115, the input-output I/F 116, the short-range communication circuit 117, and the acceleration and orientation sensor 118 are also connected to the bus 110.

The image processor 104 acquires the image data from each of the imaging elements 103a and 103b via the parallel I/F bus. Then, the image processor 104 performs given processing on the image data and synthesizing the image data to generate data of the equirectangular projection image indicated in FIG. 3C.

The imaging controller 105 usually functions as a master device while each of the imaging elements 103a and 103b usually functions as a slave device. The imaging controller 105 sets commands and the like in the group of registers of the imaging elements 103a and 103b via the I2C bus. The imaging controller 105 receives required commands and the like from the CPU 111. Further, the imaging controller 105 acquires status data and the like of the group of registers of the imaging elements 103a and 103b via the I2C bus. Then, the imaging controller 105 transmits the acquired status data to the CPU 111.

The imaging controller 105 instructs the imaging elements 103a and 103b to output the image data at a time when a shutter button of the operation unit 115 is pressed. The image capturing device 10 may have a preview function and a function for displaying still image and movie image using a display (e.g., display 708 of the display terminal 70). In a case of movie image, the image data are continuously output from the imaging elements 103a and 103b at a pre-set frame rate (frames per minute).

Further, to be described later, the imaging controller 105 operates in cooperation with the CPU 111 to synchronize the output timing of the image data of the imaging elements 103a and 103b. In the embodiment, the image capturing device 10 does not have a display, but the image capturing device 10 can be provided with the display.

The microphones 108 collects sound from the surroundings of the image capturing device 10 and converts the collected sound into audio data (signal). The audio processor 109 acquires the audio data output from the microphone 108 via an IN bus and performs given processing on the audio data. The microphone 108 configures a sound collecting unit that collects sound from the surrounding environment. Further, although FIG. 10 indicates a case that the microphone 108 is embedded in the image capturing device 10, the microphone 108 can be externally attached to the image capturing device 10. Further, the number of microphones 108 is not limited to one, but a plurality of microphones having a pre-set arrangement can be set. Preferably, the microphone 108 is an ambisonics microphone.

The CPU 111 controls an entire operation of the image capturing device 10 and performs necessary processing. The ROM 112 stores various programs for the CPU 111. The SRAM 113 and the DRAM 114 each operates as a work memory to store the program loaded from the ROM 112 for execution by the CPU 111 or data in current processing. In particular, the DRAM 114 stores the image data currently processed by the image processor 104 and data of the equirectangular projection image (Mercator image) on which processing has been performed.

The operation unit 115 collectively refers to various operation keys, a power switch, the shutter button, and a touch panel having functions of both displaying information and receiving input from a user, which may be used in combination. The user operates the operation unit 115 to input various capture modes and capture conditions.

The input-output OF 116 collectively refers to an interface circuit such as a universal serial bus (USB) OF that allows the image capturing device 10 to communicate data with an external media such as a secure digital (SD) card or an external personal computer. The input-output I/F 116 can support wired and wireless communications. The data of equirectangular projection image stored in the DRAM 114 can be recorded on an external medium via the input-output I/F 116, and can be transmitted to an external terminal (device), such as the display terminal 70, via the input-output OF 116 as required.

The short-range communication circuit 117 communicates data with an external terminal (device), such as the display terminal 70, via the antenna 117a provided in the image capturing device 10 using a short-range wireless communication, such as Wi-Fi (registered trademark), near field communication (NFC), or Bluetooth (registered trademark). The short-range communication circuit 117 can transmit the data of equirectangular projection image to the external terminal (device), such as the display terminal 70.

The acceleration and orientation sensor 118 calculates the orientation of the image capturing device 10 from the magnetism of Earth and outputs azimuth information (orientation and tilt information). The azimuth information (orientation and tilt information) is an example of related information, such as meta data described in compliance with exchangeable image file format (Exif), and is used for image processing, such as correcting image of the captured image. Further, the related information also includes date and time when the image is captured by the image capturing device 10, and a data size of image data.

Hardware Configuration of Communication Terminal

Figure 11:
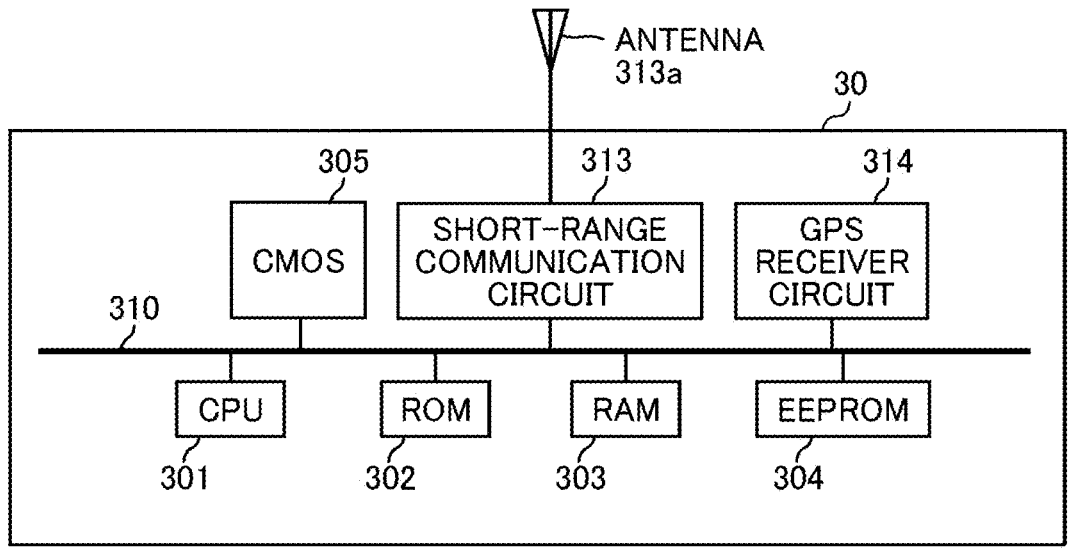
FIG. 11 is an example block diagram of a hardware configuration of a communication terminal using a cradle having a wireless communication function.

Hereinafter, a description is given of a hardware configuration of the communication terminal 30 with reference to FIG. 11. FIG. 11 is an example block diagram of a hardware configuration of the communication terminal 30 using a cradle having a wireless communication function.

As indicated in FIG. 11, the communication terminal 30 includes, for example, a CPU 301, a ROM 302, a RAM 303, an electrically erasable programmable read only memory (EEPROM) 304, and a CMOS sensor 305. The CPU 301 controls entire operation of the communication terminal 30.

The ROM 302 stores basic input/output programs. The CPU 301 uses the RANI 303 as a work area when executing programs or processing data. The EEPROM 304 performs data reading and writing under the control of the CPU 301. The CMOS sensor 305 is an imaging element that captures an image of an object and acquire image data under the control of the CPU 301.

The EEPROM 304 stores an operating system (OS), other programs, and various data to be executed by the CPU 301. Instead of the CMOS sensor 305, a charge-coupled device (CCD) sensor may be used.

Further, the communication terminal 30 includes, for example, an antenna 313a, a short-range communication circuit 313, a global positioning systems (GPS) receiver 314, and a bus line 310. The short-range communication circuit 313 communicates data with other apparatus or terminal, such as the wireless router 9, by wireless communication signals using the antenna 313a. The GPS receiver 314 receives GPS signals including position information of the communication terminal 30 from GPS satellites or an indoor Messaging system as indoor GPS. The position information of communication terminal 30 is represented by, for example, a latitude, longitude, and altitude. The bus line 310 electrically connects those parts or devices of the communication terminal 30 with each other. Examples of the bus line 310 include an address bus and a data bus.

Hardware Configuration of Control Server

Figure 12:
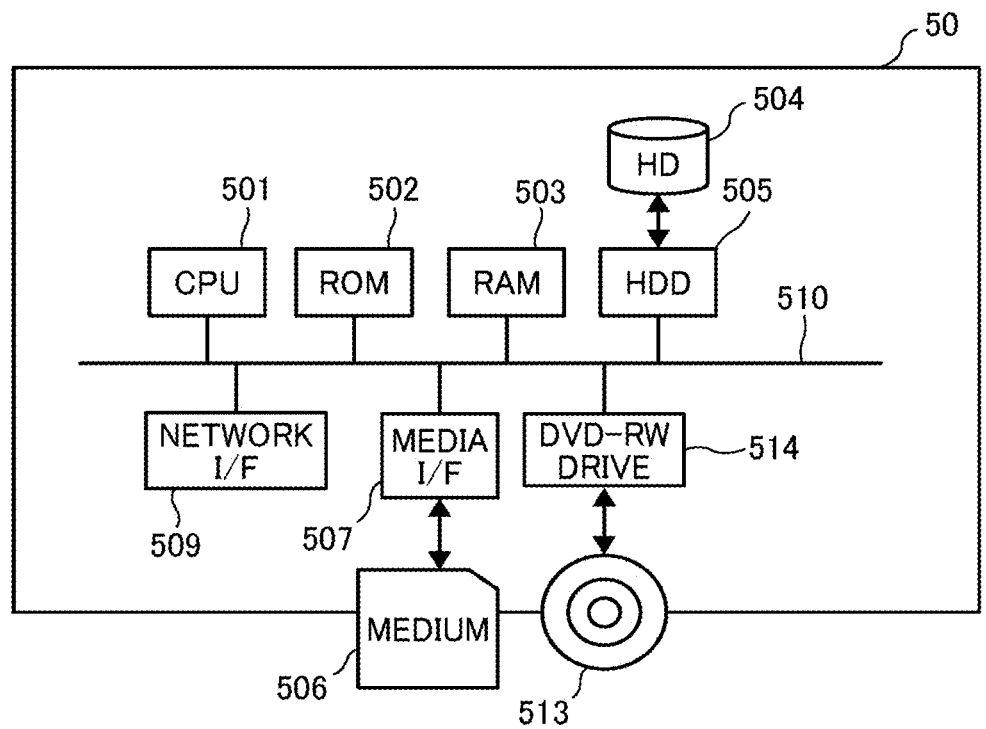
FIG. 12 is an example block diagram of a hardware configuration of a control server according to the first embodiment.

Hereinafter, a description is given of a hardware configuration of the control server 50 with reference to FIG. 12. FIG. 12 is an example block diagram of a hardware configuration of the control server 50 according to the first embodiment.

The control server 50, constructed by one or more computers, includes, for example, a CPU 501, a ROM 502, a RAM 503, an HD 504, a hard disc drive (HDD) 505, a media I/F 507, a network I/F 509, a digital versatile disk rewritable (DVD-RW) drive 514, and a bus line 510 as indicated in FIG. 12.

The CPU 501 controls entire operation of the control server 50. The ROM 502 stores programs such as an initial program loader (IPL) to boot the CPU 501. The CPU 501 uses the RANI 503 as a work area when executing programs or processing data. The HD 504 stores various data such as programs. The HDD 505 controls reading and writing of data from and to the HD 504 under the control of the CPU 501. The media I/F 50 controls reading and writing (storage) of data from and to the recording medium 506, such as a flash memory. The network I/F 509 is an interface used for performing data communication using the communication network 7. The DVD-RW drive 514 controls reading and writing of data from and to a DVD-RW 513, which is as an example of a removable recording medium. In addition to DVD-RW, DVD-R and the like can be used. The DVD-RW drive 514 can be changed to a Blu-ray (registered trademark) drive that controls reading and writing of various data from and to Blu-ray disc.

The control server 50 further includes the bus line 510. The bus line 510, such as an address bus and a data bus, electrically connects the above described parts or devices, such as the CPU 501, with each other as indicated in FIG. 12.

Hardware Configuration of Display Terminal

Hereinafter, a description is given of a hardware configuration of the display terminal 70 with reference to FIG. 13.

Figure 13:
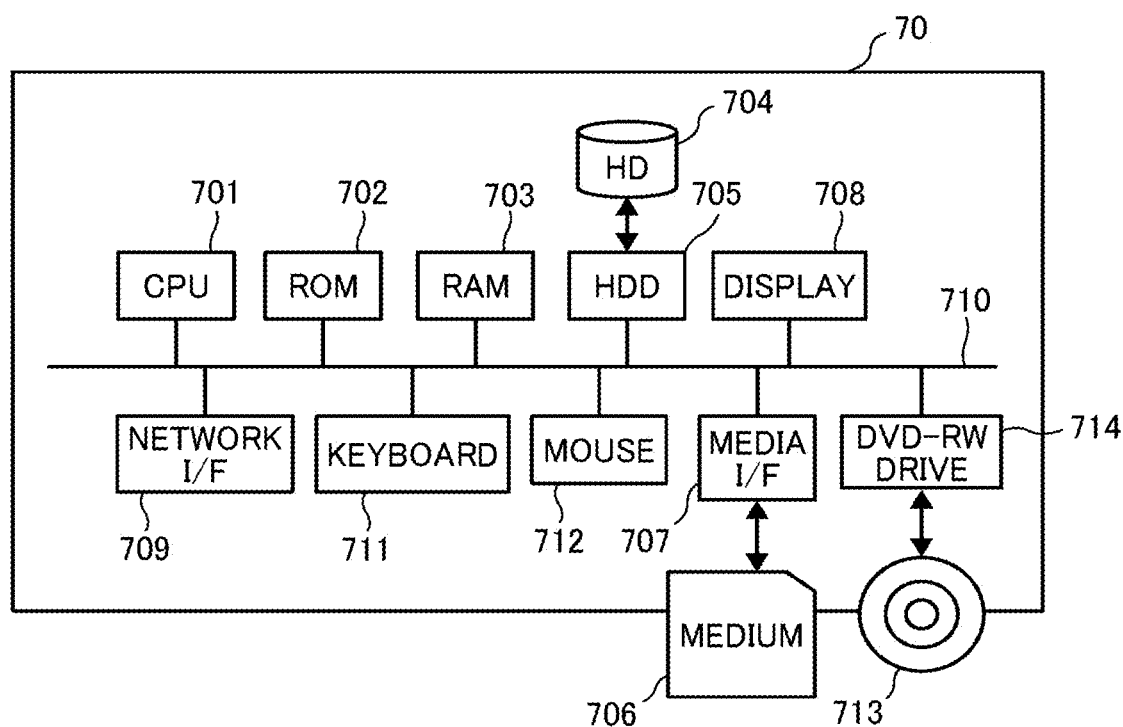
FIG. 13 is an example block diagram of a hardware configuration of a display terminal according to a first embodiment.

FIG. 13 is an example block diagram of a hardware configuration of the display terminal 70 according to the first embodiment. The display terminal 70, constructed by one or more computers, includes, for example, a CPU 701, a ROM 702, a RAM 703, an HD 704, an HDD 705, a recording medium 706, a media I/F 707, a display 708, a network I/F 709, a keyboard 711, a mouse 712, a DVD-RW drive 714, and a bus line 710 as indicated in FIG. 13.

The CPU 701 controls an entire operation of the display terminal 70. The ROM 702 stores programs such as an initial program loader (IPL) to boot the CPU 701. The CPU 701 uses the RAM 703 as a work area when executing programs or processing data. The HD 704 stores various data such as programs. The HDD 705 controls reading and writing of data from and to the HD 704 under the control of the CPU 701. The media 1/F 707 controls reading and writing (storage) data from and to the recording medium 706, such as a flash memory. The display 708 displays various information such as a cursor, a menu, a window, a character, or an image. The display 708 is an example of a display unit. The network I/F 709 is an interface for performing data communication using the communication network 7. The keyboard 711 is a type of input unit equipped with a plurality of keys used for inputting characters, numerals, various instructions, and the like. The mouse 712 is a type of input unit used for selecting and executing various instructions, selecting a process target, moving a cursor, and the like. The DVD-RW drive 714 controls reading and writing of data from and to a DVD-RW 713, which is as an example of a removable recording medium. In addition to DVD-RW, DVD-R and the like can be used. The DVD-RW drive 714 can be changed to a Blu-ray (registered trademark) drive that controls reading and writing of data from and to Blu-ray disc.

The display terminal 70 further includes the bus line 710. The bus line 710, such as an address bus and a data bus, electrically connects the above described parts or devices, such as the CPU 701, with each other as indicated in FIG. 13.

The recording medium such as hard disk (HD) and CD-ROM storing the above-mentioned programs can be provided as program product domestically or overseas.

Functional Configuration of Information Processing System

Figure 14A:
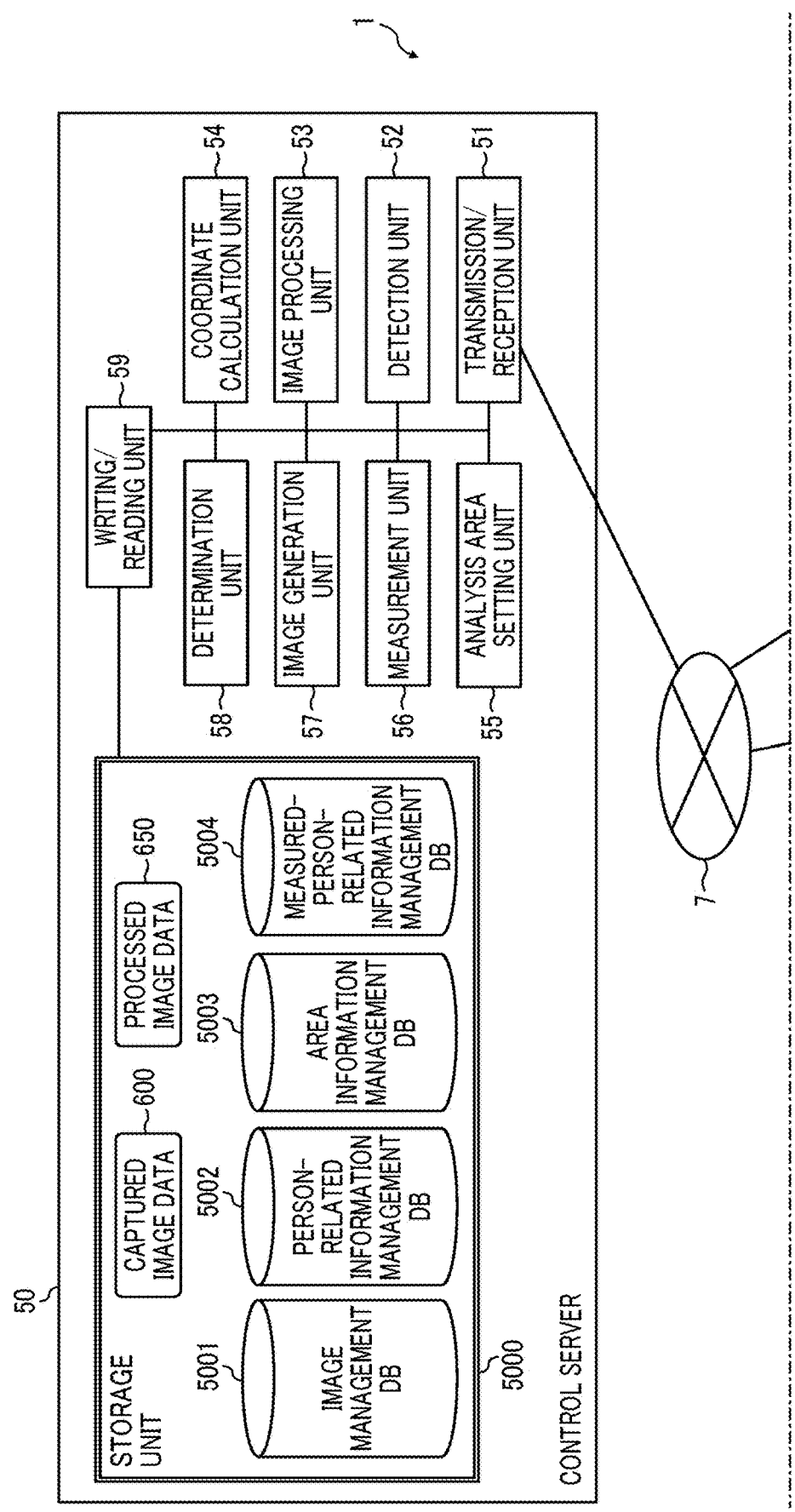
FIGS. 14A and 14B (FIG. 14) is an example block diagram of functional configuration of the information processing system according to the first embodiment.
Figure 14B:
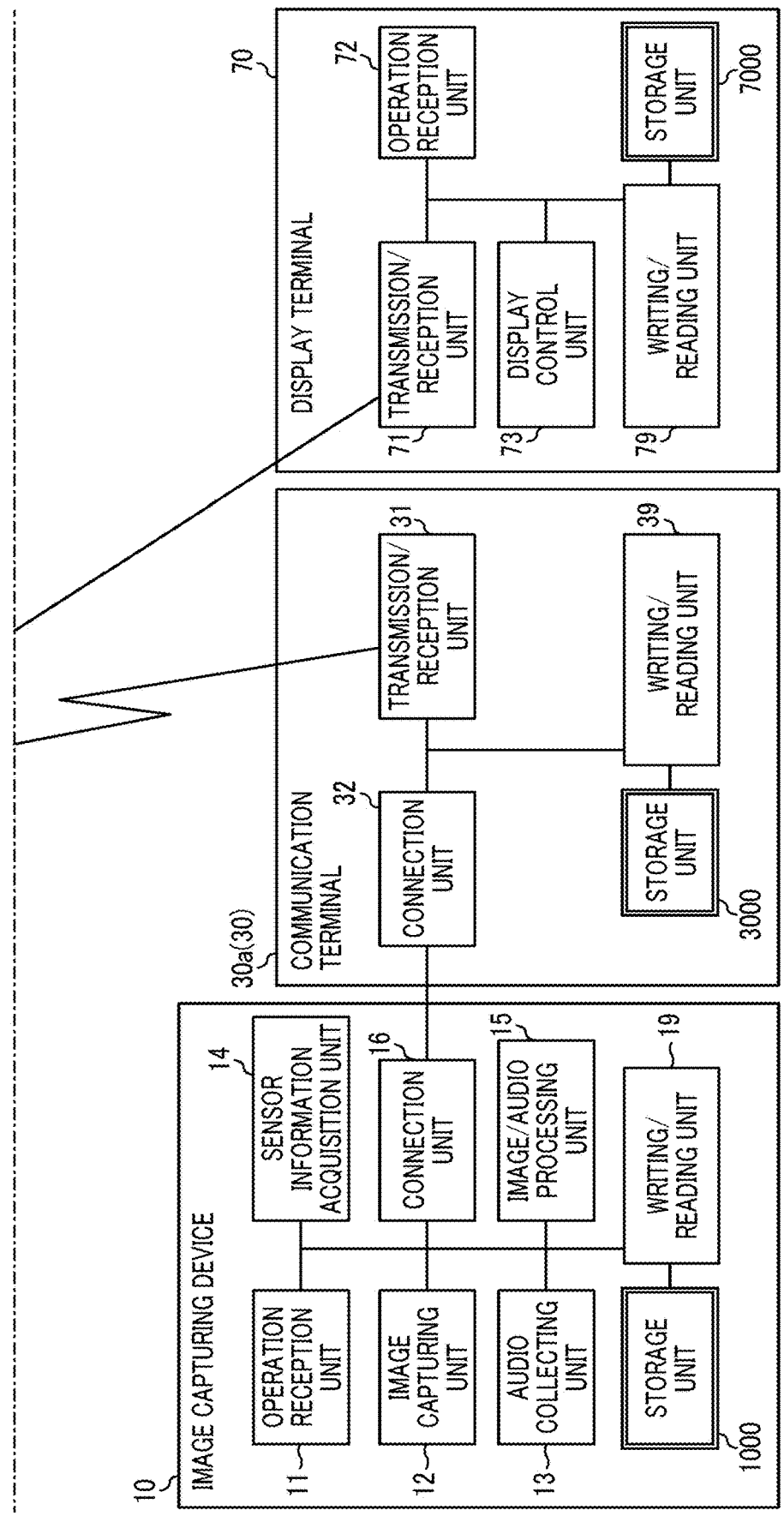

Hereinafter, a description is given of a functional configuration of the information processing system 1 according to the first embodiment. FIGS. 14A and 14B (FIG. 14) is an example block diagram of functional configuration of the information processing system 1 according to the first embodiment.

Functional Configuration of Image Capturing System

Hereinafter, a description is given of a functional configuration of the image capturing system 3 configured by the image capturing device 10 and the communication terminal 30 with reference to FIGS. 14A and 14B (FIG. 14). As indicated in FIG. 14B, the function implemented by the image capturing device 10 includes, for example, an operation reception unit 11, an image capturing unit 12, an audio collecting unit 13, a sensor information acquisition unit 14, an image/audio processing unit 15, a connection unit 16, a writing/reading unit 19, and a storage unit 1000.

The operation reception unit 11 has a function of receiving an operation input by a user, such as the install person X indicated in FIG. 8. The operation reception unit 11 is mainly implemented by the operation unit 115 and the processing performed by the CPU 111 indicated in FIG. 10.

The image capturing unit 12 has a function of capturing an image of object and/or landscape, and then acquiring the captured image data 600. The captured image data 600 can be two hemispherical image data to be used as source of full-view spherical image data, as indicated in FIGS. 3A and 3B. The captured image data can be still image data and movie image data. The image capturing unit 12 is mainly implemented by the imaging unit 101, the image processor 104, the imaging controller 105, and the processing performed by the CPU 111 indicated in FIG. 10. The image capturing unit 12 is an example of the capturing unit.

The audio collecting unit 13 has a function of collecting audio, such as sound, around the image capturing device 10. The audio collecting unit 13 is mainly implemented by the microphone 108 and the audio processor 109 and the processing performed by the CPU 111 indicated in FIG. 10. The audio collecting unit 13 acquires audio data collected by using the microphone 108 indicated in FIG. 10 as collected audio data.

The sensor information acquisition unit 14 acquires sensor detection result information, such as information on each direction (azimuth angle and magnetic north) from a sensor such as the acceleration and orientation sensor 118. The sensor detection result information, such as measured information of each direction indicates a posture of the image capturing device 10 at a given time point. The sensor information acquisition unit 14 is mainly implemented by the acceleration and orientation sensor 118 and the processing performed by the CPU 111 indicated in FIG. 10.

The image/audio processing unit 15 performs various processing on the captured image data acquired by the image capturing unit 12 and/or the audio data acquired by the audio collecting unit 13. For example, the image/audio processing unit 15 generates data of equirectangular projection image (FIG. 3C) based on two hemispherical image data (FIGS. 3A, 3B) acquired by the two imaging elements 103a and 103b, respectively. The image/audio processing unit 15 is mainly implemented by an instruction from the CPU 111 indicated in FIG. 10.

The connection unit 16 is mainly implemented by an electrical contact and the processing performed by the CPU 111, and has a function of receiving power from the communication terminal 30 and performing data communication.

The writing/reading unit 19 has a function of writing and storing various data in the storage unit 1000 and reading various data from the storage unit 1000. The writing/reading unit 19 is mainly implemented by the processing performed by the CPU 111 indicated in FIG. 10. The storage unit 1000 is mainly implemented by the ROM 112, the SRAM 13 and the DRAM 114 indicated in FIG. 10. Further, the storage unit 1000 stores the captured image data 600 acquired by the image capturing unit 12.

As indicated in FIG. 14B, the function implemented by the communication terminal 30 includes, for example, a transmission/reception unit 31, a connection unit 32, a writing/reading unit 39, and a storage unit 3000.

The transmission/reception unit 31 transmits and receives various data or information to and from the control server 50 via the wireless router 9 and the communication network 7. The transmission/reception unit 31 transmits the captured image data acquired by the image capturing device 10 to the control server 50 via the communication network 7. The transmission/reception unit 31 is mainly implemented by the processing performed by the CPU 301, the short-range communication circuit 313 and the antenna 313a indicated in FIG. 11. The transmission/reception unit 31 is an example of a transmission unit.

The connection unit 32 is mainly implemented by an electrical contact and the processing performed by the CPU 301, and supplies power to the communication terminal 30 and performs data communication.

The writing/reading unit 39 has a function of writing and storing various data in the storage unit 3000 and reading various data from the storage unit 3000. The writing/reading unit 39 is mainly implemented by the processing performed by the CPU 301 indicated in FIG. 11. The storage unit 3000 is mainly implemented by the ROM 302, the RAM 303 and the EEPROM 304 indicated in FIG. 11.

Functional Configuration of Control System

Hereinafter, a description is given of a functional configuration of the control system 5 configured by the control server 50 and the display terminal 70 with reference to FIG. 14. The control server 50 and the display terminal 70 install dedicated application programs for displaying a full-view spherical image. The control server 50 and the display terminal 70 implement an information processing method according to the embodiment, for example, by executing the installed application programs using the CPU 501 and the CPU 701.

As indicated in FIG. 14A, the function implemented by the control server 50 includes, for example, a transmission/reception unit 51, a detection unit 52, an image processing unit 53, a coordinate calculation unit 54, an analysis area setting unit 55, a measurement unit 56, an image generation unit 57, a determination unit 58, a writing/reading unit 59, and a storage unit 5000.

The transmission/reception unit 51 transmits and receives various data or information to and from the image capturing system 3 via the communication network 7. For example, the transmission/reception unit 51 receives the captured image data 600 related to the image captured by the image capturing device 10 and then transmitted from the image capturing system 3. The transmission/reception unit 51 is mainly implemented by the processing performed by the CPU 501 and the network OF 509 indicated in FIG. 12. The transmission/reception unit 51 is an example of a reception unit.

The detection unit 52 has a function of detecting an image of a person existing in the captured image data 600. This person detection is performed by using, for example, a person detection method of the support vector machine (SVM). Further, based on the detected image of person, the detection unit 52 detects coordinates of person indicating a position of the person existing in the captured image data 600. Hereinafter, the coordinates of person may be referred to as the person coordinates. In this speciation, the person coordinates is an example of coordinates of a movable object (hereinafter, movable object coordinates). The detection unit 52 is mainly implemented by the processing performed by the CPU 501 indicated in FIG. 12. The detection unit 52 is an example of a first detection unit.

The image processing unit 53 performs various processing on the captured image data 600 transmitted from the image capturing system 3. For example, the image processing unit 53 performs blur processing to blur an image of person included in the captured image data detected by the detection unit 52. The image processing unit 53 is mainly implemented by the processing performed by the CPU 501 indicated in FIG. 12.

The coordinate calculation unit 54 has a function of calculating coordinates to be used for setting an analysis area to be used for performing the flow line analysis based on input information, corresponding to an input operation performed to the captured image being displayed on the display terminal 70 and transmitted from the display terminal 70. For example, the coordinate calculation unit 54 calculates two-dimensional coordinates (X, Y coordinates) corresponding to input coordinates included in the input information as area coordinates. Further, the coordinate calculation unit 54 calculates two-dimensional coordinates on a planar image (e.g., equirectangular projection image EC), converted from a full-view spherical image, for input coordinates corresponding to the input operation performed to the full-view spherical image, as the area coordinates. The coordinate calculation unit 54 is mainly implemented by the processing performed by the CPU 501 indicated in FIG. 12. The coordinate calculation unit 54 is an example of the calculation unit.

The analysis area setting unit 55 has a function of setting an analysis area used for performing the flow line analysis based on the area coordinates calculated by the coordinate calculation unit 54. For example, the analysis area setting unit 55 stores the area coordinates calculated by the coordinate calculation unit 54 in an area information management table (see FIG. 17), which will be described later, to set the analysis area.

The analysis area setting unit 55 is mainly implemented by the processing performed by the CPU 501 indicated in FIG. 12. The analysis area setting unit 55 is an example of a setting unit. The analysis area used for performing the flow line analysis is an example of a specific closed region.

The measurement unit 56 has a function of measuring one or more objects, such as counting the number of persons, in the analysis area set by the analysis area setting unit 55. For example, the measurement unit 56 counts the number of persons in the analysis area based on the area coordinates defining the analysis area set by the analysis area setting unit 55, and the person coordinates detected by the detection unit 52 and stored in a person-related information management DB (see FIG. 16). The measurement unit 56 is mainly implemented by the processing performed by the CPU 501 indicated in FIG. 12. The measurement unit 56 is an example of a measuring or counting unit.

The image generation unit 57 has a function of generating an analysis-result-displaying image indicating a result of the flow line analysis based on the measured result by the measurement unit 56. The image generation unit 57 is mainly implemented by the processing performed by the CPU 501 indicated in FIG. 12.

The determination unit 58 is mainly implemented by the processing performed by the CPU 501 indicated in FIG. 12, and performs various determination processing. The writing/reading unit 59 has a function of storing various data in the storage unit 5000 and reading various data from the storage unit 5000. The writing/reading unit 59 is mainly implemented by the processing performed by the CPU 501 indicated in FIG. 12.

The storage unit 5000 is mainly implemented by the ROM 502, the HD 504 and the recording medium 506 indicated in FIG. 12. The storage unit 5000 stores one or more databases, such as an image management database (DB) 5001, a person-related information management database (DB) 5002, an area information management database (DB) 5003, and a measured-person-related information management database (DB) 5004.

The image management DB 5001 stores an image management table to be described later. The person-related information management DB 5002 stores a person-related information management table to be described later. The area information management DB 5003 stores an area information management table to be described later. The measured-person-related information management DB 5004 stores a measured-person-related information management table to be described later. The storage unit 5000 is an example of a storage.

Image Management Table

FIG. 15 is a conceptual diagram illustrating an example of the image management table according to the first embodiment. As indicated in FIG. 15, the image management table stores, for example, image identification (ID), file name of image data, and image-captured date and time in association with each other for each image ID. The image ID is an example of image identification information identifying each image data. The file name of image data is a file name of image data indicated by the associated image ID. The image captured date and time is date information indicating specific date and time when the associated image data was captured. Further, the image data managed, controlled, and stored by the image management table may be the captured image data 600 transmitted from the image capturing system 3, the processed image data 650 that is generated by processing the captured image data 600 using the image processing unit 53, or both of the captured image data 600 and the processed image data 650.

Person-Related Information Management Table

Figure 20:
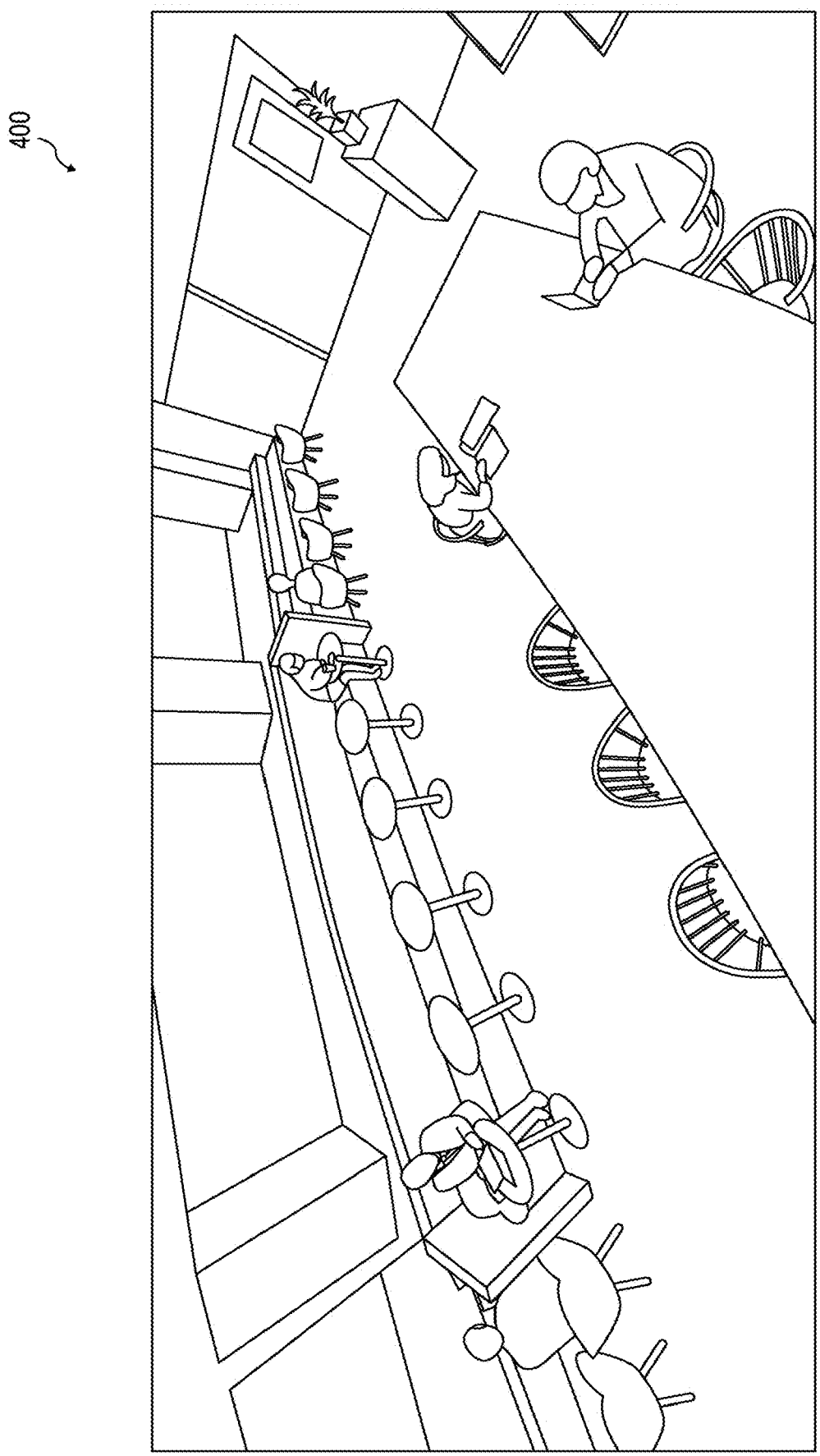
FIG. 20 is an example of captured image according to the first embodiment.
Figure 21:
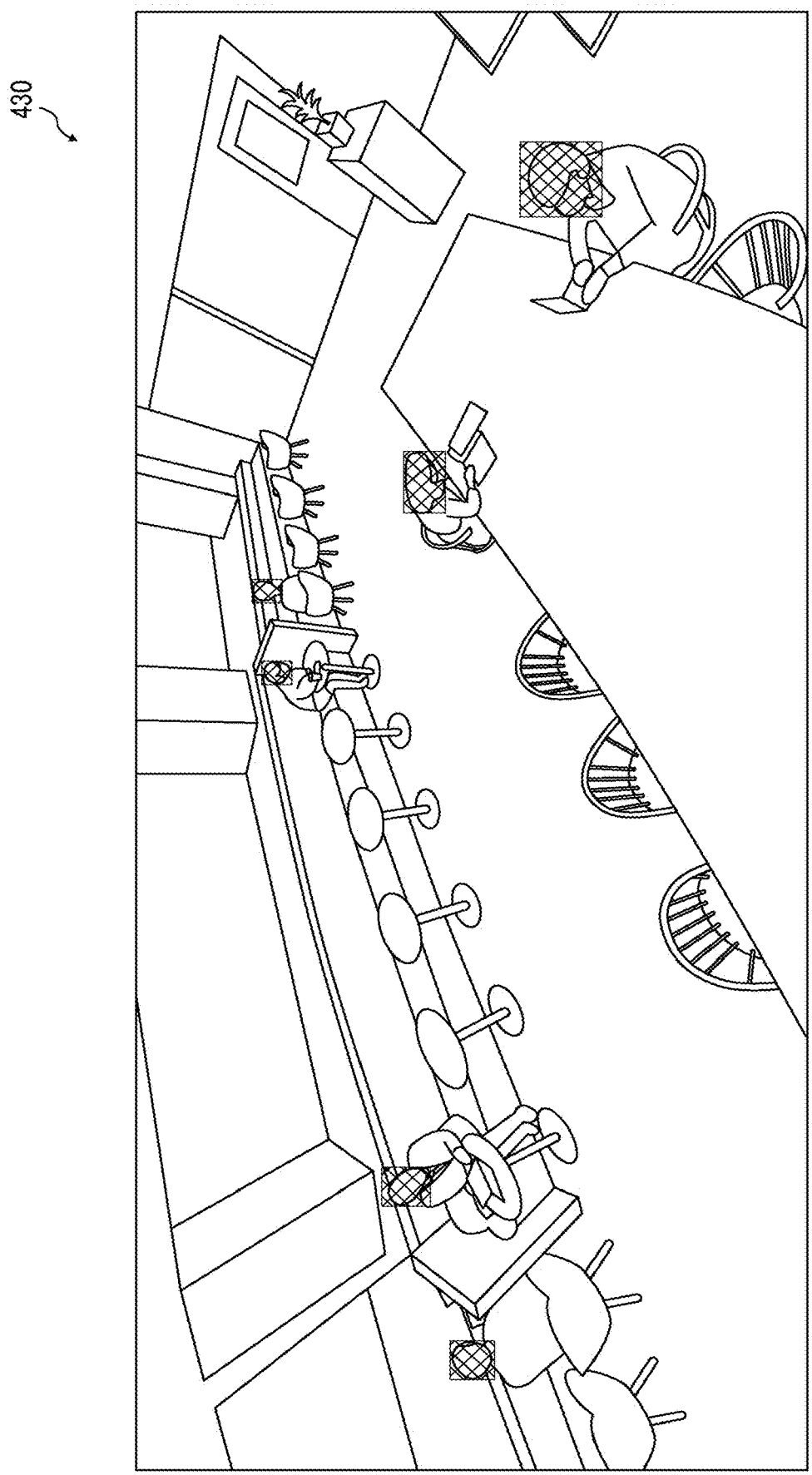
FIG. 21 is an example of processed image according to the first embodiment.

FIG. 16 is a conceptual diagram illustrating an example of the person-related information management table according to the first embodiment. As indicated in FIG. 16, the person-related information management table stores, for example, image ID, person ID, and coordinates of person (person coordinates) in association with each other, for each image ID. The person ID is used for identifying an image of each person included in the image data. The person coordinates indicate a position of an image of each person on the image data. The person ID is an example of person identification information identifying an image of each person included in the image data. For example, the person coordinates is two-dimensional coordinates indicating a position of each person included in the image associated with the image ID, as indicated in FIG. 20 or FIG. 21. The person coordinates include X coordinate and Y coordinate indicating the position of each person on the image. For example, a position of a person identified by the person ID of "T0001" is identified by four sets of X and Y coordinates of "Nos. 1 to 4." Further, if a plurality of persons is included in the same image data, a plurality of person IDs is associated with one image ID. In this configuration, the person coordinates is an example of coordinates of a particular or specific movable object (movable object coordinates).

Area Information Management Table

FIG. 17 is a conceptual diagram illustrating an example of the area information management table according to the first embodiment. As indicated in FIG. 17, the area information management table stores, for example, image ID, area ID, common area ID, and area coordinates in association with each other, for each image ID.

The area ID is an example of area identification information identifying each analysis area set by the analysis area setting unit 55. The common area ID is associated with a plurality of area IDs corresponding to a plurality of areas to be set as one analysis area. For example, when two or more areas, such as separated areas, are to be set as one analysis area, the common area ID is set. Further, the area coordinates are two-dimensional coordinates indicating a position of each vertex of an analysis area included in an image associated with the image ID. The area coordinates include X coordinate and Y coordinate indicating the position of each vertex of the analysis area set on the image.

One analysis area identified by the area ID is a polygonal region configured of a plurality of area coordinates. For example, an analysis area identified by the area ID of "A0001" is identified by six sets of X and Y coordinates of "Nos. 1 to 6." Further, if a plurality of areas is included in the same image data, a plurality of area IDs is associated with one image ID. The area coordinates are an example of closed region coordinates indicating coordinates of a specific closed region.

Measured-Person-related Information Management Table

FIG. 18 is a conceptual diagram illustrating an example of the measured-person-related information management table according to the first embodiment. As indicated in FIG. 18, the measured-person-related information management table stores, for example, area ID, common area ID, the number of persons included in each analysis area (number of persons), and target date (e.g., date, time) in association with each other for each area ID. The target date indicates date and time when an image of image data used for measuring the number of persons included in the analysis area is acquired by the image capturing device 10 (image-captured date and time). The control server 50 measures the number of persons in each analysis area using the image data, and manages or controls the measured or counted number of people and the image-captured date and time of the image used for the measurement or counting, for each analysis area.

As indicated in FIG. 14B, the function implemented by the display terminal 70 includes, for example, a transmission/reception unit 71, an operation reception unit 72, a display control unit 73, a writing/reading unit 79, and a storage unit 7000.

The transmission/reception unit 71 transmits and receives various data or information to and from the control server 50 via the communication network 7. The transmission/reception unit 71 is mainly implemented by the processing performed by the CPU 701 and the network IN 709 indicated in FIG. 13.

The operation reception unit 72 has a function of receiving an operation input by a user, such as the viewer person Y indicated in FIG. 8. For example, the operation reception unit 72 receives an input for setting a given area in the captured image displayed on the display 708 under the control of the display control unit 73. The operation reception unit 72 is mainly implemented by the input unit, such as the keyboard 711 and/or mouse 712 and the processing performed by the CPU 701 indicated in FIG. 13. The operation reception unit 72 is an example of the reception unit.

The display control unit 73 controls the display terminal 70 to display various images on the display 708. The image display method is not limited to a particular method. For example, a full-view spherical image can be displayed as it is, or a partial image range corresponding to a given angle of view of the full-view spherical image can be cut out and displayed. The display control unit 73 is mainly implemented by the processing performed by the CPU 701 indicated in FIG. 13. The display control unit 73 is an example of the display control unit.

The writing/reading unit 79 stores various data in the storage unit 7000 or reads various data from the storage unit 7000. The writing/reading unit 79 is mainly implemented by the processing performed by the CPU 701 indicated in FIG. 13. The storage unit 7000 is mainly implemented by the ROM 702, the HD 704 and the recording medium 706 indicated in FIG. 13.

Processing or Operation in First Embodiment

Hereinafter, a description is given of processing or operation in the information processing system 1 according to the first embodiment with reference to FIGS. 19 to 33. Acquisition of Person-Related Information:

Hereinafter, with reference to FIGS. 19 to 21, a description is given of a process of acquiring person coordinates indicating a position of a person included in a captured image, which is captured in a specific space where the image capturing device 10 is installed or used, by the image capturing device 10 and then acquired as the captured image.

Figure 19:
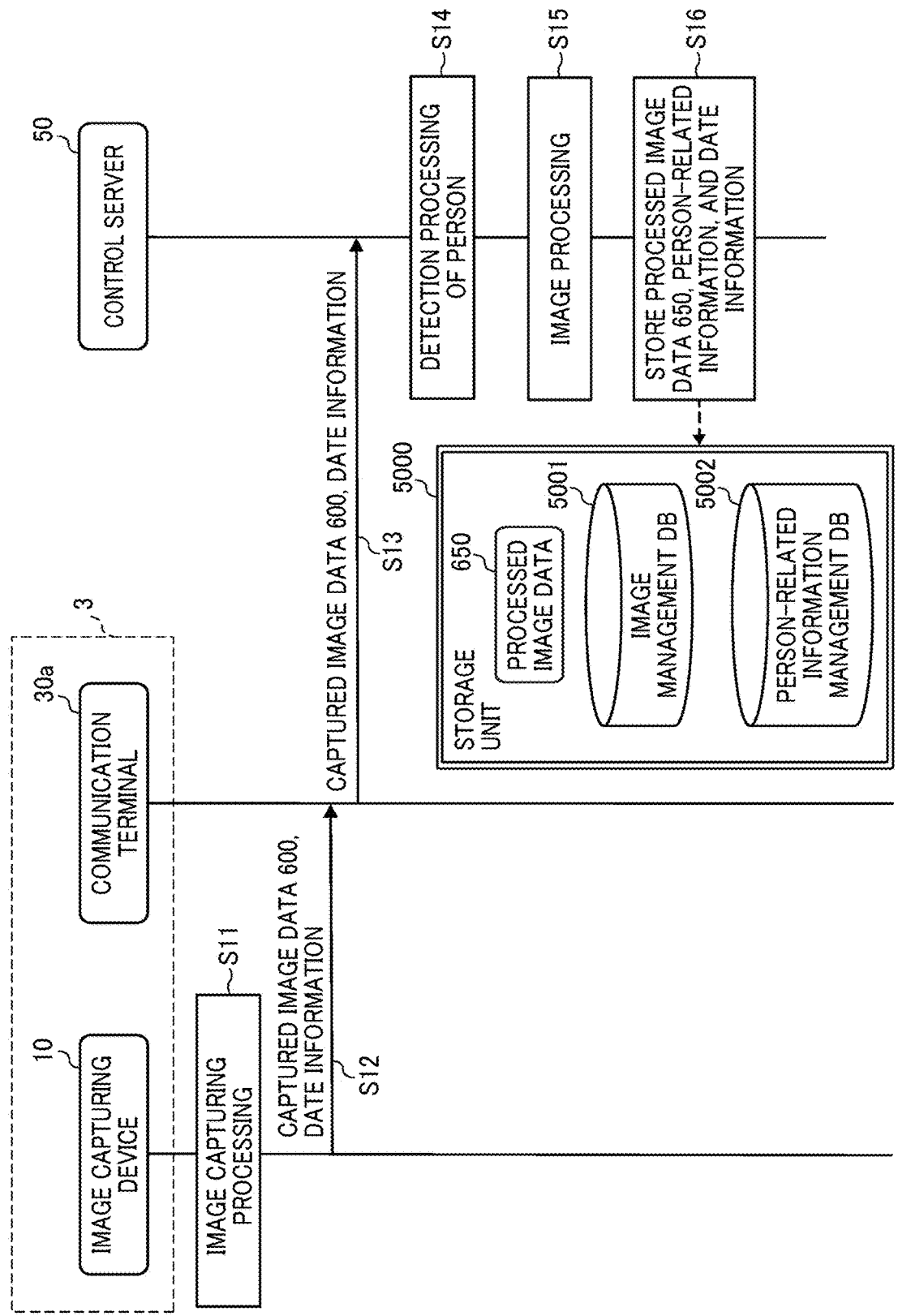
FIG. 19 is a sequence diagram illustrating an example of a process of acquiring person-related information in the information processing system according to the first embodiment.

FIG. 19 is a sequence diagram illustrating an example of a process of acquiring the person-related information in the information processing system 1 according to the first embodiment. FIG. 19 illustrates a process of detecting a position of a person included in the captured image, but not limited thereto. The same sequence can be used when detecting a position of any particular or specific movable object, such as vehicle and robot, which is other than the person.

In step S11, the image capturing device 10 performs the image capturing processing using the image capturing unit 12. Specifically, the image capturing unit 12 of the image capturing device 10 acquires the captured image data 600, corresponding to an image of the specific space captured by the image capturing device 10 disposed or used in the specific space.

In step S12, the connection unit 16 of the image capturing device 10 transmits, to the communication terminal 30a, the captured image data 600 acquired by the image capturing unit 12, and date information indicating the image-captured date and time when the captured image data 600 was acquired. With this configuration, the connection 32 of the communication terminal 30a receives the captured image data 600 and the date information from the image capturing device 10.

In step S13, the transmission/reception unit 31 of the communication terminal 30a transmits the captured image data 600 and the date information received by the connection unit 32 to the control server 50 via the communication network 7. Then, the transmission/reception unit 51 of the control server 50 receives the captured image data 600 and the date information transmitted from the communication terminal 30a (an example of reception step). With this configuration, the captured image data 600 acquired by the image capturing device 10 is uploaded to the control server 50.

In step S14, the detection unit 52 of the control server 50 performs the detection processing of person included in the captured image data 600 received via the transmission/reception unit 51. The detection unit 52 of the control server 50 detects an image of person included in the received image data 600. The detection processing of image of person can be performed, for example, using a person detection method of support vector machine (SVM) and the like. Further, based on the detected image of person, the detection unit 52 detects person coordinates indicating a position of the person in the captured image data 600.

In step S15, the image processing unit 53 of the control server 50 performs given image processing on the captured image data 600. For example, the image processing unit 53 performs blurring processing to blur an image of the person detected by the detection unit 52. The image processing performed in step S15 is not limited to the blur processing, but other image processing can be performed on the captured image data 600 in addition to the blur processing. Then, the image processing unit 53 performs given image processing on the captured image data 600 to generate the processed image data 650 as a processed image.

In step S16, the writing/reading unit 59 of the control server 50 stores the processed image data 650 generated by the image processing unit 53 in the storage unit 5000 (an example of storage control step). Further, the writing/reading unit 59 stores the person-related information detected by the detection unit 52 in the person-related information management DB 5002 (see FIG. 16). Further, the writing/reading unit 59 associates the date information received via the transmission/reception unit 51 and the processed image data 650 to store the date information and the processed image data 650 in the image management DB 5001 (see FIG. 15) in association with each other. In addition to the processed image data 650 or instead of the processed image data 650, the control server 50 can store the captured image data 600 transmitted from the image capturing device 10 in the storage unit 5000 and the image management table.

The information processing system 1 repeatedly performs the processing indicated in FIG. 19 each time the image capturing device 10 captures an image. With this configuration, before performing the flow line analysis, the control server 50 can store the person coordinates indicating the position of the person in the captured image transmitted from the image capturing device 10 in association with the image-captured date and time when the image capturing was performed.

Hereinafter, a description is given of the captured image data 600 acquired by the image capturing device 10 and the processed image data 650 processed by the control server 50 with reference to FIGS. 20 and 21. FIG. 20 is an example of captured image according to the first embodiment. FIG. 21 is an example of processed image according to the first embodiment.

FIG. 20 indicates a state in which a captured image 400 of the captured image data 600 acquired by the image capturing device 10 is displayed on the display terminal 70. The captured image 400 indicated in FIG. 20 is an image having received given processing on the full-view spherical image.

On the other hand, FIG. 21 indicates a state in which a processed image 430 of the processed image data 650, processed by the control server 50, is displayed on the display terminal 70. The processed image 430 indicated in FIG. 21 is an image in which a blur processing is performed on faces of persons included in the captured image 400 indicated in FIG. 20.

Flow Line Analysis Processing

Figure 22:
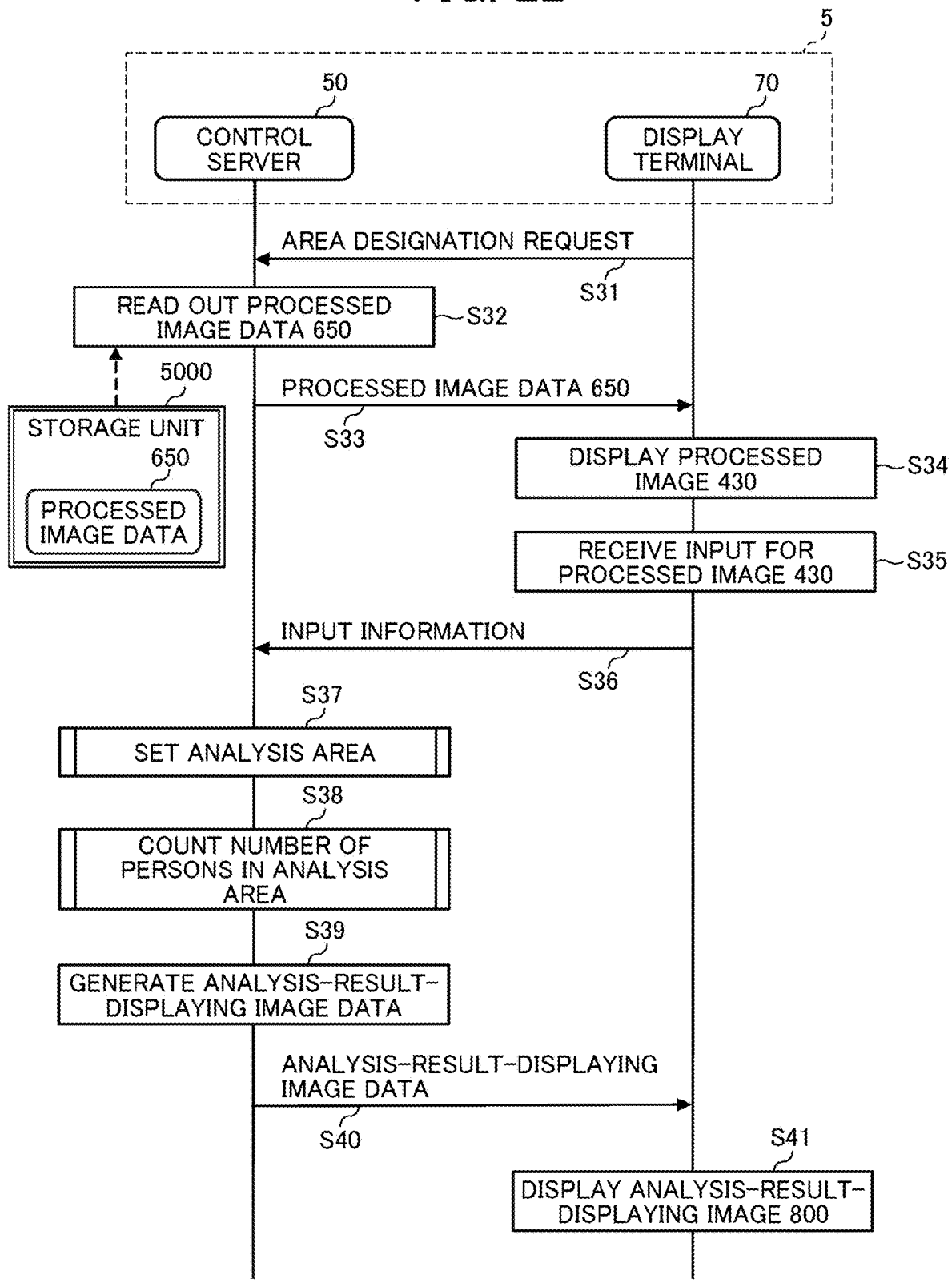
FIG. 22 is a sequence diagram illustrating an example of a flow line analysis processing in a control system according to the first embodiment.

Hereinafter, a description is given of the flow line analysis processing based on a captured image acquired by the image capturing device 10 with reference to FIGS. 22 to 33. FIG. 22 is a sequence diagram illustrating an example of a flow line analysis processing by the control system 5 according to the first embodiment. FIG. 22 illustrates an example case of performing the flow line analysis processing using the processed image data 650 stored in the control server 50, but if the captured image data 600 is stored in the control server 50, the captured image data 600 can be used.

In step S31, the transmission/reception unit 71 of the display terminal 70 transmits an area designation request to the control server 50 to perform a flow line analysis at a location where the image capturing device 10 is installed or used.

Specifically, the operation reception unit 72 of the display terminal 70 receives a given input operation designating an area to a given input screen. When the given input operation is received by the operation reception unit 72, the transmission/reception unit 71 transmits the area designation request to the control server 50. With this configuration, the transmission/reception unit 51 of the control server 50 receives the area designation request transmitted from the display terminal 70.

In step S32, the writing/reading unit 59 of the control server 50 reads out the processed image data 650 stored in the storage unit 5000 when the area designation request is received by the transmission/reception unit 51.

In step S33, the transmission/reception unit 51 of the control server 50 transmits the processed image data 650, read out by the writing/reading unit 59, to the display terminal 70. With this configuration, the transmission/reception unit 71 of the display terminal 70 receives the processed image data 650 transmitted from the control server 50. The processed image data 650 read out in step S32 and transmitted in step S33 may be any processed image data 650 corresponding to any processed image stored in the storage unit 5000.

In step S34, the display control unit 73 of the display terminal 70 displays an image related to the processed image data 650 received by the transmission/reception unit 71 on the display 708. For example, the image related to the processed image data 650 and displayed on the display 708 is, the processed image 430 indicated in FIG. 21.

In step S35, the operation reception unit 72 of the display terminal 70 receives an input for setting a given analysis area in the image displayed on the display 708 under the control of the display control unit 73 (an example of reception step). With this configuration, the user (viewer person Y) using the display terminal 70 performs an area designation process on the image displayed on the display 708 to designate the area where the flow line analysis is to be performed.

Figure 23:
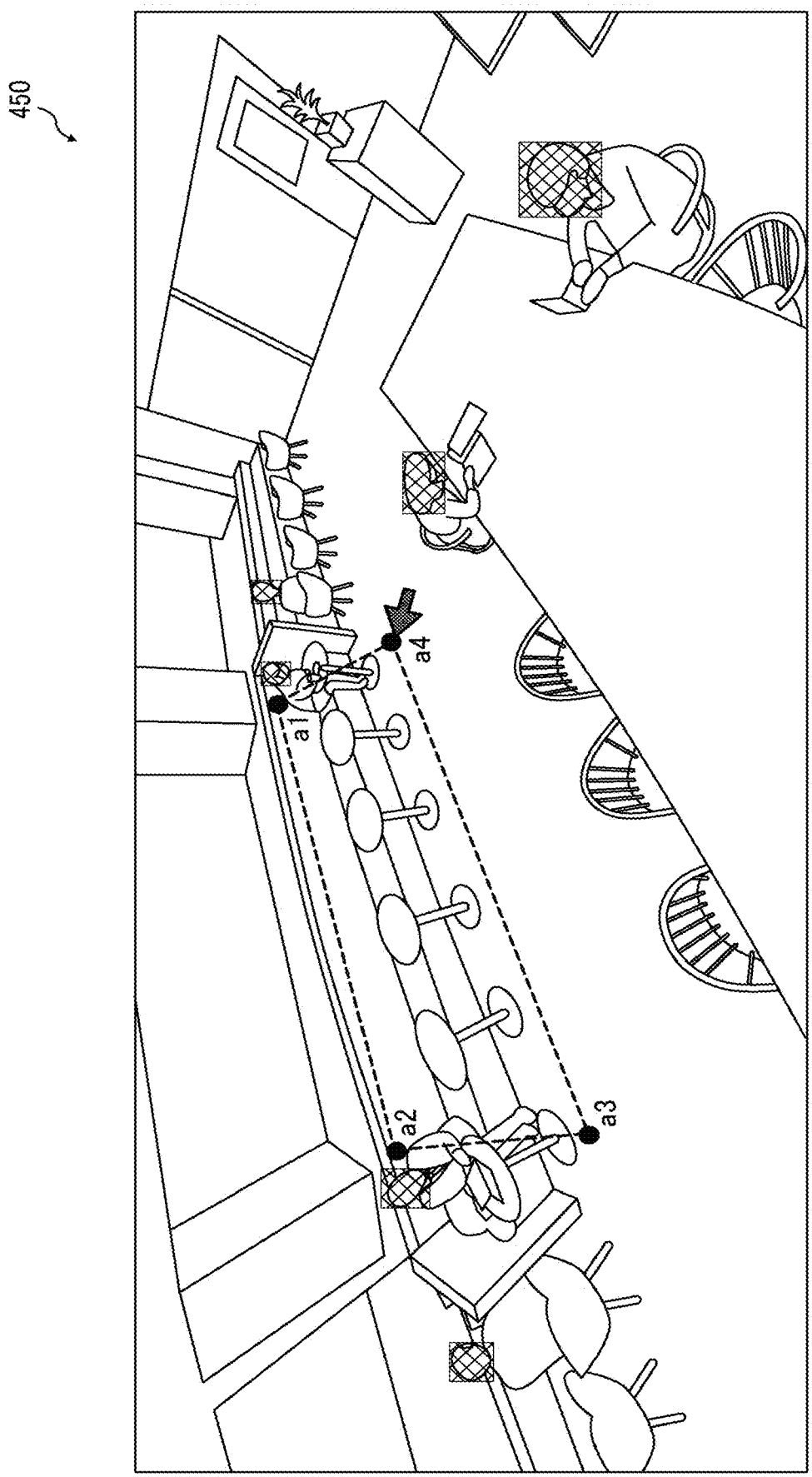
FIG. 23 is an example of area designation processing on a display screen displayed on a display terminal according to the first embodiment.

FIG. 23 is an example of the area designation processing on a display screen 450 displayed on the display terminal 70 according to the first embodiment. The display screen 450 in FIG. 23 indicates a state in which a four-point input of "a1" to "a4" on the full-view spherical image displayed on the display 708 (e.g., processed image 430 in FIG. 21) is received. As indicated in FIG. 23, the user (viewer) using the display terminal 70 inputs (designates) the vertex of the area in which the flow line analysis is to be performed, to the display screen 450. Since the analysis area is required to be a closed region that configures a polygon, such as at least a triangle, the user inputs (designates) at least three vertices.

The input mode received by the operation reception unit 72 is not limited to thereto, but another input mode can be used for designating a given area in advance. For example, if a shape of area to be designated is pre-set, an input instructing enlargement and reduction of the size of area by a cropping operation to the pre-set area shape displayed on the display screen 450 can be used, or an input instructing a movement of a position of area by a drag-and-drop operation to the pre-set area shape can be used. Further, for example, if an input of one point on the display screen 450 is received and then the input point is used as the center of gravity for designating a given area shape, the operation reception unit 72 can receive the input of the point to be used as the center of gravity of the given area shape.

In step S36, the transmission/reception unit 71 of the display terminal 70 transmits, to the control server 50, input information corresponding to the input operation received by the operation reception unit 72. The input information corresponding to the input operation received by the operation reception unit 72 includes, for example, position information indicating a position on the image (e.g., display screen 450) displayed on the display terminal 70. For example, when the input information corresponding to the input operation indicated in FIG. 23 is received by the operation reception unit 72, the input information includes the positional information indicating positions of the input points of "a1" to "a4" on the display screen 450. The position information is, for example, coordinates information on the display screen 450.

In step S37, the control server 50 sets an analysis area to be used for the flow line analysis based on the input information received by the transmission/reception unit 51 (an example of calculation step). Specifically, at first, the coordinate calculation unit 54 of the control server 50 calculates area coordinates indicating coordinates on the processed image data 650 corresponding to the position information included in the received input information. In particular, if the image displayed on the display terminal 70 is a full-view spherical image, the coordinate calculation unit 54 calculates coordinates on a planar image converted from the full-view spherical image, corresponding to the positions on the full-view spherical image. Then, the analysis area setting unit 55 of the control server 50 sets and stores the area coordinates calculated by the coordinate calculation unit 54 in the area information management DB 5003 (see FIG. 17) to set the analysis area to be used for the flow line analysis. The details of analysis area setting process will be described later.

Figure 24:
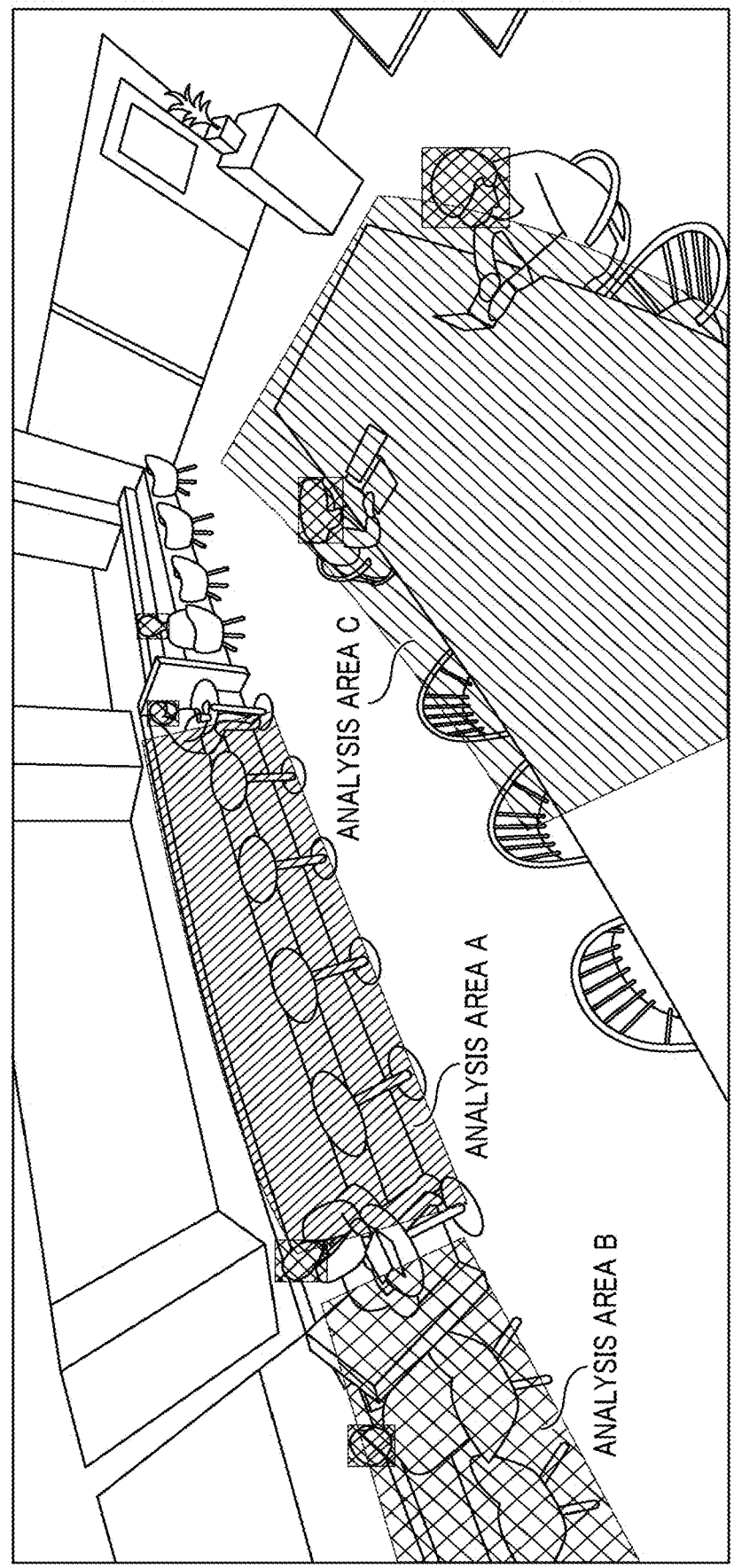
FIG. 24 is a conceptual diagram illustrating an example of a display screen when an analysis area set by a control server is mapped onto a full-view spherical image according to the first embodiment.

FIG. 24 is a conceptual diagram illustrating an example of a display screen when an analysis area set by the control server 50 is mapped onto a full-view spherical image according to the first embodiment. FIG. 24 indicates a state that the display terminal 70 displays a display screen 470 displaying one or more analysis areas set on the processed image 430, related to the processed image data 650 acquired by the image capturing device 10. As indicated in FIG. 24, the display screen 470 displays, for example, three analysis areas, such as analysis area A, analysis area B and analysis area C, set by the analysis area setting unit 55. With this configuration, in the above described processing, the control server 50 can perform the setting processing of analysis area with respect to the processed image data 650 corresponding to one processed image, with which the control server 50 can set a common analysis area for the captured image acquired by the image capturing device 10.

Further, since the control server 50 can display the set analysis area on the display screen 470 to inform the set analysis area to the user (viewer person Y) who performs the flow line analysis, the user (viewer person Y) who performs the flow line analysis can check or confirm whether the set analysis area is appropriate or not. Further, if the user (viewer person Y) who performs the flow line analysis wants to change or modify the set analysis area, the control server 50 can modify the analysis area by repeating the sequence from step S31.

In step S38, the measurement unit 56 of the control server 50 measures or counts the number of persons in the analysis area set by the analysis area setting unit 55 (an example of measuring step). Specifically, the measurement unit 56 measures or counts the number of persons in the analysis area based on the area coordinates related to the area information included in the area information management DB 5003 (see FIG. 17) and the person coordinates related to the person-related information included in the person-related information management DB 5002 (see FIG. 16).

Measuring of Number of Persons in Area

Figure 25:
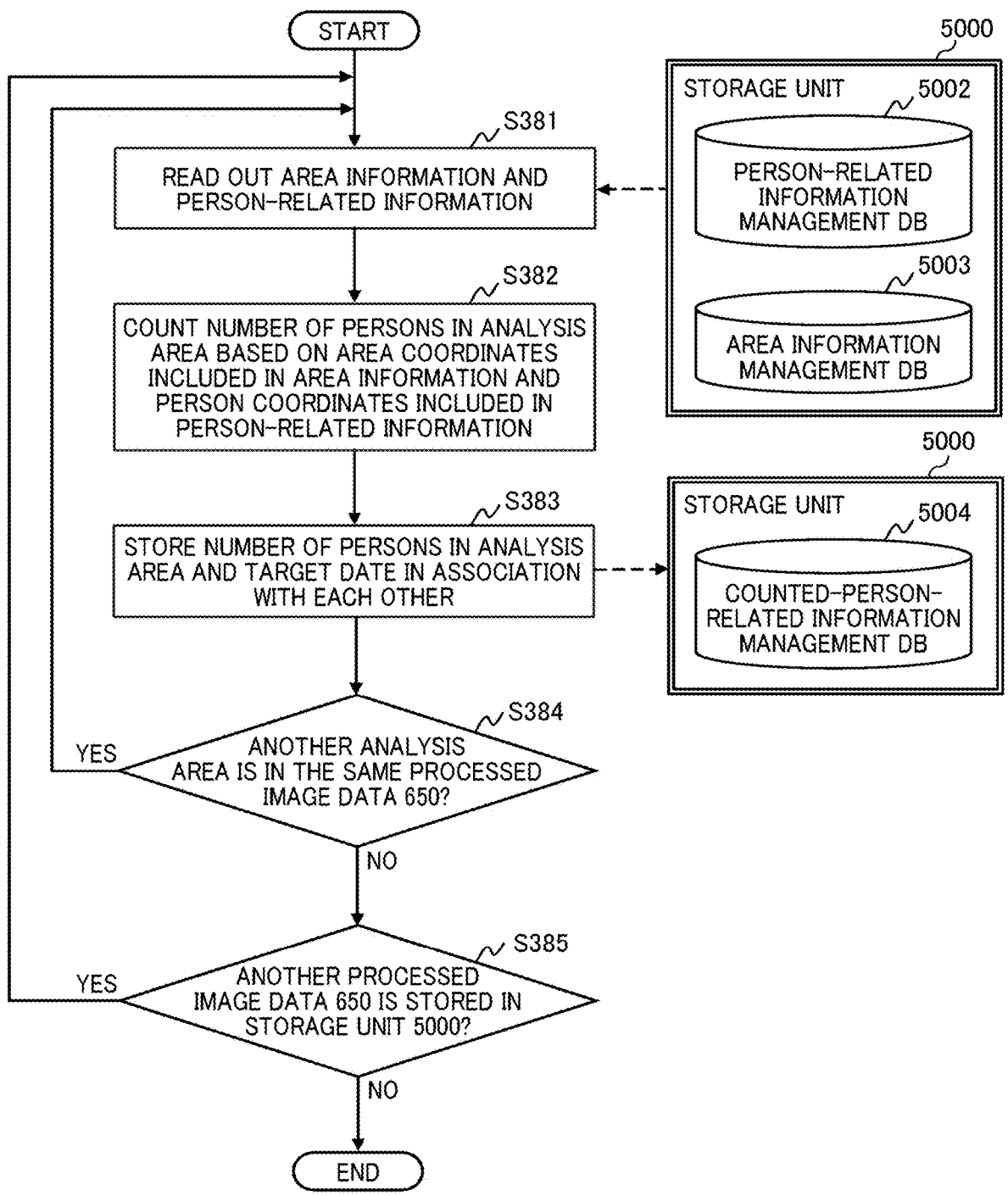
FIG. 25 is a flow chart illustrating an example of a process of measuring the number of persons in an analysis area by a control server according to the first embodiment.

Hereinafter, a description is given of measuring processing of the number of persons in an analysis area in step S38 (FIG. 22) in detail with reference to FIG. 25. FIG. 25 is a flow chart illustrating an example of a process of measuring the number of persons in an analysis area by the control server 50 according to the first embodiment. In FIG. 25, a description is given of a case that the measuring processing of the number of persons in the analysis area is performed with respect to the processed image data 650 corresponding to the display screen 470 indicated in FIG. 24.

In step S381, the writing/reading unit 59 of the control server 50 reads out the person-related information stored in the person-related information management DB 5002 and the area information stored in the area information management DB 5003, which are stored in the storage unit 5000. Specifically, the writing/reading unit 59 reads out the area information and the person-related information associated with the image ID related to the processed image data 650 used for the measuring processing.

In step S382, the measurement unit 56 of the control server 50 measures or counts the number of persons in the analysis area based on the area coordinates included in the area information and the person coordinates included in the person-related information, read out by the writing/reading unit 59. Specifically, the measurement unit 56 identifies an analysis area based on a plurality of area coordinates associated with the same area ID included in the area information management DB 5003 (see FIG. 17). For example, in a case of performing the measuring processing for the "analysis area A" displayed on the display screen 470 indicated in FIG. 24, the measurement unit 56 identifies the analysis area A using the plurality of area coordinates associated with the area ID corresponding to the analysis area A. Further, the measurement unit 56 identifies or specifies a range where the person is located using a plurality of person coordinates associated with the same person ID included in the person-related information management DB 5002 (see FIG. 16).

Then, if the identified range where the person is located is included inside the identified analysis area, the measurement unit 56 performs the measuring by assuming that the identified person exists in the analysis area. For example, in the range where the person identified or specified by the person coordinates exists, the measurement unit 56 determines whether or not foot coordinates of the person is within the analysis area.

The foot coordinates of the person represent the coordinates that become the minimum value in the vertical direction in the imaging direction of the image capturing device 10, in the range where the identified person exists.

In step S383, the writing/reading unit 59 of the control server 50 associates the number of persons in the analysis area measured by the measurement unit 56 and the target date indicating date and time capturing the image of the processed image data 650 having received the measuring processing, and stores the number of persons and the target date in the measured-person-related information management DB 5004 in association with each other.

In step S384, if another analysis area exists in the same processed image data 650 (S384: YES), the measurement unit 56 repeats the sequence from step S381. Specifically, since "analysis area B" and "analysis area C" exist on the display screen 470 indicated in FIG. 24 in addition to the "analysis area A," the measurement unit 56 repeats the sequence from step S381 to perform the measuring for the "analysis area B" and "analysis area C." On the other hand, if there is no another analysis area in the same processed image data 650 (S384: NO), the measurement unit 56 proceeds the sequence to step S385.

In step S385, if another processed image data 650 is stored in the storage unit 5000 (S385: YES), the measurement unit 56 repeats the sequence from step S381. On the other hand, if another processed image data 650 is not stored in the storage unit 5000 (S385: NO), the measurement unit 56 terminates the sequence.

Referring back to FIG. 22, the description of the flow line analysis processing is continued.

In step S39, the image generation unit 57 of the control server 50 generates analysis-result-displaying image data indicating a result of the flow line analysis based on the result measured by the measurement unit 56.

In step S40, the transmission/reception unit 51 of the control server 50 transmits the analysis-result-displaying image data generated by the image generation unit 57 to the display terminal 70. With this configuration, the transmission/reception unit 71 of the display terminal 70 receives the analysis-result-displaying image data transmitted from the control server 50.

In step S41, the display control unit 73 of the display terminal 70 displays the analysis-result-displaying image 800 corresponding to the analysis-result-displaying image data received by the transmission/reception unit 71 on the display 708.

Figure 26:
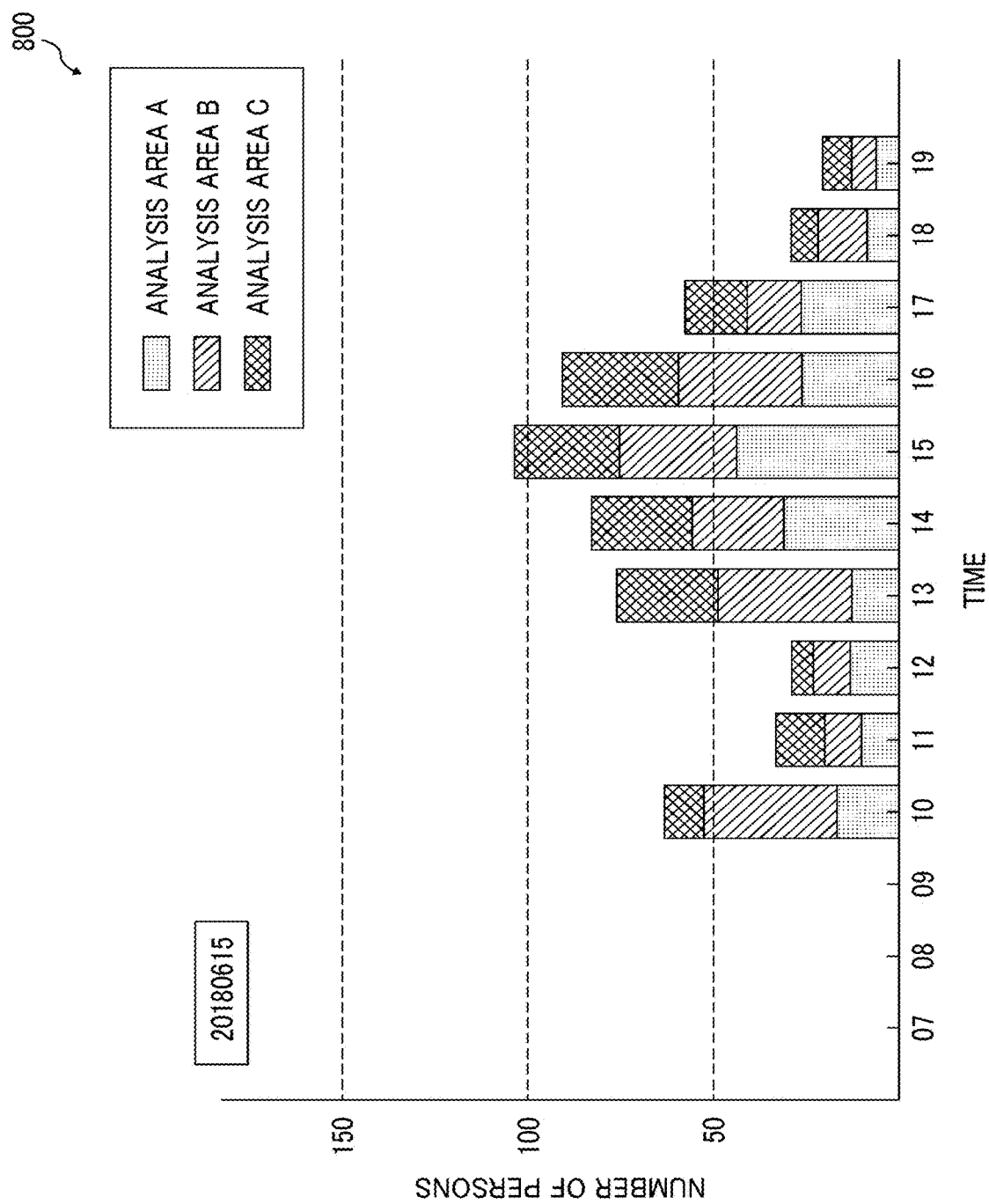
FIG. 26 is an example of an analysis-result-displaying image displayed on a display terminal according to the first embodiment.

FIG. 26 is an example of the analysis-result-displaying image 800 displayed on the display terminal 70 according to the first embodiment. The analysis-result-displaying image 800 in FIG. 26 indicates the number of visitors to each analysis area in a specific space (location) where the image capturing device 10 is installed or used, in a time series manner. As indicated in the analysis-result-displaying image 800, the display terminal 70 can present to the user (viewer person Y) the measured result of the person existing in the specific space (location) for each analysis area and each time zone, with which the user (viewer person Y) can use the analysis results effectively.

The display format of analysis result used for the analysis-result-displaying image 800 is not limited to an example indicated in FIG. 26. For example, the analysis-result-displaying image 800 can be displayed by superimposing a distribution of the measured number of persons in each analysis area on the display screen 470 indicated in FIG. 24 using a heat map format.

With this configuration, the control server 50 can perform the flow line analysis processing for each analysis area corresponding to the image-captured date and time recorded by the image capturing device 10 based on the analysis area set by the analysis area setting unit 55 and the person-related information of the person included in the processed image data 650, which is detected by performing the processing different from the setting of analysis area.

In the above description, an example of analyzing the flow line of persons or the number of persons is described. Hereinafter, another analysis method using the configuration according to the embodiment is described.

At first, the control server 50 can be configured to perform processing of identifying a person in an area instead of the measuring processing of the number of persons in the area in step S38 of FIG. 22 or can be configured to perform processing of identifying a person in an area along with the measuring processing of the number of persons in the area in step S38 of FIG. 22. In this case, the measurement unit 56 of the control server 50 uses, for example, facial recognition processing technology to identify each person (individual person). The control server 50 can be configured to register or store face images of persons in advance, and identify each individual person using the facial recognition processing (person identification processing) using a general template matching by the measurement unit 56.

Further, the control server 50 can be configured to analyze a movement locus of person by acquiring the coordinates information of the person from the input information received in step S36 indicated in FIG. 22. The analysis method of movement locus includes, for example, a method of extracting the super pixel using the optical flow and extracting the flow line for each individual person using the concept of grouping. Further, the control server 50 can be configured to calculate the distance between coordinates of each individual person from the captured image data, and can be configured to analyze and measure the staying time of each individual person based on the image-captured date and time of the captured image.

Further, the control server 50 can be configured to identify sex and/or age of the person in the analysis area instead of the counting processing of the number of persons in the analysis area in step S38 of FIG. 22, or can be configured to identify sex or age of the person in the analysis area along with the counting processing of the number of persons in the area in step S38 of FIG. 22. In this case, the control server 50 can identify age and/or sex of the person by analyzing a pattern of face shape, wrinkles, saggy, or the like of the person included in the captured image data. Further, the control server 50 can be configured to identify feature or characteristics of person, such as children and elder, by detecting pixels that has moved per unit time using the captured image data. Therefore, the control server 50 can be configured to measure (e.g., identify) feature or characteristics of the particular or specific movable object, in which the identifying processing can be considered as one type of the measuring processing.

Further, the analysis method using the control server 50 is not limited to the above described example as long as the analysis method performs the processing using information related to the particular or specific movable object, such as person, included in the captured image data. The control server 50 can perform various analysis of person in the set analysis area using information on the person included in the captured image data.

Setting of Analysis Area

Figure 27:
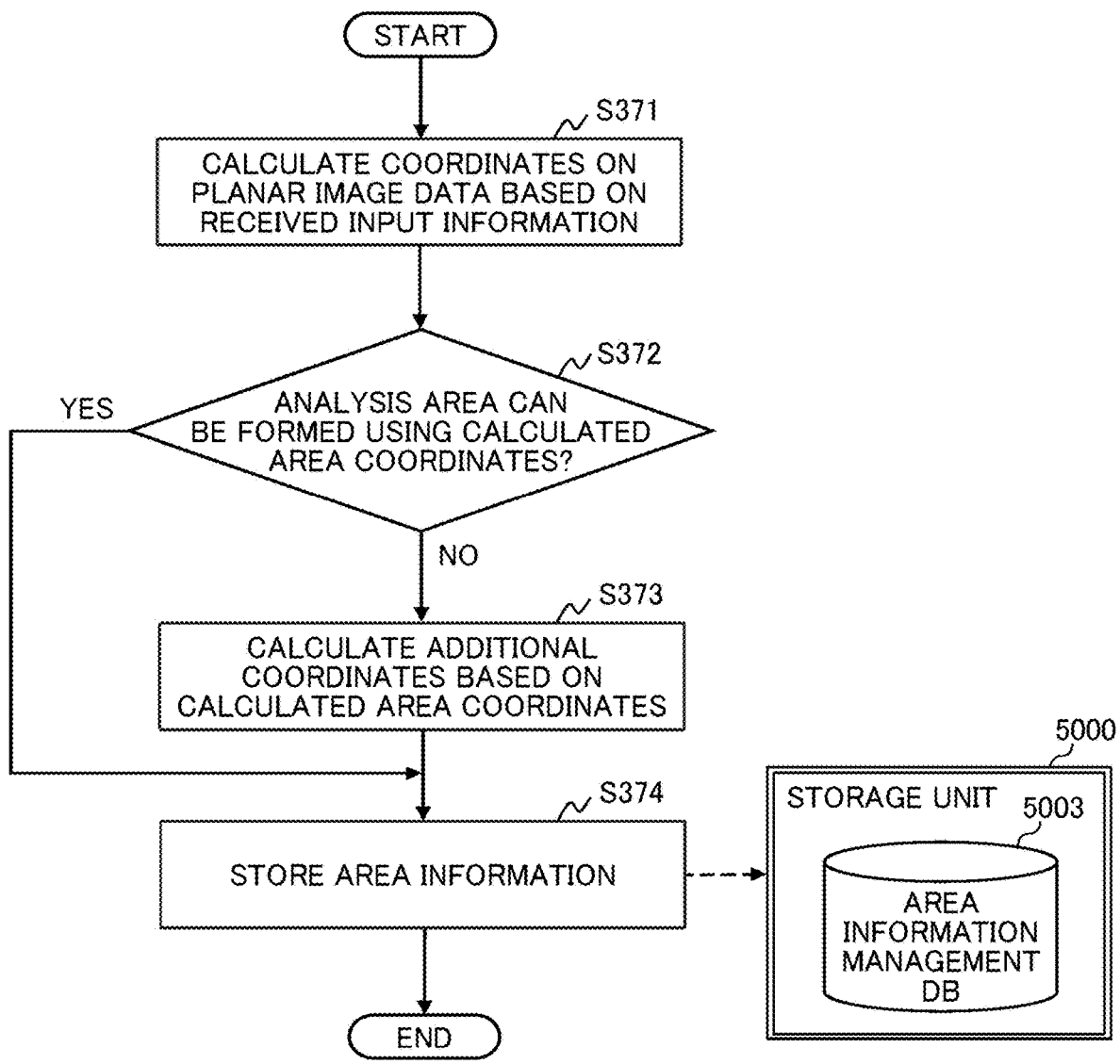
FIG. 27 is a flow chart illustrating an example of a process of setting an analysis area by a control server according to the first embodiment.

Hereinafter, a description is given of processing of setting an analysis area in step S37 of FIG. 22 in detail with reference to FIGS. 27 to 34. FIG. 27 is a flow chart illustrating an example of a process of setting an analysis area by the control server 50 according to the first embodiment. FIG. 27 describes a case that an image acquired by the image capturing device 10 is a full-view spherical image.

In step S371, the coordinate calculation unit 54 of the control server 50 calculates coordinates on planar image data based on the input information received by the transmission/reception unit 51. Specifically, the coordinate calculation unit 54 converts position information indicating a position on the full-view spherical image included in the input information into coordinates on the planar image data to calculate the area coordinates corresponding to the input information, in which the full-view spherical image is converted into the planar image.

Figure 28:
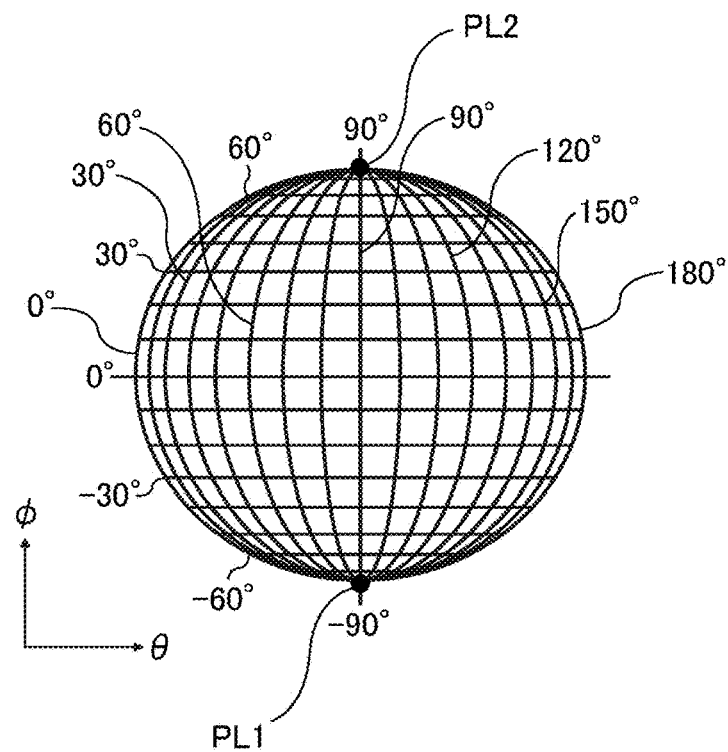
FIG. 28 is a view illustrating an example of full-view spherical image.
Figure 29:
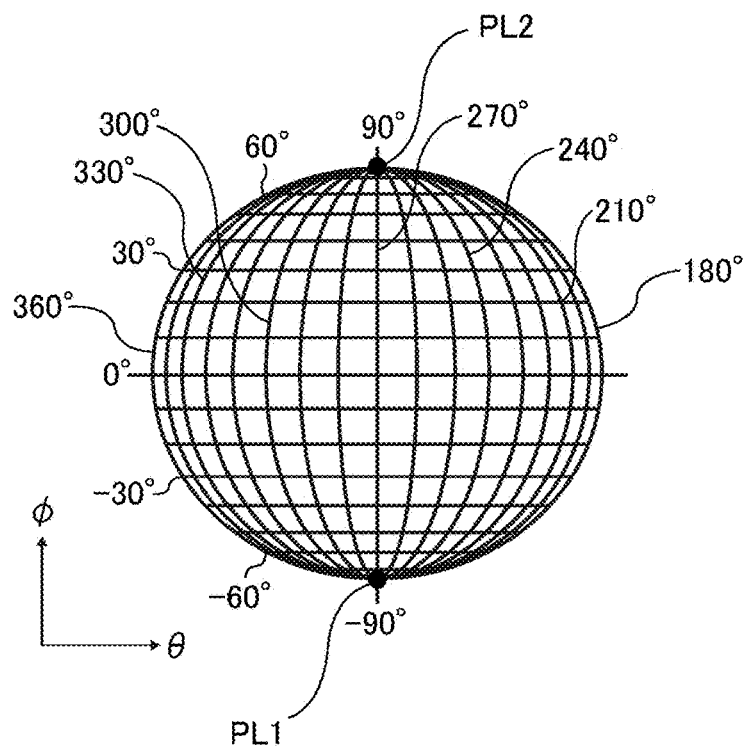
FIG. 29 is another view illustrating an example of full-view spherical image.

Hereinafter, a description is given of a process of converting the position information on the full-view spherical image into the coordinates on the planar image, converted from the full-view spherical image, with reference to FIGS. 28 and 29. FIGS. 28 and 29 are views illustrating an example of the full-view spherical image. FIG. 28 is a diagram connecting points of the hemispherical image indicated in FIG. 3A where the incidence angle in the horizontal direction and the incidence angle in the vertical direction become the same with respect to the optical axis. Hereinafter, the incidence angle in the horizontal direction relative to the optical axis is referred to as "θ" and the incidence angle in the vertical direction perpendicular to the optical axis is referred to as "φ" Further, similar to FIG. 28, FIG. 29 is a diagram connecting points of the hemispherical image indicated in FIG. 3B where the incidence angle in the horizontal direction and the incidence angle in the vertical direction become the same with respect to the optical axis.

Figure 30A:
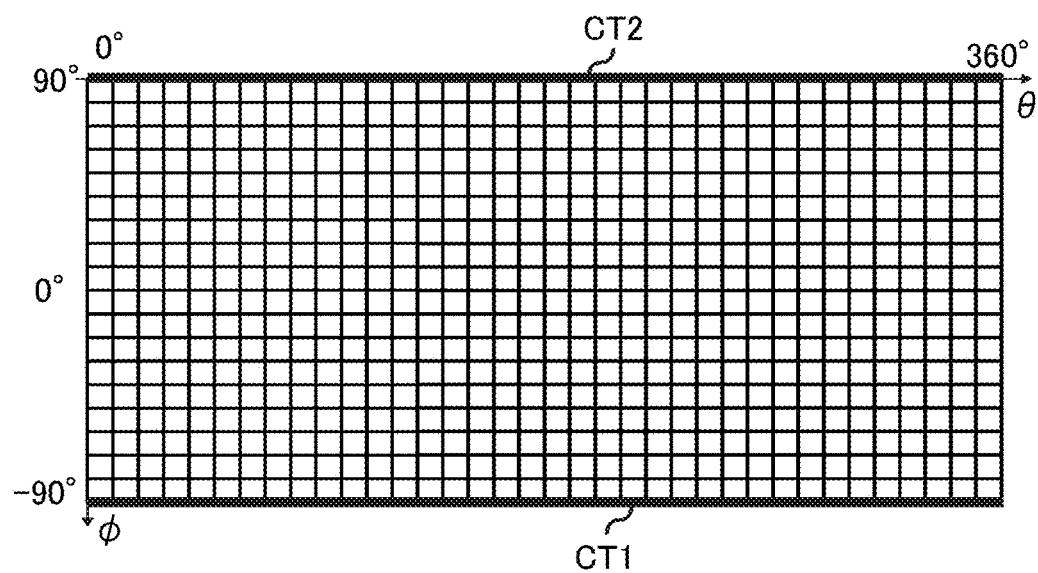
FIGS. 30A and 30B are examples of a planar image converted from a full-view spherical image.

FIG. 30A is an example of an image processed by the Mercator projection method. Specifically, the image indicated in FIG. 30A is generated by the image capturing device 10 as below. The images indicated in FIGS. 28 and 29 are corresponded with each other using a look-up table (LUT) generated in advance, and then images indicated in FIGS. 28 and 29 are processed using the equirectangular projection method, and then the processed images corresponding to the images indicated in FIGS. 28 and 29 are synthesized, with which the planar image indicated in FIG. 30A corresponding to the full-view spherical image is generated by the image capturing device 10. The planar image indicated in FIG. 30A is the equirectangular projection image EC indicated in FIG. 3C.

The synthesis processing of the planar image indicated in FIG. 30A is not limited to the processing of simply arranging the hemispherical images indicated in FIGS. 28 and 29 continuously. For example, if the horizontal direction center of the full-view spherical image is not θ=180°, in the synthesis processing, the image capturing device 10 pre-processes the hemispherical image indicated in FIG. 3A and sets the horizontal direction center as the center of the full-view spherical image. Then, the image capturing device 10 divides the pre-processed image of the hemispherical image indicated in FIG. 3B into a size that can be set on the left and right halves of the image to generate the equirectangular projection image EC indicated in FIG. 3C by synthesizing the hemispherical images.

Further, as to the planar image indicated in FIG. 30A, portions corresponding to polar points (PL1 or PL2) of the hemispherical images (the full-view spherical image) indicated in FIGS. 28 and 29 become line segments CT1 and CT2. This is because, as indicated in FIG. 4A. and FIG. 4B, the full-view spherical image (e.g., full-view spherical image CE) is created by attaching the planar image (the equirectangular projection image EC) indicated in FIG. 30A onto a spherical surface using Open Graphics Library for Embedded Systems (OpenGLES).

Figure 30B:
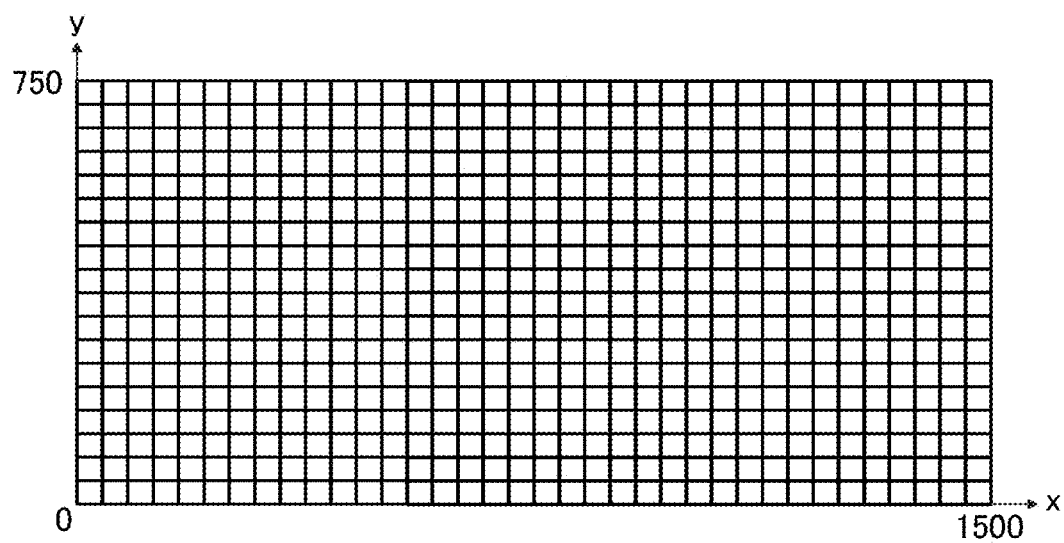

Further, as indicated in FIG. 30B, the captured image data 600 or the processed image data 650, which are the full-view spherical image data stored in the image capturing device 10 or the control server 50, are stored as the planar image assigned with two-dimensional coordinates.

In step S372 (FIG. 27), the determination unit 58 of the control server 50 determines whether or not an analysis area can be set or formed using the area coordinates calculated by the coordinate calculation unit 54. The determination unit 58 determines whether or not a closed region can be set or formed on the planar image using the area coordinates calculated by the coordinate calculation unit 54. If the determination unit 58 determines that the closed region can be set or formed (S372: YES), the determination unit 58 proceeds the sequence to step S374, in which the area coordinates calculated by the coordinate calculation unit 54 is stored in the area information management DB 5003 (see FIG. 17) as the area information. On the other hand, if the determination unit 58 determines that the closed region cannot be set or formed (S372: NO), the determination unit 58 proceeds the sequence to step S373.

If the analysis area cannot be set or formed using the calculated area coordinates (S372: NO), in step S373, the coordinate calculation unit 54 of the control server 50 calculates additional coordinates based on the calculated area coordinates. Then, in step S374, the analysis area setting unit 55 sets the analysis area using the area coordinates and the additional coordinates calculated by the coordinate calculation unit 54. Specifically, the analysis area setting unit 55 stores the area coordinates and the additional coordinates calculated by the coordinate calculation unit 54 in the area information management DB 5003 (see FIG. 17) as the area information.

Hereinafter, a description is given of an example method of calculating additional coordinates with reference to FIGS. 31 to 33. Each image indicated in FIGS. 31 to 33 is the planar image converted from the full-view spherical image indicated in FIG. 30, and the area coordinates on the planar image corresponding to the input position input on the full-view spherical image are displayed.

Figure 31:
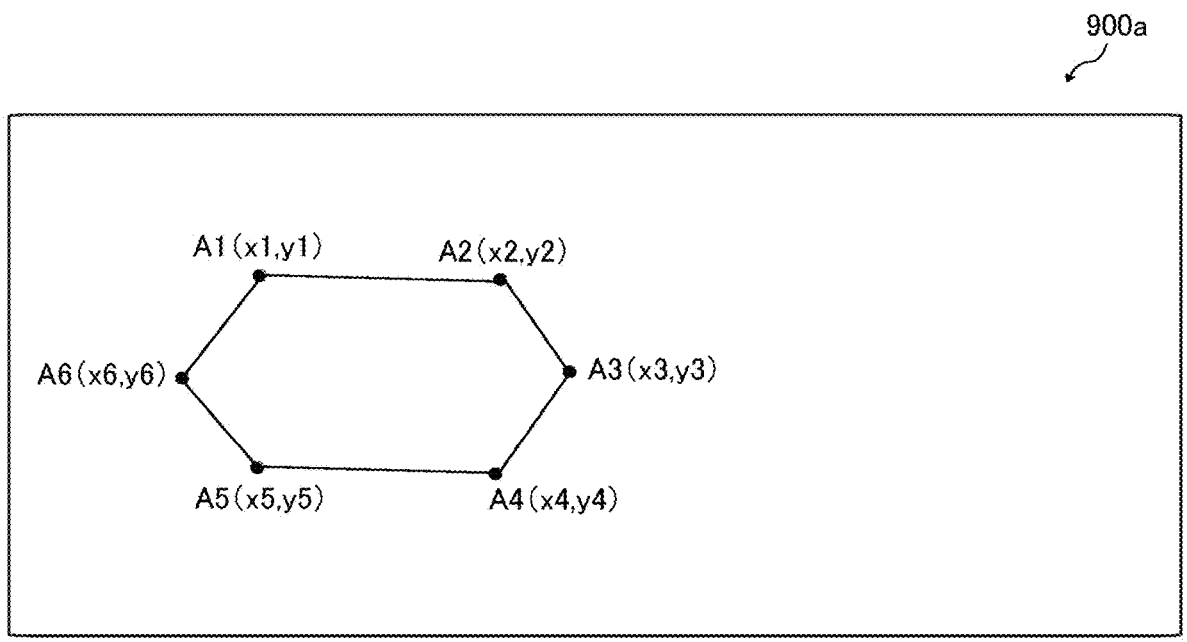
FIG. 31 is a conceptual view illustrating an example 1 of coordinates on a planar image calculated by a control server according to the first embodiment.

FIG. 31 is a conceptual view illustrating an example 1 of coordinates on the planar image calculated by the control server 50 according to the first embodiment. In a planar image 900a indicated in FIG. 31, a polygon of the closed region using six sets of area coordinates is formed. In an example case in FIG. 31, since the closed region can be formed using the area coordinates (step S372: YES), the coordinate calculation unit 54 does not calculate the additional coordinates.

Figure 32:
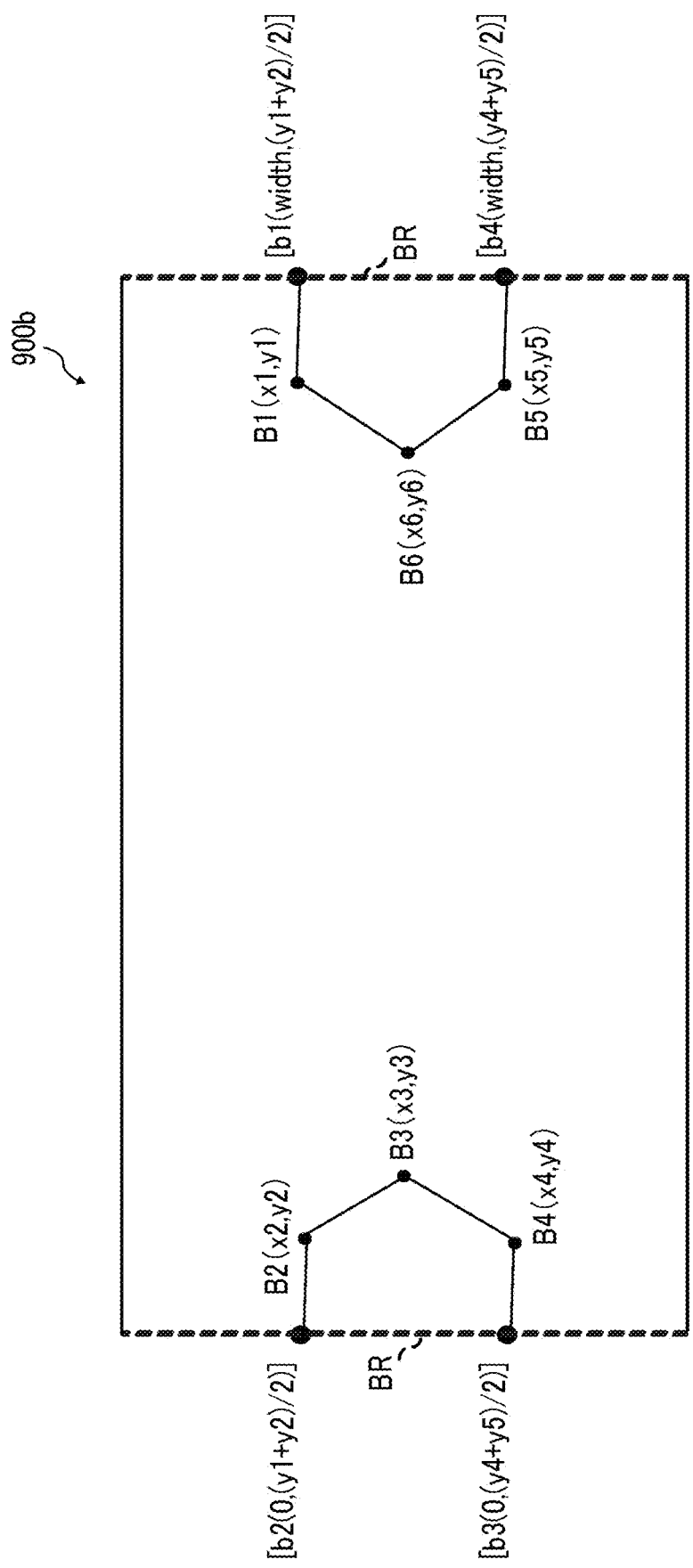
FIG. 32 is a conceptual view illustrating an example 2 of coordinates on a planar image calculated by a control server according to the first embodiment.
Figure 33:
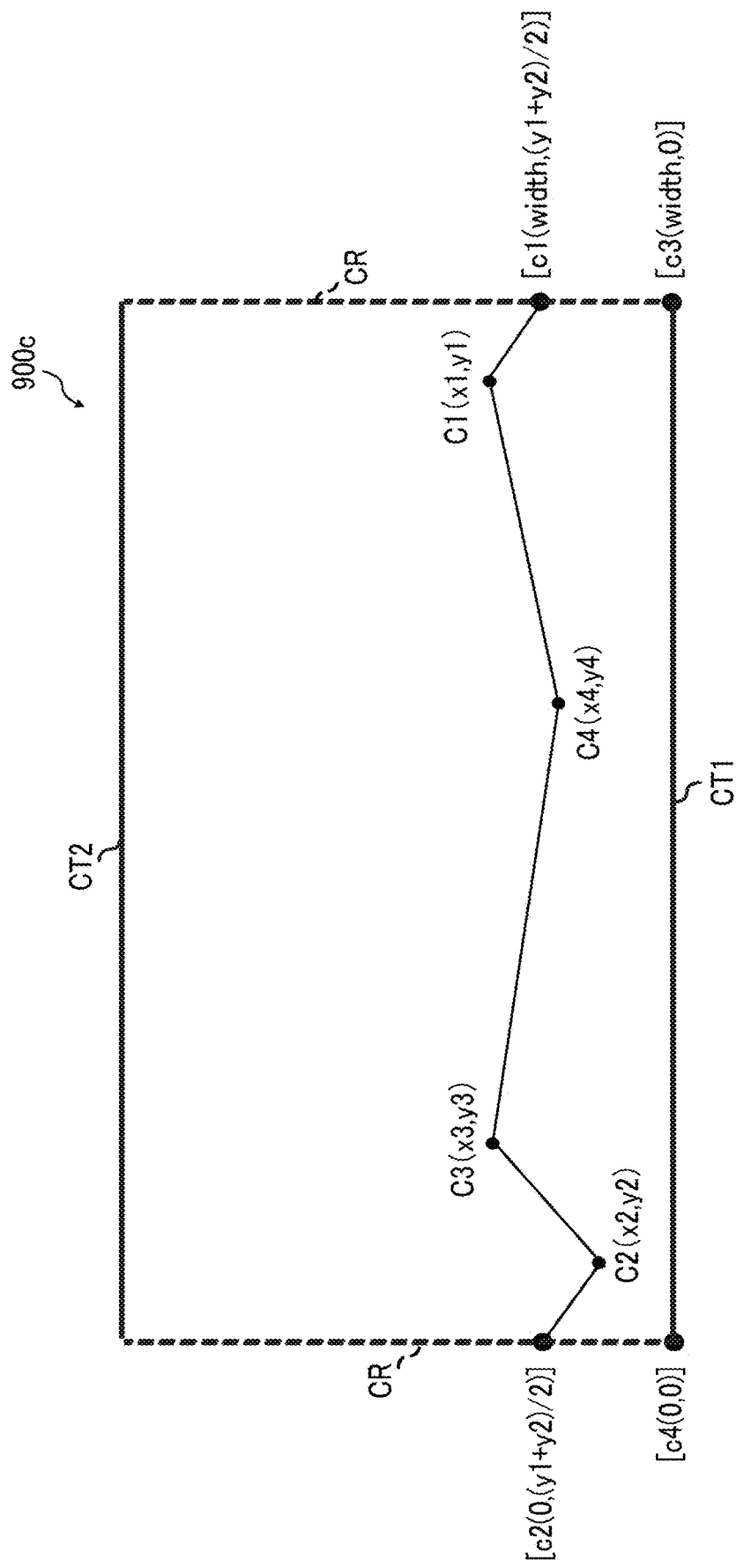
FIG. 33 is a conceptual view illustrating an example 3 of coordinates on a planar image calculated by a control server according to the first embodiment.

FIG. 32 is a conceptual view illustrating an example 2 of coordinates on the planar image calculated by the control server 50 according to the first embodiment. In a planar image 900b indicated in FIG. 32, six sets of area coordinates of "B1 to B6" are calculated by the coordinate calculation unit 54, but an analysis area formed by using the six sets of area coordinates is divided at a boundary BR of the planar image 900b. In other words, when the coordinate calculation unit 54 calculates the coordinates in a direction from area coordinates B1(x1, y1) to area coordinates B2(x2, y2), the boundary BR is crossed, and when the coordinate calculation unit 54 calculates the coordinates in a direction from area coordinates B4(x4, y4) to area coordinates B5 (x5, y5), the boundary BR is crossed again. Thus, the closed region cannot be formed on the planar image 900b using the area coordinates designated for setting the closed region on the full-view spherical image (step S372: NO).

Therefore, the coordinate calculation unit 54 calculates coordinates of "b 1" to "b4" indicating the boundary BR of the planar image 900b, which is a divided portion, as the additional coordinates. Specifically, since the closed region formed on the full-view spherical image is divided between the area coordinates B1(x1, y1) and the area coordinates B2 (x2, y2), the coordinate calculation unit 54 calculates the divided portion as the additional coordinates "b1" and "b2." The area coordinates B1 and area coordinates B2 are examples of first coordinates and second coordinates, respectively. Further, the additional coordinates "b1" and additional coordinates "b2" are examples of first additional coordinates and second additional coordinates, respectively.

Further, since the closed region formed on the full-view spherical image is divided between the area coordinates B4 (x4, y4) and the area coordinates B5 (x5, y5), the coordinate calculation unit 54 calculates the divided portion as the additional coordinates "b3" and "b4." The area coordinates B4 and area coordinates B5 are examples of third coordinates and fourth coordinates, respectively. Further, the additional coordinates "b3" and additional coordinates "b4" are examples of third additional coordinates and fourth additional coordinates, respectively.

Therefore, the analysis area setting unit 55 can set an analysis area, which becomes a closed region on the planar image 900b, using the area coordinates "B1" to "B6" and the additional coordinates "b1" to "b4." The analysis area setting unit 55 assigns an area ID to one area set or formed on the planar image 900b using the area coordinates "B1, B5 and B6" and the additional coordinates "b1" and "b4" and registers the area ID assigned to the one area in the area information management DB 5003 (see FIG. 17) as the area information. Further, the analysis area setting unit 55 assigns an area ID to another one area set or formed on the planar image 900b using the area coordinates "B2, B3 and B4" and the additional coordinates "b2" and "b3" and registers the area ID assigned to another one area in the area information management DB 5003 (see FIG. 17) as the area information. Then, the analysis area setting unit 55 assigns a common area ID for the two area IDs to set one analysis area. With this configuration, even if the area designated by the user on the full-view spherical image is divided on the planar image, the control server 50 can calculate the additional coordinates corresponding to the divided portion and can set the analysis area on the planar image in line with the user's intention.

FIG. 33 is a conceptual view illustrating an example 3 of coordinates on the planar image calculated by the control server 50 according to the first embodiment. In a planar image 900c indicated in FIG. 33, an area right under the vertical direction (or right above the vertical direction) of the image capturing device 10 is set. As to the planar image 900c indicated in FIG. 33, four sets of area coordinates of "C1" to "C4" are calculated by the coordinate calculation unit 54, but an analysis area formed by using the four sets of area coordinates "C1" to "C4" cannot form a closed region (step S372: NO). This is because the area input or entered to the full-view spherical image is an area including the polar point of the full-view spherical images indicated in FIGS. 28 and 29. For example, a position on the planar image corresponding to the polar point of the full-view spherical image becomes the line segment CT as indicated in FIG. 33. Different from the planar image 900b indicated in FIG. 32, in the planar image 900c indicated in FIG. 33, when the area coordinates are calculated by the coordinate calculation unit 54, the boundary CR of the planar image (corresponding to the boundary BR indicated in FIG. 32) is crossed for once, but the boundary CR is not crossed twice.

Thus, the coordinate calculation unit 54 calculates coordinates of "c1" to "c4" indicating the boundary CR of the planar image 900c, which is the divided portion, as the additional coordinates. Specifically, since the closed region formed on the full-view spherical image is divided between the area coordinates C1 (x1, y1) and the area coordinates C2 (x2, y2), the coordinate calculation unit 54 calculates the divided portion on the boundary CR as the additional coordinates "c1" and "c2." The area coordinates C1 and area coordinates C2 are examples of first coordinates and second coordinates, respectively. Further, the additional coordinates "c1" and additional coordinates "c2" are examples of first additional coordinates and second additional coordinates, respectively.

Further, since the boundary CR is not crossed twice when calculating the area coordinates, the coordinate calculation unit 54 calculates both end points of the line segment CT on the planar image corresponding to the specific polar point of the full-view spherical image as the additional coordinates "c3" and "c4," respectively. The additional coordinates "c3" and additional coordinates "c4" are examples of fifth additional coordinates and sixth additional coordinates, respectively. Further, the area coordinates C3 and area coordinates C4 are examples of third coordinates and fourth coordinates, respectively.

Therefore, the analysis area setting unit 55 can set the analysis area that becomes the closed region on the planar image 900c using the area coordinates "C1" to "C4" and the additional coordinates "c1" to "c4." The analysis area setting unit 55 can assign an area ID to one area set on the planar image 900c using the area coordinates "C1" to "C4" and the additional coordinates "c1" to "c4" and registers the area ID assigned to the one area in the area information management DB 5003 (see FIG. 17) as the area information. Different from an example case in FIG. 32, in an example case in FIG. 33, since the boundary CR of the planar image 900c is not crossed twice (two times), one analysis area does not include the areas assigned with a plurality of area IDs. With this configuration, even if the area designated by the user on the full-view spherical image includes the polar point of the full-view spherical image, the control system 5 can calculate the additional coordinates on the planar image corresponding to the polar point and can set the analysis area on the planar image in line with the user's intention.

As above described, even if the area designated by the user on the full-view spherical image cannot be formed on the planar image, the control server 50 can calculate the additional coordinates and set the analysis area on the planar image in line with the user's intention. Therefore, the control server 50 can set any area designated by the user on the full-view spherical image as the analysis area for the flow line analysis using the full-view spherical image.

In the description of FIGS. 27 to 34, an example case of acquiring the full-view spherical image by performing the image capturing processing using the image capturing device 10 is described, but the image acquired by the image capturing device 10 is not limited to the full-view spherical image. For example, the image acquired by the image capturing device 10 can be any wide angle image having an angle of view equal to or greater than a pre-set value. In this case, the wide-angle image is captured by the image capturing device 10 such as a wide-angle camera or a stereo camera and acquired as wide-angle image data. That is, the image capturing device 10 can be any image capturing device capable of acquiring any image, such as full-view spherical image and wide-angle image, captured using a lens having a shorter focal length than a pre-set value.

As to the information processing system 1 of the first embodiment, before or after capturing images using the image capturing device 10, the analysis area where the viewer person Y wants to analyze can be set without taking too much time for preparing settings for performing the flow line analysis. Further, as to the information processing system 1, since the time required for preparing settings for performing the flow line analysis can be set shorter, the installation time of the image capturing device 10, the communication terminal 30 and the related equipment can be set shorter, thereby reducing the installation cost. Further, since the analysis area can be designated in line with the intention of the viewer person Y, reworking such as re-analysis can be avoided or prevented.

Second Embodiment

Hereinafter, a description is given of an information processing system 2 according to a second embodiment. The same configuration and same function as those of the first embodiment are denoted by the same reference numerals, and the description thereof will be omitted. In the information processing system 2 according to the second embodiment, the image capturing system 3 performs the detection process of person included in the captured image data acquired by the image capturing device 10. With this configuration, the information processing system 2 can reduce the processing load of the control server 50.

System Configuration

Figure 34:
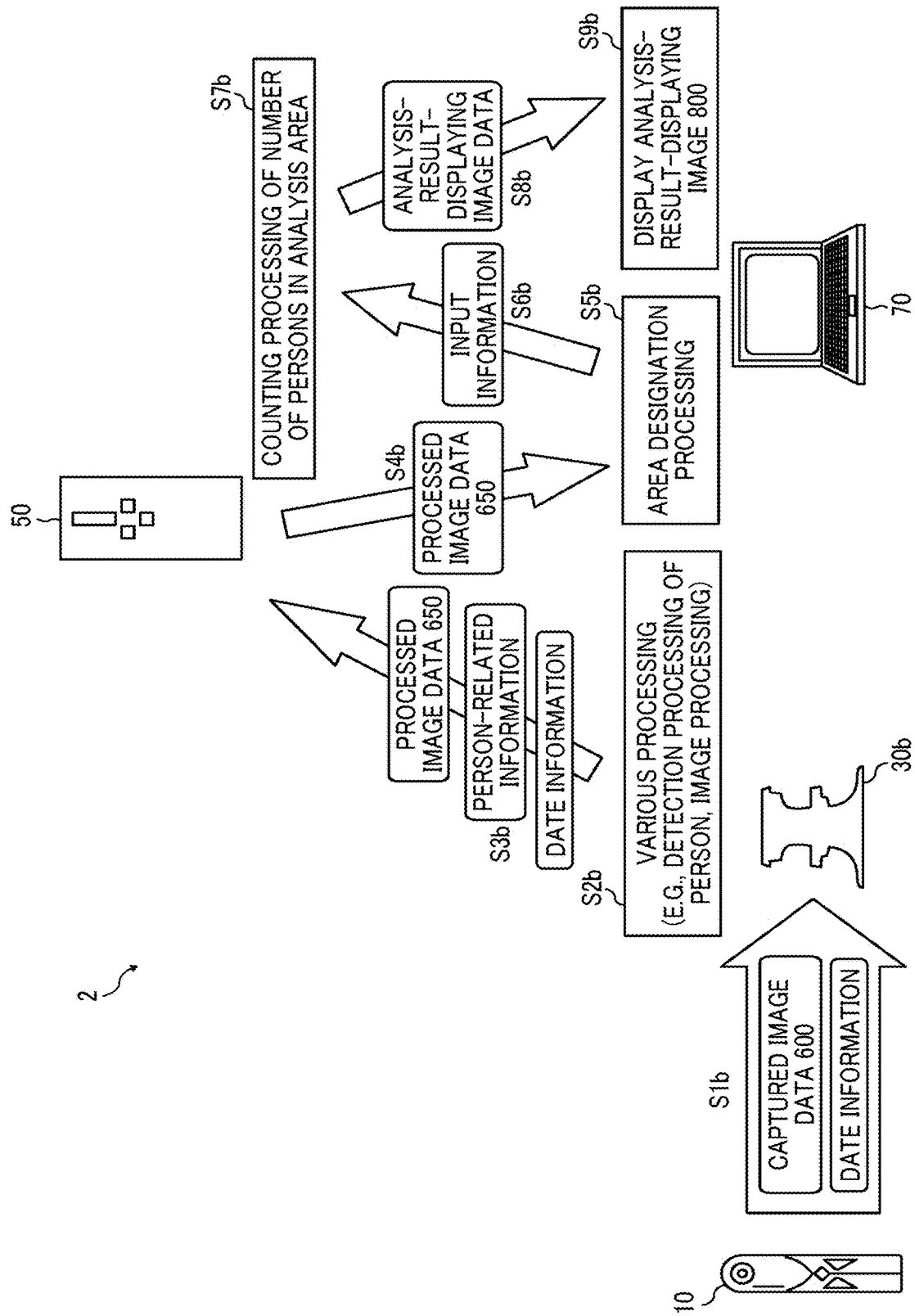
FIG. 34 is an example of an outline of processing in an information processing system according to the second embodiment.

Hereinafter, a description is given of a system configuration of the information processing system 2 according to the second embodiment with reference to FIG. 34. FIG. 34 is an example of an outline of processing in the information processing system 2 according to the second embodiment.

At first, the communication terminal 30 receives, from the image capturing device 10, the captured image data 600 corresponding to one or more images of one or more objects in a specific space captured by the image capturing device 10, and date information indicating date and time when the one or more images are captured by the image capturing device 10 (step S1b). Hereinafter, the image may mean one or more images.

Then, the communication terminal 30 detects one or more images of one or more persons included in the received captured image data 600 and detects coordinates of the one or more persons indicating one or more positions of the one or more persons in the captured image data 600 (step S2b). Hereinafter, for the simplicity of description, the one or more images may be referred to as the image and the one or more persons may be referred to as the person. Further, the communication terminal 30 performs blur processing to the image of detected person to generate the processed image data 650 (step S2b).

Then, the communication terminal 30 transmits, to the control server 50, the person-related information including the detected person coordinates, the generated processed image data 650, and the date information received in step S1b (step S3b). Then, the control server 50 transmits the received processed image data 650 to the display terminal 70 (step S4b). Since steps 5b to S9b in FIG. 34 are the same as steps 5a to S9a in FIG. 9, the description thereof will be omitted.

With this configuration, as to the information processing system 2, the communication terminal 30 performs the detection processing of person and uploads the detection result and the processed image data 650 to the control server 50. Therefore, the processing load of the control server 50 can be reduced. Further, as to the information processing system 2, since the processed image data 650 with less data size, compared to the data size of the captured image data 600 acquired by the image capturing device 10, is transmitted to the control server 50, the load on the communication band of the communication network 7 can be reduced. Further, as to the information processing system 2, since the captured image data 600 before performing given image processing is not transmitted to the control server 50, the security risk caused by storing the captured image data 600 in the control server 50 can be can reduced.

Functional Configuration

Figure 35A:
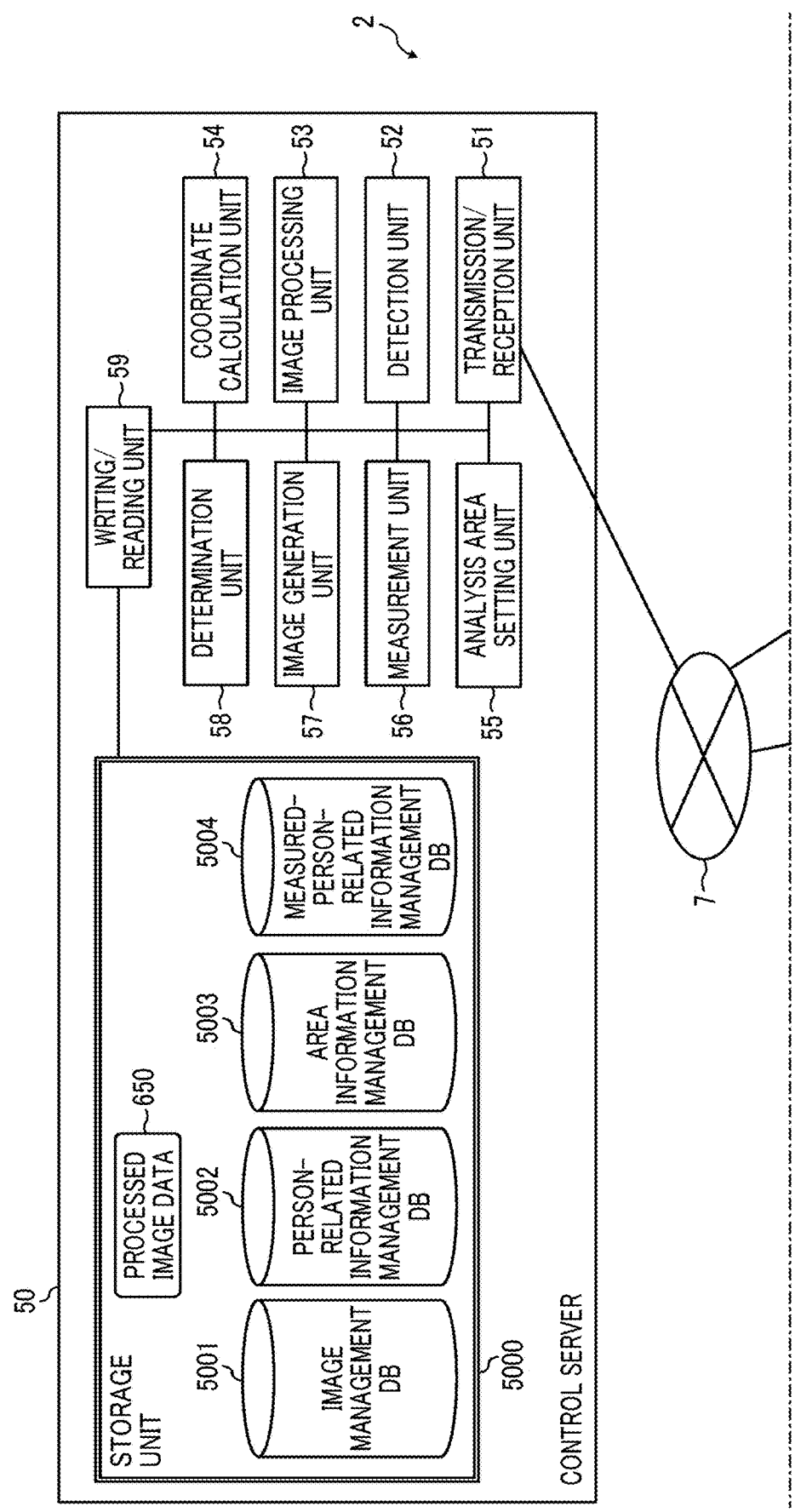
FIGS. 35A and 35B (FIG. 35) is an example block diagram of functional configuration of an information processing system according to the second embodiment.
Figure 35B:
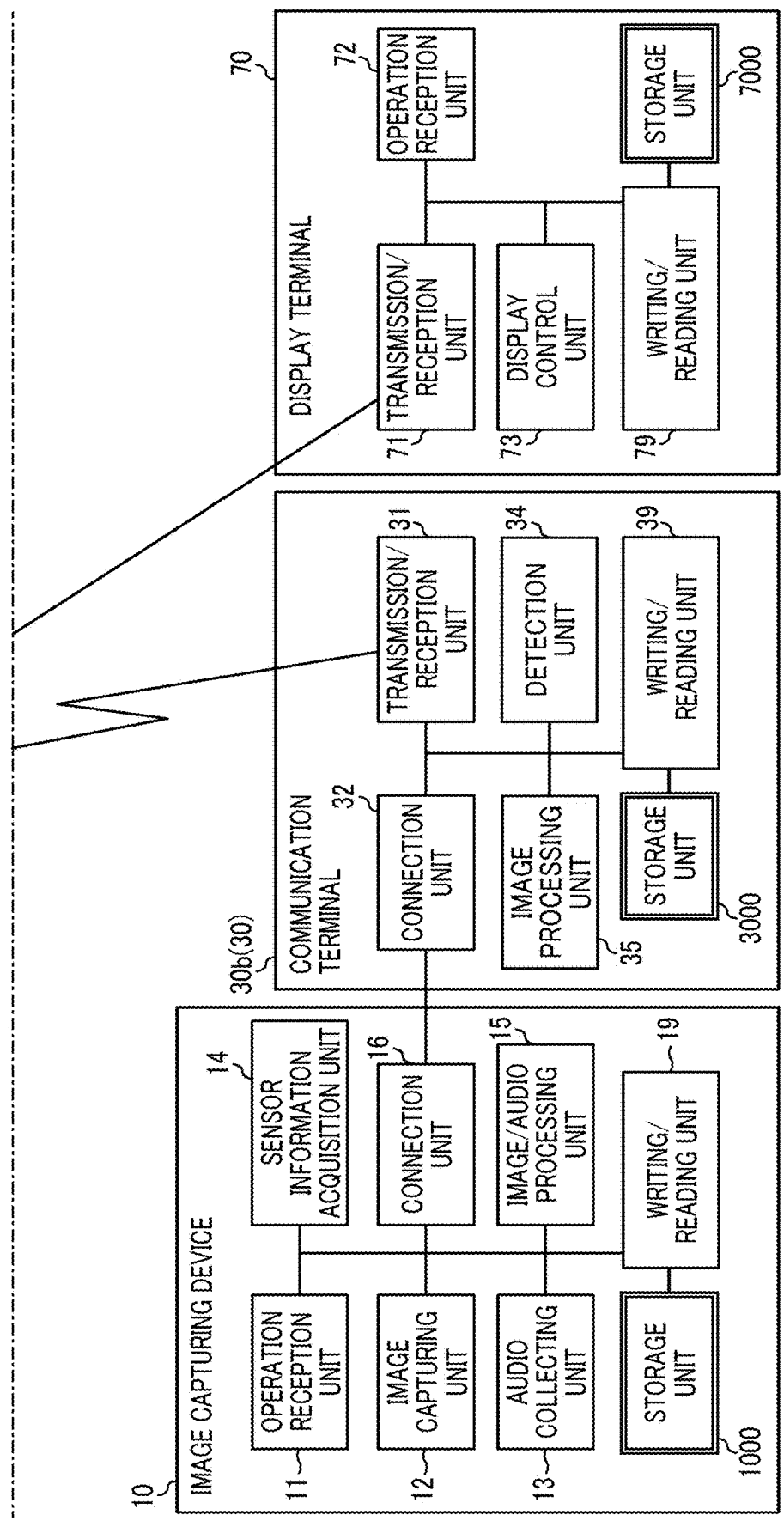

FIGS. 35A and 35B (FIG. 35) is an example block diagram of functional configuration of the information processing system 2 according to the second embodiment. The function implemented by a communication terminal 30b includes, for example, a detection unit 34 and an image processing unit 35 in addition to the functions included in the communication terminal 30a (FIG. 14). Since other functions indicated in FIG. 35 are the same as those indicated in FIG. 14, the description thereof will be omitted.

The detection unit 34 has a function of detecting an image of a person included in the captured image data. The detection processing of image of person can be performed using a person detection method of support vector machine (SVM) and the like. Further, based on the detected image of person, the detection unit 34 detects person coordinates indicating a position of the person in the captured image data 600.

In this configuration, the person coordinates is an example of coordinates of a particular or specific movable object (movable object coordinates). The detection unit 34 is mainly implemented by the processing performed by the CPU 301 indicated in FIG. 11. The detection unit 34 is an example of the second detection unit.

The image processing unit 35 performs various processing on the captured image data 600 transmitted from the image capturing device 10. For example, the image processing unit 35 performs blur processing to blur an image of person existing in the captured image data 600, detected by the detection unit 34. The image processing unit 35 is mainly implemented by the processing performed by the CPU 301 indicated in FIG. 11.

Processing or Operation in Second Embodiment

Figure 36:
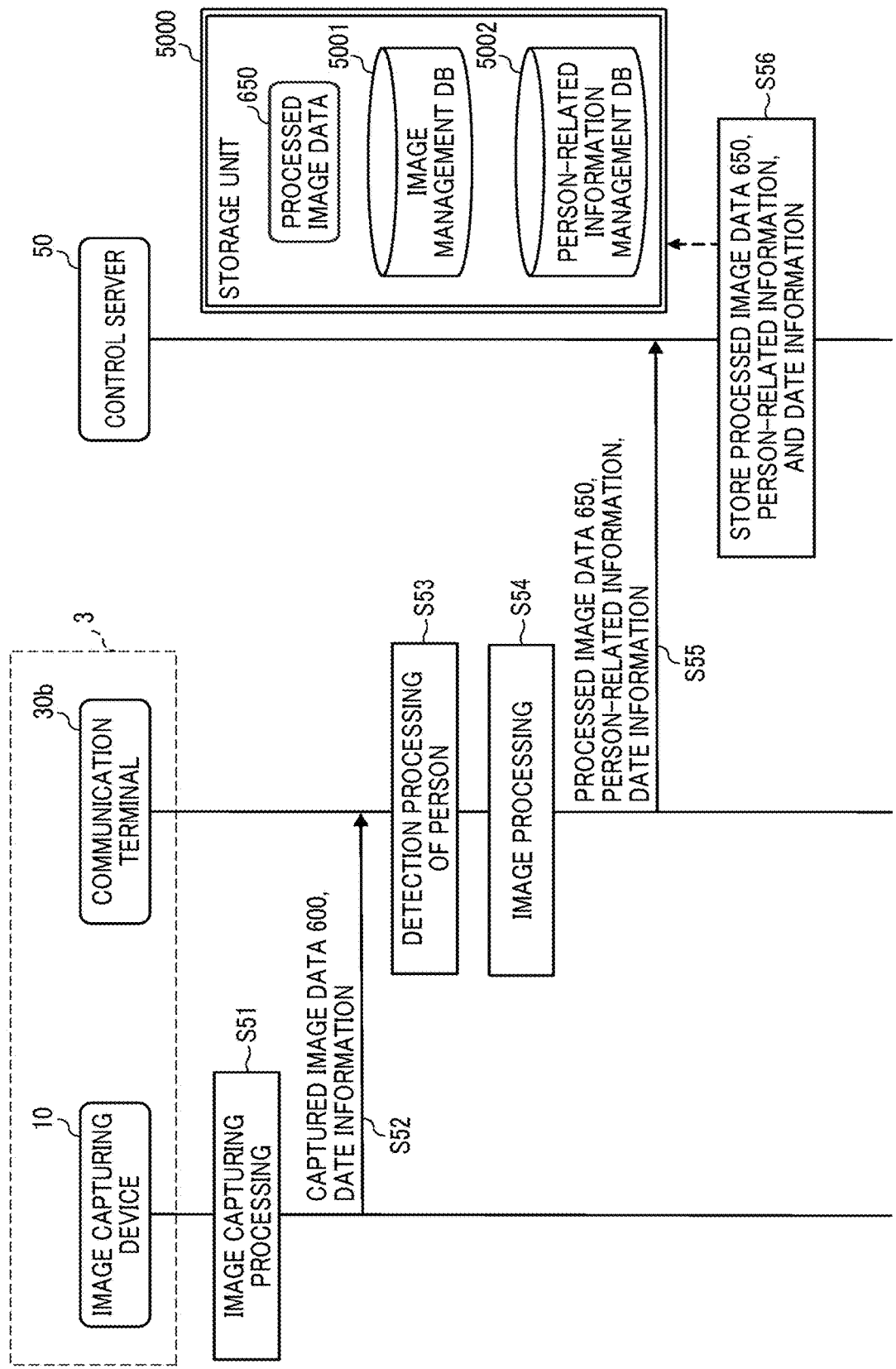
FIG. 36 is a sequence diagram illustrating an example of a process of acquiring person-related information according to the second embodiment. The accompanying drawings are intended to depict embodiments of the present invention and should not be interpreted to limit the scope thereof. The accompanying drawings are not to be considered as drawn to scale unless explicitly noted.

Hereinafter, a description is given of processing or operation in the information processing system 2 according to the second embodiment with reference to FIG. 36. FIG. 36 is a sequence diagram illustrating an example of a process of acquiring the person-related information according to the second embodiment. In the second embodiment, the processing other than the acquisition processing of the person-related information indicated in FIG. 36 is the same as each processing described in FIG. 19 in the first embodiment, and thereby the description thereof will be omitted.

In step S51, the image capturing device 10 performs the image capturing processing using the image capturing unit 12. The image capturing unit 12 of the image capturing device 10 acquires the captured image data 600, corresponding to an image of an object in a specific space captured by the image capturing device 10 disposed or used in the specific space.

In step S52, the connection unit 16 of the image capturing device 10 transmits, to the communication terminal 30*b*, the captured image data 600 acquired by the image capturing unit 12, and date information indicating the image-captured date and time when the captured image data 600 was acquired. With this configuration, the connection unit 32 of the communication terminal 30*b* receives the captured image data 600 and the date information transmitted from the image capturing device 10.

In step S53, the detection unit 34 of the communication terminal 30*b* performs the detection processing of person included in the captured image data 600 received by the connection unit 32. The detection unit 34 detects an image of the person included in the received image data 600. The detection processing of image of person can be performed using a person detection method of support vector machine (SVM) and the like. Further, based on the detected image of person, the detection unit 34 detects person coordinates indicating a position of the person in the captured image data 600.

In step S54, the image processing unit 35 of the communication terminal 30*b* performs the image processing on the captured image data 600. For example, the image processing unit 35 performs blur processing to blur an image of person detected by the detection unit 34. The image processing performed in step S54 is not limited to the blur processing, but other image processing can be performed on the captured image data 600 in addition to the blur processing. Then, the image processing unit 35 performs given image processing on the captured image data 600 to generate the processed image data 650 as a processed image.

In step S55, the transmission/reception unit 31 of the communication terminal 30*b* transmits, to the control server 50, the processed image data 650 processed by the image processing unit 35, the person-related information including the person coordinates detected by the detection unit 34, and the date information received by the connection unit 32. Then, the transmission/reception unit 51 of the control server 50 receives the processed image data 650, the person-related information and the date information transmitted from the communication terminal 30. With this configuration, the processed image data 650 processed by the communication terminal 30*b* is uploaded to the control server 50.

In step S56, the writing/reading unit 59 of the control server 50 stores the processed image data 650 received by the transmission/reception unit 51 in the storage unit 5000. Further, the writing/reading unit 59 associates the date information received by the transmission/reception unit 51 and the processed image data 650 to store the date information and the processed image data 650 in the image management DB 5001 (see FIG. 15) in association with each other. Further, the writing/reading unit 59 stores the person-related information received by the transmission/reception unit 51 in the person-related information management DB 5002 (see FIG. 16).

As to the information processing system 2 according to the second embodiment, the image capturing system 3 performs the process of detecting a person included in the captured image data 600, and thereby the processing load of the control server 50 can be reduced. Further, as to the information processing system 2, since the processed image data 650 with less data size, compared to the data size of the captured image data 600 acquired by the image capturing device 10, is transmitted to the control server 50, the load on the communication band of the communication network 7 can be reduced.

As described above, the control system 5 according to the one or more embodiments performs an analysis in a specific space using images captured and acquired by the image capturing device 10. The control system 5 receives the captured image data 600 or the processed image data 650 (an example of image data) transmitted from the image capturing device 10, and stores the received captured image data 600 and/or the received processed image data 650 with the person coordinates (an example of movable object coordinates) indicating the position of person (an example of particular or specific movable object) included in the captured image data 600 or the processed image data 650 in association with each other. Further, the control system 5 receives an input for setting a given analysis area (an example of closed region) on an image, corresponding to the stored image data, being displayed on the display 708 (an example of display unit), and measures the number of persons in the specific analysis area based on the area coordinates (an example of closed region coordinates) indicating the coordinates of the specific analysis area that is set using the received input, and the stored person coordinates. With this configuration, the control system 5 can perform the above described information processing method according to the one or more embodiments for performing an analysis for any given area without taking too much time for preparing settings of the analysis.

Further, the control system 5 detects the person coordinates (an example of movable object coordinates) indicating the position of person (an example of particular or specific movable object) included in the received image data 600 and/or the processed image data 650 (an example of image data), and stores the received image data 600 and/or the processed image data 650 and the detected person coordinates in association with each other. With this configuration, the control system 5 can store the person coordinates indicating the position of person in the captured image transmitted from the image capturing device 10 for each captured image before performing the analysis in any given area, with which the analysis area where the user wants to analyze can be set before or after capturing images using the image capturing device 10.

Further, the control system 5 displays the analysis-result-displaying image 800 (an example of screen image) including the number of persons (an example of particular or specific movable object) for each of a plurality of analysis areas (an example of closed region) on the display 708 (an example of display unit). With this configuration, the control system 5 can present or provide the user the measured result of person existing in each analysis area per time zone at a location, with which the user can use the analysis result effectively.

Further, the control system 5 can store the received captured image data 600 and/or the processed image data 650 (an example of image data), the date and time when the captured image related to the captured image data 600 or the processed image data 650 was acquired by the image capturing device 10, and the person coordinates (an example of movable object coordinates) indicating the position of person (an example of particular or specific movable object) included in the captured image data 600 and/or the processed image data 650 in association with each other, can measure the number of persons in a specific analysis area (an example of closed region) at the date and time associated with the captured image data 600 and/or the processed image data 650, and can display the number of persons in the specific analysis area in time series on the display 708 (an example of display unit) based on the date and time when the image of person was acquired by the image capturing device 10. With this configuration, the control system 5 can perform the analysis processing for each analysis area corresponding to the image-captured date and time recorded by the image capturing device 10 based on the analysis area set by the user, and the person-related information, included in the processed image data 650 and detected by performing the processing different from the setting of analysis area.

Further, the information processing system according to the one or more embodiments includes the control system 5, and the image capturing system 3 including the image capturing device 10 connected to the control system 5 via the communication network 7. The image capturing system 3 detects the person coordinates (an example of movable object coordinates) indicating the position of person (an example of particular or specific movable object) included in the captured image data 600 (an example of image data) of an image captured for a specific space, and transmits the processed image data 650 (an example of image data) and the detected person coordinates related to the captured image to the control system 5 via the communication network 7. Then, the control system 5 stores the processed image data 650 and the person coordinates transmitted from the image capturing system 3 in association with each other. With this configuration, as to the information processing system 2, the image capturing system 3 performs the process of detecting each person existing in the captured image data 600, and thereby the processing load of the control server 50 can be reduced. Further, since the processed image data 650 with less data size, compared to the data size of the captured image data 600 acquired by the image capturing device 10, is transmitted to the control server 50, the load on the communication band of the communication network 7 can be reduced.

Further, the control system 5 according to the one or more embodiments performs a method of performing an analysis in a specific space using an image captured and acquired by the image capturing device 10. The method includes receiving the captured image data 600 and/or the processed image data 650 (an example of image data) corresponding to the captured image transmitted from the image capturing device 10; storing, in the storage unit 5000, the received captured image data 600 or the processed image data 650 and the person coordinates (an example of movable object coordinates) indicating the position of the person (an example of particular or specific movable object) included in the captured image data 600 or the processed image data 650; in response to displaying an image generated from the stored captured image data 600 or the processed image data 650 on the display 708 (an example of display unit), receiving an input for setting a specific analysis area (an example of closed region) in the image displayed on the display 708; and measuring the number of persons within the specific analysis area set in the image based on area coordinates of the specific analysis area (an example of closed region coordinates) set by the received input and the stored person coordinates. With this configuration, the control system 5 can perform the above described information processing method according to the one or more embodiments for performing an analysis for any given area without taking too much time for preparing settings of the analysis.

As to the above described one or more embodiments, the control system 5 performs an analysis in a specific space based on a full-view spherical image captured and acquired by the image capturing device 10. The control system 5 receives the full-view spherical image data of the full-view spherical image transmitted from the image capturing device 10, and stores the planar image data converted from the full-view spherical image data received from the image capturing device 10. Then, the control system 5 can receive an input for setting a specific analysis area (an example of closed region) on the full-view spherical image displayed on the display 708 (an example of display unit), calculates coordinates on the planar image data corresponding to the received input for the full-view spherical image, and can measure the number of persons existing in the specific analysis area based on the area coordinates (an example of closed region coordinates) indicating the coordinates of the specific analysis area, which is set by the calculated coordinates, and the person coordinates (an example of movable object coordinates) on the planar image data indicating the position of person (an example of particular or specific movable object) included in the full-view spherical image. With this configuration, the control system 5 can set any area on the full-view spherical image designated by the user as an analysis area for the analysis using the full-view spherical image.

Further, as to the above described one or more embodiments, if the closed region cannot be formed on the planar image data using the calculated coordinates, the control system 5 can calculate the additional coordinates to be used for forming the closed region, and set a specific analysis area (an example of closed region) based on the calculated coordinates and the additional coordinates. With this configuration, the control system 5 can calculate the additional coordinates when the closed region cannot be formed on the planar image using the area designated by the user on the full-view spherical image, and can set the analysis area on the planar image in line with the user's intention using the calculated additional coordinates.

Further, as to the above described one or more embodiments, if the closed region formed on the full-view spherical image data is divided between the calculated first coordinates (e.g., area coordinates B1 in FIG. 32) and the calculated second coordinates (e.g., area coordinates B2 in FIG. 32) on the planar image data, the control system 5 can calculate the coordinates indicating the divided portion as the first additional coordinates (e.g., additional coordinates "b1" in FIG. 32) and the second additional coordinates (e.g., additional coordinates "b2" in FIG. 32). Further, if the closed region formed on the full-view spherical image data is divided between the calculated third coordinates (e.g., area coordinates B4 in FIG. 32) and the calculated fourth coordinates (e.g., area coordinates B5 in FIG. 32) on the planar image data, the control system 5 calculates the coordinates indicating the divided portion as the third additional coordinates (e.g., additional coordinates "b3" in FIG. 32) and the fourth additional coordinates (e.g., additional coordinates "b4" in FIG. 32). Then, the control system 5 can set a specific analysis area (an example of closed region) using the first coordinates, the second coordinates, the third coordinates, the fourth coordinates, the first additional coordinates, the second additional coordinates, the third additional coordinates, and the fourth additional coordinates. With this configuration, even if the area designated by the user on the full-view spherical image is divided on the planar image, the control system 5 can calculate the additional coordinates indicating the divided portion and set the analysis area on the planar image in line with the user's intention using the calculated additional coordinates.

Further, as to the above described one or more embodiments, if the closed region formed on the full-view spherical image data is divided between the calculated first coordinates (e.g., area coordinates C1 in FIG. 33) and calculated the second coordinates (e.g., area coordinates C2 in FIG. 33) on the planar image data, the control system 5 calculates the coordinates indicating the divided portion as the first additional coordinates (e.g., additional coordinates "c1" in FIG. 33) and the second additional coordinates (e.g., additional coordinates "c2" in FIG. 33). Further, if the closed region formed on the full-view spherical image data is not divided between the calculated third coordinates (e.g., area coordinates C3 in FIG. 33) and the calculated fourth coordinates (e.g., area coordinates C4 indicated in FIG. 33), the control system 5 can calculate both end points of the line segment CT on the planar image corresponding to the specific polar point of the full-view spherical image as the fifth additional coordinates (e.g., additional coordinates "c3" in FIG. 33) and the sixth additional coordinates (e.g., additional coordinates "c4" in FIG. 33). Then, the control system 5 can set a specific analysis area (an example of closed region) using the first coordinates, the second coordinates, the third coordinates, the fourth coordinates, the first additional coordinates, the second additional coordinates, the fifth additional coordinates, and the sixth additional coordinates. With this configuration, even if the area designated by the user on the full-view spherical image includes the polar point of the full-view spherical image, the control system 5 can calculate the additional coordinates corresponding to the position on the planar image corresponding to the polar point, and can set the analysis area on the planar image in line with the user's intention using the calculated additional coordinates.

Further, as to the above described one or more embodiments, the control system 5 can detect the person coordinates (an example of movable object coordinates) on the planar image data indicating the position of person (an example of particular or specific movable object), included in the full-view spherical image data, can store the planar image data and the detected person coordinates in association with each other, and can measure the number of persons (an example of particular or specific movable object) in the specific analysis area based on the stored area coordinates (an example of closed region coordinates) indicating the coordinates of the specific analysis area, which is set by the calculated coordinates, and the stored person coordinates. With this configuration, the control system 5 can store the person coordinates indicating the position of person in the captured image transmitted from the image capturing device 10 for each captured image before performing the analysis, and can set the analysis area where the user wants to analyze before or after capturing images using the image capturing device 10.

Further, as to the above described one or more embodiments, the control system 5 displays the analysis-result-displaying image 800 (an example of screen image) including the number of persons (an example of particular or specific movable object) in each of a plurality of analysis areas (an example of closed region) on the display 708 (an example of display unit). With this configuration, the control system 5 can present or provide the user the measured result of person existing in each analysis area per time zone at a location, with which the user can use the analysis result effectively.

Further, as to the above described one or more embodiments, the control system 5 can store the planar image data converted from the full-view spherical image data, the date and time when the full-view spherical image related to the full-view spherical image data was acquired by the image capturing device 10, and the person coordinates (an example of movable object coordinates) indicating the position of person (an example of particular or specific movable object) included in the full-view spherical image in association with each other, can measure the number of persons in the specific analysis area (an example of closed region) at the date and time associated with the planar image data, and can display the number of persons existing in the specific analysis area in a time series manner on the display 708 (an example of display unit) based on the date and time when the full-view spherical image was acquired by the image capturing device 10. With this configuration, the control server 50 can perform the analysis processing for each analysis area corresponding to the image-captured date and time recorded by the image capturing device 10 based on the set analysis area and the person-related information of the person included in the full-view spherical image and detected by performing the processing different from the setting of analysis area.

Further, as to the above described one or more embodiments, the information processing system includes the control system 5, and the image capturing system 3 including the image capturing device 10 connected to the control system 5 via the communication network 7. The image capturing system 3 can detect the person coordinates (an example of movable object coordinates) indicating the position of person (an example of particular or specific movable object) included in the full-view spherical image data (an example of image data) of the full-view spherical image data captured for a specific space, and can transmit the full-view spherical image data and the detected person coordinates related to the full-view spherical image to the control system 5 via the communication network 7. Then, the control system 5 stores the planar image data converted from the full-view spherical image data and the person coordinates, transmitted from the image capturing system 3, in association with each other. With this configuration, the information processing system can reduce the processing load of the control server 50 because the image capturing system 3 performs the process of detecting person included in the full-view spherical image data.

Further, as to the above described one or more embodiments, the control system 5 performs a method of performing an analysis in a specific space using a full-view spherical image captured and acquired by the image capturing device 10. The method includes receiving full-view spherical image data corresponding to the full-view spherical image transmitted from the image capturing device 10; storing, in the storage unit 5000, planar image data converted from the received full-view spherical image data; in response to displaying the full-view spherical image on the display 708 (an example of display unit), receiving an input for setting a specific analysis area (an example of closed region) in the full-view spherical image displayed on the display 708; calculating coordinates corresponding to the received input on the planar image data; setting the calculated coordinates corresponding to the received input as area coordinates of a specific analysis area (an example of closed region coordinates); calculating the person coordinates (an example of movable object coordinates) on the planar image data indicating the position of person (an example of particular or specific movable object) included in the full-view spherical image; and measuring the number of persons within the specific analysis area based on the set area coordinates of the specific analysis area and the calculated person coordinates. With this configuration, the control system 5 can perform the information processing method to set any area designated by the user on the full-view spherical image as an analysis area when analyzing the full-view spherical image.

In conventional methods, measurement positions are required to be preset as analysis areas, but no one knows whether the set analysis areas are appropriate for measuring the number of persons before starting the capturing operations. Further, if optimal analysis areas are to be set, trial shootings and checking results of trial shootings are required to set the optimal analysis areas before performing the formal analysis, causing longer period of time to set conditions for the analysis. Therefore, it is difficult to perform the analysis at a given area without causing a longer period of time to set conditions for the analysis.

As to the above described one or more embodiments, the analysis can be performed in any area without causing a longer period of time to set conditions for the analysis.

Further, as to the above described one or more embodiments, when an analysis is performed using a full-view spherical image, any area designated by a user on the full-view spherical image can be set as an analysis area.

The functions of each of the above described embodiments can be implemented by computer executable programs written in legacy programming languages and object-oriented programming languages, such as assembler, C, C++, C #, Java (registered trademark), etc., and the programs for performing the functions of each of the above described embodiments can be distributed through the electronic communication line.

Further, the programs for performing the functions of each of the above described embodiments can also be stored in a computer-readable recording medium such as ROM, electrically erasable programmable read-only memory (EEPROM), erasable programmable read-only memory (EPROM), flash memory, flexible disk, compact disc ROM (CD-ROM), compact disc-rewritable (CD-RW), digital versatile disk (DVD)-ROM, DVD-RAM, DVD-RW, Blu-Ray disc, secure digital (SD) card, magneto-optical disc (MO), and the like.

Further, some or all of the functions of each of the above described embodiments can be implemented on a programmable device (PD) such as field programmable gate array (FPGA) or can be implemented as an application specific integrated circuit (ASIC), and can be distributed using a recording medium as data described by hardware description language (HDL), very-high speed integrated circuits hardware description language (VHDL) and Verilog HDL, which can be downloaded to the PD to implement the functions of each of the embodiments on the PD. The HDL, (VHDL) and Verilog HDL are used to generate circuit configuration data (bit stream data) downloaded to the PD to implement the functions of each embodiment on the PD.

Although the control system, information processing system, method of performing an analysis, and storage medium storing a program according to one or more embodiments of the present invention have been described, the present invention is not limited to the above-described embodiment. Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A control system of performing an analysis in a specific space, the system comprising:
   circuitry configured to
   receive image data corresponding to a captured image captured and transmitted from an image capturing device;
   store, in a memory, the received image data in association with coordinates of at least one movable object that indicate a position of the at least one movable object included in the image data;
   in response to displaying an image generated from the stored image data on a display, receive an input, from an operator, arbitrarily setting a specific closed region in the image displayed on the display; and
   analyze the at least one movable object within the specific closed region in the image based on coordinates of the specific closed region set by the received input, and the stored coordinates of the at least one movable object,
   wherein the circuitry is further configured to
   receive spherical image data corresponding to a spherical image transmitted from the image capturing device as the image data;
   store, in the memory, planar image data converted from the received spherical image data;
   in response to displaying a spherical image generated from the received spherical image data on the display, receive an input for setting the specific closed region in the spherical image displayed on the display;
   calculate coordinates on the planar image data corresponding to the received input;
   set the calculated coordinates corresponding to the received input as coordinates of the specific closed region;
   calculate coordinates of the at least one movable object indicating a position of the at least one movable object included in the spherical image data, on the planar image data; and
   analyze the at least one movable object within the specific closed region based on the set coordinates of the specific closed region and the calculated coordinates of the at least one movable object, and
   wherein when the specific closed region cannot be formed on the planar image data using the calculated coordinates corresponding to the received input, the circuitry is further configured to calculate additional coordinates to form the specific closed region, and set the specific closed region on the planar image data based on the calculated coordinates corresponding to the received input and the calculated additional coordinates.

2. The control system according to claim 1, wherein the circuitry is further configured to:
   detect the coordinates of the at least one movable object; and
   store the image data in association with the detected coordinates of the at least one movable object in the memory.

3. The control system according to claim 1, wherein the circuitry is further configured to:
   set the specific closed region in the image data based on the received input; and
   count a number of the at least one movable object within the set specific closed region.

4. The control system according to claim 3, wherein the circuitry is further configured to:
   receive a plurality of inputs to the received image data; and
   set the specific closed region based on a plurality of coordinates specified in the image data based on the received plurality of inputs.

5. The control system according to claim 4, wherein the circuitry is further configured to set a polygon region defined by the plurality of coordinates in the image data as the specific closed region, the plurality of coordinates being specified in the image data based on the received plurality of inputs.

6. The control system according to claim 1, wherein the circuitry is further configured to display, on the display, screen image information related to the at least one movable object analyzed within the specific closed region.

7. The control system according to claim 6,
   wherein the memory stores the image data and information of a date and time when the image corresponding to the image data was captured by the image capturing device in association with the coordinates of the at least one movable object in association with each other, and
   wherein the circuitry is further configured to:
      count a number of the at least one movable object within the specific closed region at the date and time associated with the image data; and
      display, on the display, the at least one movable object counted within the specific closed region in time series based on the date and time.

8. The control system according to claim 6, wherein when the specific closed region is set as a plurality of specific closed subregions, the circuitry is further configured to display, on the display, the screen image information related to the at least one movable object analyzed within each of the plurality of specific closed subregions.

9. The control system according to claim 1, wherein when the specific closed region formed on the spherical image data is divided on the planar image data, the circuitry is further configured to calculate coordinates indicating a divided portion as the additional coordinates.

10. The control system according to claim 1, wherein when the specific closed region formed on the spherical image data is divided on the planar image data between first coordinates and second coordinates calculated on the planar image data, the circuitry is further configured to calculate coordinates indicating a divided portion as first additional coordinates and second additional coordinates, and set the specific closed region using the first coordinates, the second coordinates, the first additional coordinates, and the second additional coordinates.

11. The control system according to claim 10, wherein when the specific closed region formed on the spherical image data is divided on the planar image data between third coordinates and fourth coordinates calculated on the planar image data, the circuitry is further configured to calculate coordinates indicating a divided portion as third additional coordinates and fourth additional coordinates, and set the specific closed region using the first coordinates, the second coordinates, the third coordinates, the fourth coordinates, the first additional coordinates, the second additional coordinates, the third additional coordinates, and the fourth additional coordinates.

12. The control system of claim 10, wherein when the specific closed region formed on the spherical image data is not divided on the planar image data between third coordinates and fourth coordinates, the circuitry is further configured to calculate both end points of a line segment on the planar image data corresponding to a specific polar point of the spherical image data as fifth additional coordinates and sixth additional coordinates, and set the specific closed region using the first coordinates, the second coordinates, the third coordinates, the fourth coordinates, the first additional coordinates, the second additional coordinates, the fifth additional coordinates, and the sixth additional coordinates.

13. An information processing system comprising:
    the control system according to claim 1; and
    an imaging system connected to the control system via a communication network, the imaging system including the image capturing device used for capturing the image in the specific space; and
    another circuitry configured to transmit the image data of the image captured and acquired by the image capturing device to the control system via the communication network, and the circuitry of the control system is further configured to receive the image data transmitted from the another circuitry of the imaging system.

14. The information processing system according to claim 13, wherein the another circuitry of the imaging system is further configured to:
    detect the coordinates of the at least one movable object; and
    transmit the image data and the detected coordinates of the at least one movable object to the control system via the communication network, and
    wherein the memory of the control system stores the image data and the coordinates of the at least one movable object transmitted from the imaging system in association with each other.

15. A method of performing an analysis in a specific space, the method comprising:
    receiving image data corresponding to a captured image captured and transmitted from an image capturing device;
    storing, in a memory, the received image data in association with coordinates of at least one moveable object that indicate a position of the at least one movable object included in the image data;
    in response to displaying an image generated from the stored image data on a display, receiving an input, from an operator, arbitrarily setting a specific closed region in the image displayed on the display; and
    analyzing the at least one movable object within the specific closed region set in the image based on coordinates of the specific closed region set by the received input, and the stored coordinates of the at least one movable object;
    receiving spherical image data corresponding to a spherical image transmitted from the image capturing device as the image data;
    storing, in the memory, planar image data converted from the received spherical image data;
    in response to displaying a spherical image generated from the received spherical image data on the display, receiving an input for setting the specific closed region in the spherical image displayed on the display;

calculating coordinates on the planar image data corresponding to the received input;

setting the calculated coordinates corresponding to the received input as coordinates of the specific closed region;

calculating coordinates of the at least one movable object indicating a position of the at least one movable object included in the spherical image data, on the planar image data;

analyzing the at least one movable object within the specific closed region based on the set coordinates of the specific closed region and the calculated coordinates of the at least one movable object, and when the specific closed region cannot be formed on the planar image data using the calculated coordinates corresponding to the received input, calculating additional coordinates to form the specific closed region, and setting the specific closed region on the planar image data based on the calculated coordinates corresponding to the received input and the calculated additional coordinates.

16. A non-transitory computer readable storage medium storing one or more instructions that, when executed by one or more processors, cause the one or more processors to perform a method of performing an analysis in a specific space, the method comprising:

receiving image data corresponding to a captured image captured and transmitted from an image capturing device;

storing, in a memory, the received image data in association with coordinates of at least one moveable object that indicate a position of the at least one movable object included in the image data in response to displaying an image generated from the stored image data on a display, receiving an input, from an operator, arbitrarily setting a specific closed region in the image displayed on the display; and analyzing the at least one movable object within the specific closed region set in the image based on coordinates of the specific closed region set by the received input, and the stored coordinates of the at least one movable object;

receiving spherical image data corresponding to a spherical image transmitted from the image capturing device as the image data;

storing, in the memory, planar image data converted from the received spherical image data;

in response to displaying a spherical image generated from the received spherical image data on the display, receiving an input for setting the specific closed region in the spherical image displayed on the display;

calculating coordinates on the planar image data corresponding to the received input;

setting the calculated coordinates corresponding to the received input as coordinates of the specific closed region;

calculating coordinates of the at least one movable object indicating a position of the at least one movable object included in the spherical image data, on the planar image data;

analyzing the at least one movable object within the specific closed region based on the set coordinates of the specific closed region and the calculated coordinates of the at least one movable object, and when the specific closed region cannot be formed on the planar image data using the calculated coordinates corresponding to the received input, calculating additional coordinates to form the specific closed region, and setting the specific closed region on the planar image data based on the calculated coordinates corresponding to the received input and the calculated additional coordinates.

* * * * *